United States Patent [19]

Morley

[11] 4,276,594
[45] Jun. 30, 1981

[54] DIGITAL COMPUTER WITH MULTI-PROCESSOR CAPABILITY UTILIZING INTELLIGENT COMPOSITE MEMORY AND INPUT/OUTPUT MODULES AND METHOD FOR PERFORMING THE SAME

[75] Inventor: Richard E. Morley, Greenville, N.H.

[73] Assignee: Gould Inc. Modicon Division, Rolling Meadows, Ill.

[21] Appl. No.: 916,274

[22] Filed: Jun. 16, 1978

Related U.S. Application Data

[63] Continuation-in-part of Ser. No. 873,018, Jan. 27, 1978, abandoned.

[51] Int. Cl.³ .................... G06F 15/16; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,348,210 | 10/1967 | Ochsner | 364/200 |
| 3,349,375 | 10/1967 | Seeber et al. | 364/200 |
| 3,350,689 | 10/1967 | Underhill et al. | 364/200 |
| 3,377,623 | 4/1968 | Reut et al. | 364/200 |
| 3,411,139 | 11/1968 | Lynch et al. | 364/200 |
| 3,419,849 | 12/1968 | Anderson et al. | 364/200 |
| 3,651,484 | 3/1972 | Smeallie | 364/200 |
| 3,703,707 | 11/1972 | Bovett | 364/200 |
| 3,810,105 | 5/1974 | England | 364/200 |
| 3,833,889 | 9/1974 | Cray | 364/200 |
| 3,905,023 | 9/1975 | Perpiglia | 364/200 |
| 3,913,070 | 10/1975 | Malcolm et al. | 364/200 |
| 3,921,149 | 11/1975 | Kreis et al. | 364/200 |
| 3,931,613 | 1/1976 | Gruner et al. | 364/200 |
| 3,959,775 | 5/1976 | Valassis et al. | 364/200 |
| 3,961,312 | 6/1976 | Bodner et al. | 364/200 |
| 3,962,685 | 6/1976 | Belle Isle | 364/200 |
| 3,964,055 | 6/1976 | Carruet et al. | 364/200 |
| 3,978,451 | 8/1976 | Ito et al. | 364/900 X |
| 3,982,231 | 9/1976 | Bernstein et al. | 364/200 |
| 3,993,981 | 11/1976 | Cassarino, Jr. et al. | 364/200 |
| 4,000,485 | 12/1976 | Barlow et al. | 364/200 |
| 4,001,783 | 1/1977 | Monahan et al. | 364/200 |
| 4,001,790 | 1/1977 | Barlow | 364/200 |
| 4,007,450 | 2/1977 | Haibt et al. | 364/200 |
| 4,012,717 | 3/1977 | Censier et al. | 364/200 |
| 4,015,242 | 3/1977 | Anceau et al. | 364/200 |
| 4,015,243 | 3/1977 | Kurpanek et al. | 364/200 |
| 4,048,623 | 9/1977 | Gruner | 364/200 |
| 4,051,551 | 9/1977 | Lawrie et al. | 364/200 |
| 4,056,843 | 11/1977 | Bishop et al. | 364/200 |
| 4,060,849 | 11/1977 | Bienvenu et al. | 364/200 |
| 4,065,808 | 12/1977 | Schomberg et al. | 364/200 |
| 4,065,809 | 12/1977 | Matsumoto | 364/200 |
| 4,073,005 | 2/1978 | Parkin | 364/200 |
| 4,074,352 | 2/1978 | Cook et al. | 364/200 |
| 4,075,693 | 2/1978 | Fox et al. | 364/200 |
| 4,092,728 | 5/1978 | Baltzer | 364/900 |
| 4,093,981 | 6/1978 | McAllister et al. | 364/200 |
| 4,095,267 | 6/1978 | Morimoto | 364/200 |
| 4,104,720 | 8/1978 | Gruner | 364/200 |
| 4,106,090 | 8/1978 | Erickson et al. | 364/200 |
| 4,106,092 | 8/1978 | Millers | 364/200 |
| 4,122,520 | 10/1978 | Adamchick et al. | 364/200 |
| 4,149,243 | 4/1979 | Wallis | 364/200 |
| 4,164,787 | 8/1979 | Aranguren | 364/200 |
| 4,181,936 | 1/1980 | Kober | 364/200 |
| 4,212,057 | 7/1980 | Devlin et al. | 364/200 |

OTHER PUBLICATIONS

H. Loren, "Parallelism in Hardware and Software: Real and Apparent Concurrency", Chaps. 11,12,18,19; Prentice-Hall Pub. Co., 1972.
"A Computer That Wont't Shut Down", in *Business Week*, Dec. 8, 1975, pp. 81-82.
"Use Dec MPU's in Experiment", in *Electronic News*.
Musgrave, "Mini Network in a Box Promises Failsafe DP", in *Minicomputer News*, Dec. 18, 1975.
"Multiprocessors and Parallel Processing", pp. 1-80, Comptre Corp., 1974.
"English Trying New Architecture", in *Electronics*, Mar. 2, 1978, pp. 48, 50.
Schuster et al., "An Associative Processor for Data Bases", in *Proceedings of the 5th Annual Symposium on Computer Architecture*, Apr. 3-5, 1978, pp. 52-58.
1084 Model Programmable Controller, Modicon Corp. Brochure.

*Primary Examiner*—Melvin B. Chapnick
*Attorney, Agent, or Firm*—Mattern, Ware, Davis & Stoltz

[57] ABSTRACT

A digital computer with the capability of incorporating multiple central processing units (CPU's), utilizes an address and data bus between each central processing unit and from one to fifteen intelligent composite memory and input/output modules (MIO). Data is transferred to and from each MIO and the CPU synchronously by a bus during one phase of a three phase clocking cycle. During a second phase of the clocking cycle data on one or more low speed serial data channels within each MIO is transferred to and from the MIO and external devices. During the third phase of the clocking cycle data on a high speed direct memory access channel (DMA) is transferred to and from the MIO and one or more external devices. Additional CPU's can be interconnected with the first CPU by means of an inter-processor buffer module (IPB) which interconnects to the bus at one end and the additional CPU, by means of a bus, at its other end. The IPB may be a software modifiable MIO and can store data addressable by the two interconnected CPU's. In turn, the additional CPU and its associated bus interconnects by the second bus with from one to fifteen additional MIO's or IPB's, allowing cascading of CPU's and associated MIO's and IPB's. Since all data transfers to and from the MIO's and external devices occur at time phases separate from the first time phase in which the CPU communicates with the MIO's and IPB's, the computational speed of any CPU is independent of the quantity of data transferred between the MIO's and IPB's and associated external devices or additional CPU's.

36 Claims, 68 Drawing Figures

FIG. 13
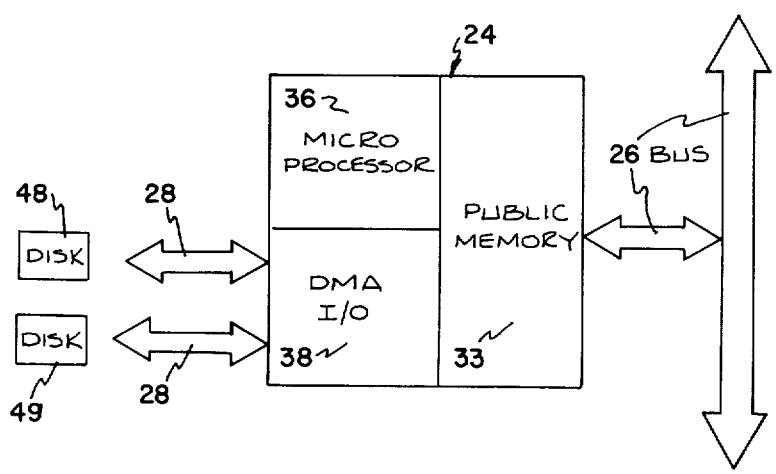
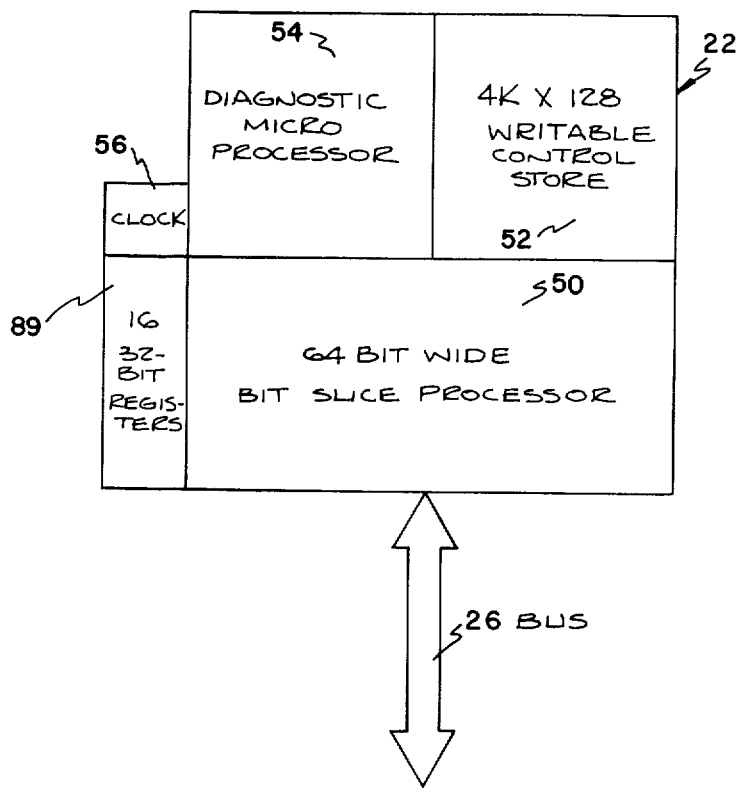
FIG. 13A

FIG. 20
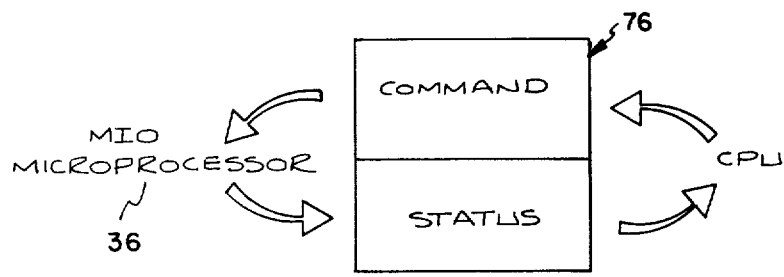
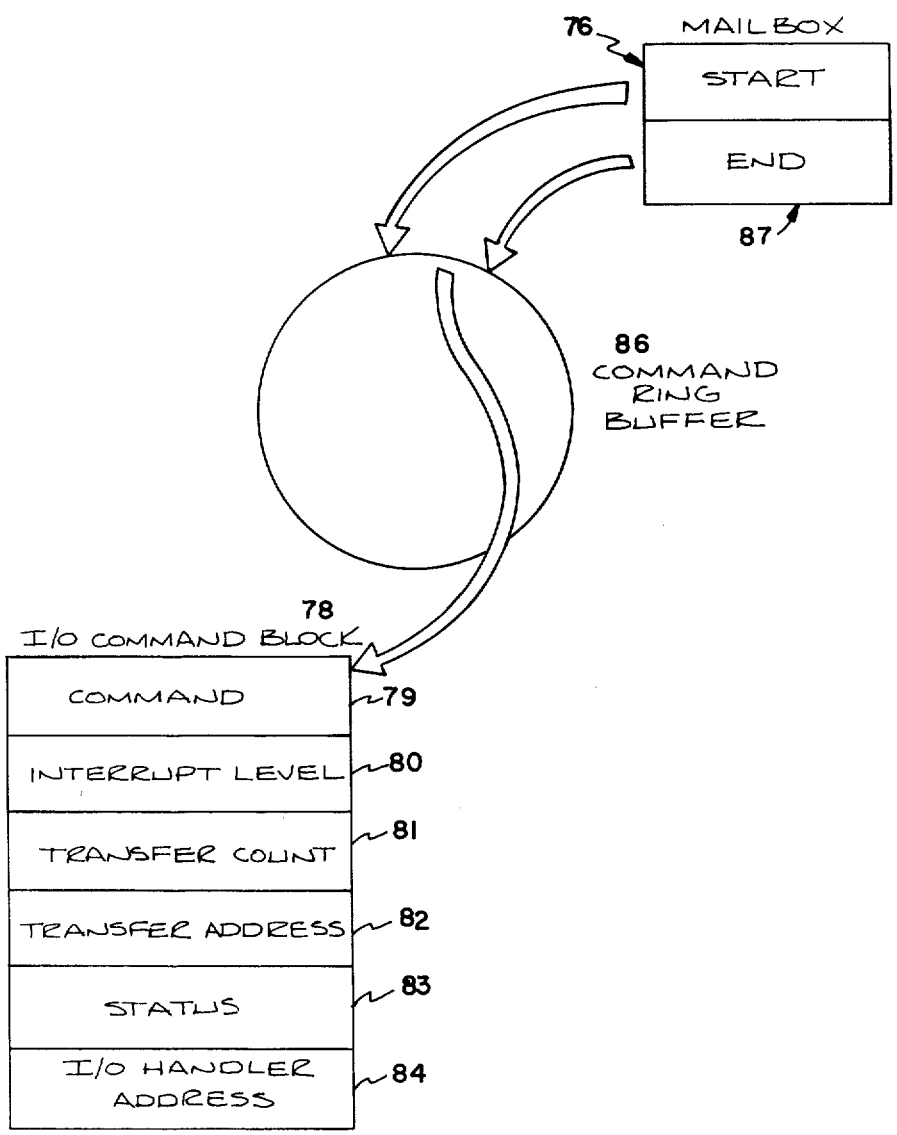
FIG. 21

FIG. 24A
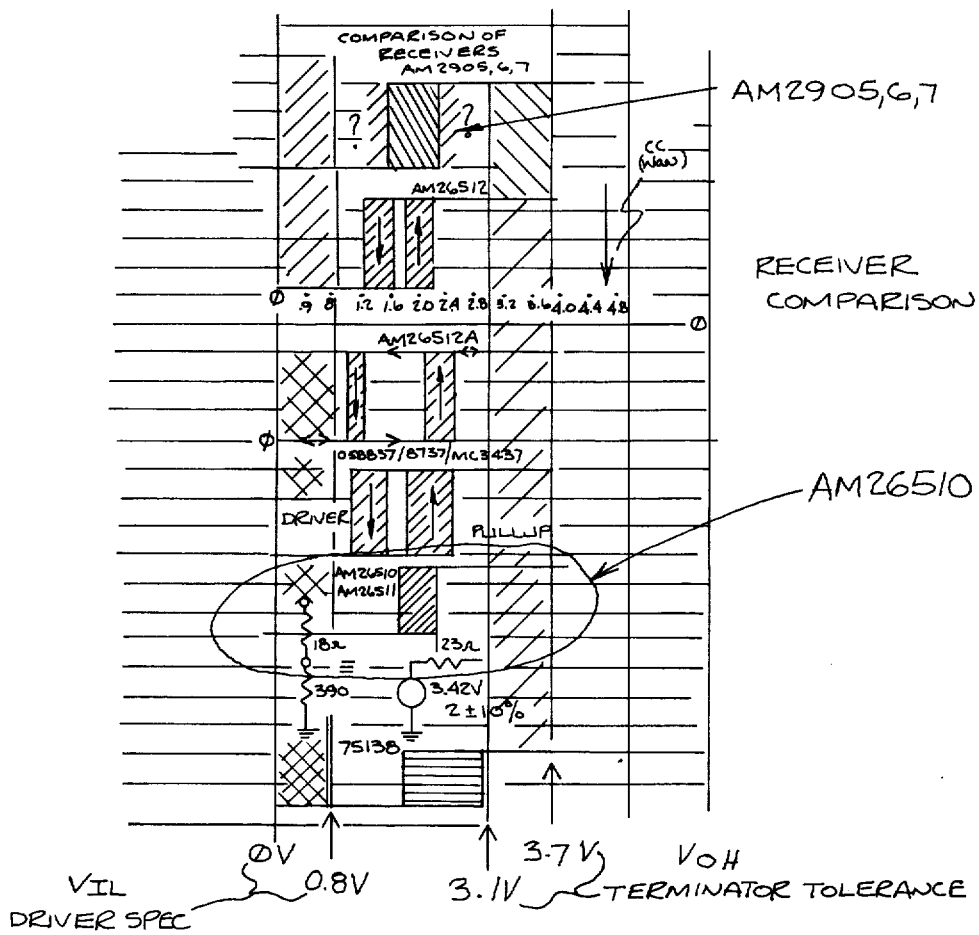
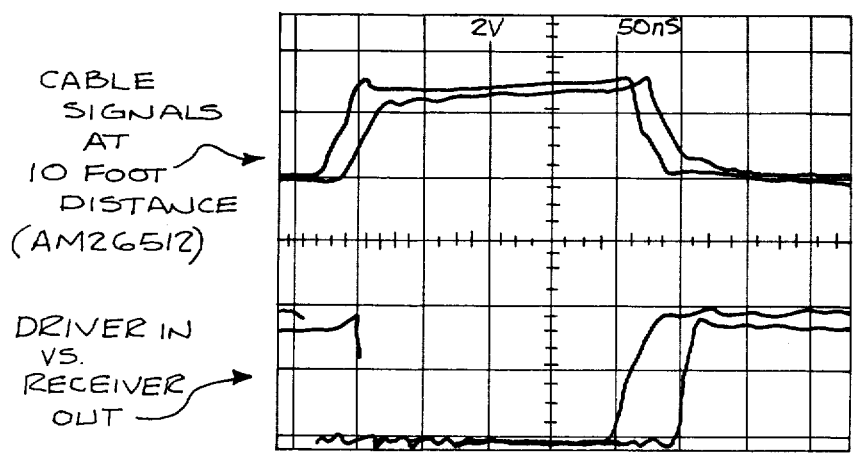
S-G-S-G PATTERN, ALL SIGNALS SWITCHING SIMULTANEOUSLY
FIG. 24B

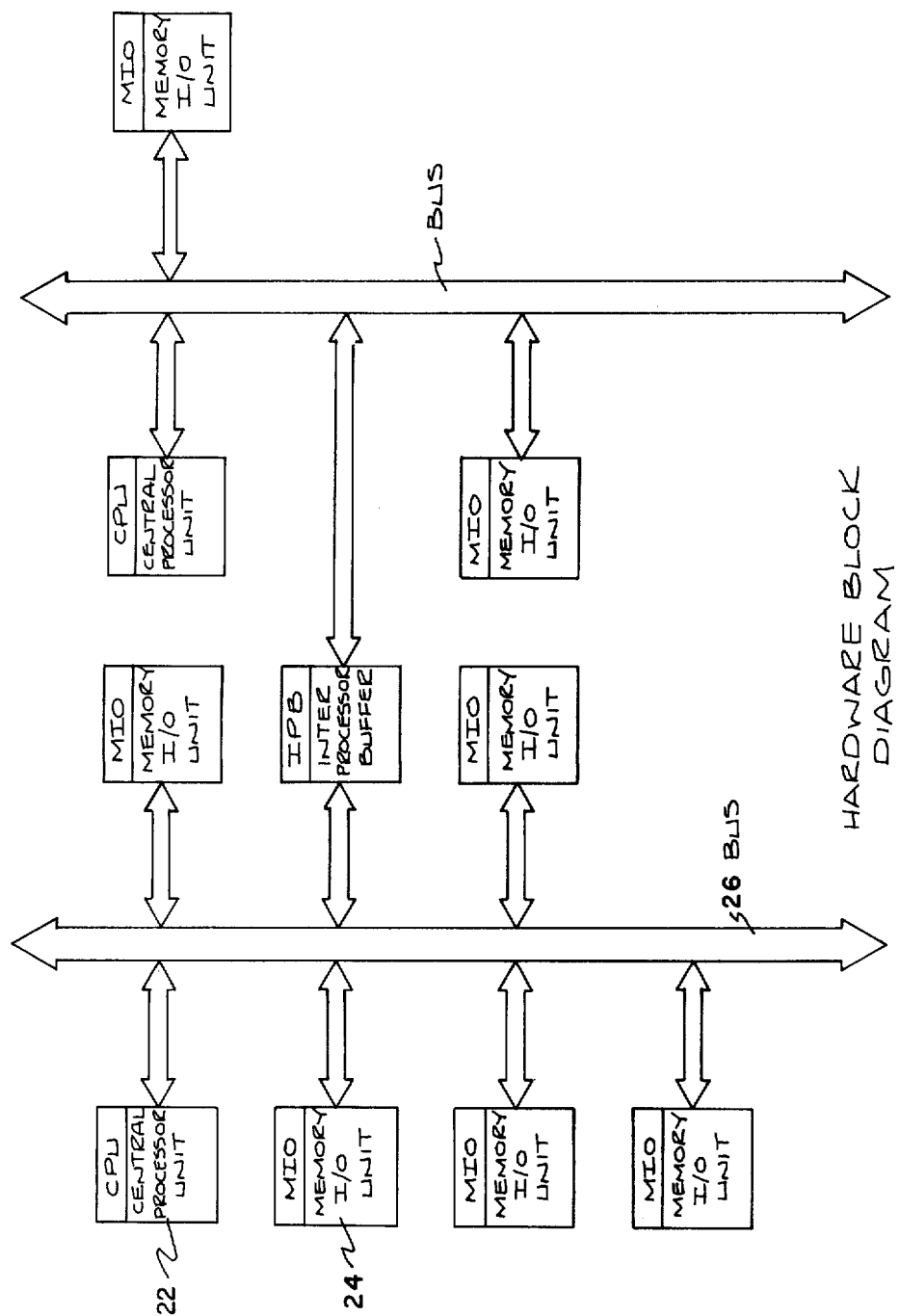

|  | PH0 | PH1 | PH2 | PH0 | PH1 | PH2 |
|---|---|---|---|---|---|---|
| READ | BUS←ADDRESS READ←1 | → → | DATA←BUS READ←0 |  |  |  |
| WRITE |  |  | BUS←DATA | BUS←ADDRESS WRITE←1 | → → | WRITE←0 |
| TRANSFER | BUS←ADDRESS READ←1 | → → | DATA←BUS READ←0 | BUS←ADDRESS WRITE←1 | → → | WRITE←0 |
| OUTERRUPT | BUS←ADDRESS OUTERRUPT←1 | → → | OUTERRUPT←0 |  |  |  |
| BROADCAST READ | BUS←ADDRESS READ←1 BROADCAST←1 | → → | DATA←BUS READ←0 BROADCAST←0 |  |  |  |
| WRITE | — — — | — — | BUS←DATA | BUS←ADDRESS WRITE←1 BROADCAST←1 | → → | WRITE←0 BROADCAST←0 |

BUS - MEMORY ACCESS FUNCTIONS TIMING DIAGRAM

FIG. 28

BASIC CYCLE TIMING

READ CYCLE TIMING (BLOCK DATA TO CPU)

FIG. 36 BLOCK DIAGRAM

FIG. 37 BLOCK DIAGRAM

TIMING

FIG. 40

PHYSICAL LAYOUT
CPU DATA PATH BOARD

| 00 | | | | 07 | 50 | BYTE 5 | 57 |
|---|---|---|---|---|---|---|---|
| CALL | ? | ? | ? | JUMP | A | | B |

| 10 | BYTE 1 | 17 | 60 | BYTE 6 | 67 |
|---|---|---|---|---|---|
| JUMP | | ? | PROP GEN | OP | |

| 20 | BYTE 2 | 27 | 70 | BYTE 7 | 77 |
|---|---|---|---|---|---|
| DISP | SKIP | ? | DEST | ? | DEXTX |

| 30 | BYTE 3 | 37 | 80 | BYTE 8 | 87 |
|---|---|---|---|---|---|
| SKIP | SPEC | | AX | | BX |

| 40 | BYTE 4 | 47 | 90 | BYTE 9 | 97 |
|---|---|---|---|---|---|
| DPX SEL | CLK EN | ? | CRY | OPX | |

CPU CONTROL BOARD

| A0 | | | BYTE A | A7 | B0 | | | | BYTE B | B7 |
|---|---|---|---|---|---|---|---|---|---|---|
| MARK | GO | PAR | DBUS SEL | | ? | ? | SCFE | MEM | REG SEL | |

| C0 | BYTE C | C7 | D0 | BYTE D | D7 |
|---|---|---|---|---|---|
| | # | | | # | |

| E0 | BYTE E | E7 | F0 | BYTE F | F7 |
|---|---|---|---|---|---|
| | # | | | # | |

P∅, P1 = DOMAIN OF SEGMENT
C = CODE IF 1
    DATA IF ∅
Q = WRITEABLE IF 1
    NOT WRITEABLE IF ∅

VIRTUAL ADDRESS AND
MAP FORMATS

THE MAP

FIG. 46 MIO BLOCK DIAGRAM

DISPLAY

SYSTEM POWER CONTROL

LARGE SYSTEM: 3.75 - 30MB - 4 DISKS

MODEST SYSTEMS

.5-4MB (.75-6) 2 DISKS } OR { 1-8MB (1.25-10) 1 DISK

DIGITAL COMPUTER WITH MULTI-PROCESSOR CAPABILITY UTILIZING INTELLIGENT COMPOSITE MEMORY AND INPUT/OUTPUT MODULES AND METHOD FOR PERFORMING THE SAME

CROSS REFERENCE TO RELATED APPLICATION

This application is a continuation-in-part application of U.S. patent application bearing Ser. No. 873,018, filed Jan. 27, 1978, now abandoned.

BACKGROUND OF THE INVENTION

1. Field of the Invention

This invention relates to digital computers and specifically to the architecture and methodology used in fabricating digital computers.

2. Description of the Prior Art

Computer architecture since the inception of the digital computer has undergone relatively few basic changes. Most computers comprise a large memory, an arithmetic logic unit (ALU) and an input/output (I/O) section. The computer functions by considering the memory as a single unit. The memory can be any size within the addressing capabilities of the ALU, but it is a single unit in a block diagram point of view. When an external event occurs the input/output module "interrupts" the ALU and forces the ALU to store its state at the time of the interrupt and to subsequently service that interrupt. After ascertaining the "where" and "what" of the interrupt, appropriate sub-routines are called from memory to service the interrupt. The decision must be made and the appropriate memory fetches must be executed. At the conclusion of the interrupt the ALU returns to its previous state and continues on with its internal computation.

A more advanced computer architecture utilizes the same three modules with the I/O still interrupting the memory. Here the ALU further has enhanced capability by means of "stunt boxes" and an onboard cache memory. This onboard cache memory allows the execution of small sub-routines directly on the ALU without having to use the slower bus structure connecting the three basic modules.

The memory in such an advanced computer has several ports, only one of which may be used at a single time. In order for the I/O to communicate with the memory it is necessary that the same bus be utilized that interconnects the memory with the ALU. However, for getting high speed data into memory a direct memory access (DMA) is used. This DMA is executed by interrupting the ALU and subsequently shutting down the basic bus which interconnects the ALU with the memory and the I/O and transferring bus control to the DMA channel and executing the data transfer from a disk or other associated external device. Thus, in this type of prior art advanced computer architecture the DMA I/O ports access the memory using the bus interconnecting the memory with the CPU. The DMA however is able to communicate with the memory without using the CPU. This generally brings about the common misconception that I/O and the CPU run independendly of each other. This however is not the case, for in a conventional DMA scheme transfers to and from memory occur during the execute cycle of the CPU. This works well as long as the total time required by the DMA's I/O is less than the execute time available. When this rate is exceeded either the CPU performance degrades rapidly or the DMA cannot take the I/O. Either occurrence usually has disastrous results.

Furthermore, prior art computer architecture when handling serial I/O devices such as terminals usually requires the interpretation of each character as received and often a response character. In a conventional architecture this is done by interrupting the CPU after each character. The CPU requires many CPU cycles to store away its current state, interpret the character and then to restore its previous state. This limits the number of simultaneous serial I/O channels that can be handled by the CPU. For example, if it takes a CPU one hundred microseconds to handle a character, this limits the system to ten 9,600 baud ports. To handle more ports it is necessary to add external processors to handle the handshaking. This makes the system more complex and expensive.

Thus the basic computer architecture bus is limited and single minded. It can only do one thing at a time and must do it over the memory port bus. In order to make the computer run faster, it is necessary to make the speed of execution of a single instruction faster. The classical architecture is thus analogous to a supersonic jet making more and more trips across the Atlantic as opposed to the "air bus" which is the analogous equivalent to the present invention as disclosed herein.

It has also been found difficult for prior art computer architectures to function as multi-processors. Multiprocessors by virtue of the inherent architecture used to data cannot significantly enhance computer capability since, in effect, transfer between shared memories means that one CPU is shut down while the other does a memory access transfer. Common data base is of course important, but the rate of execution of a program is not substantially enhanced using such a multi-processor approach.

In the present invention the solution to the problem of greater computational speed by a digital computer is accomplished by a totally new approach by utilizing a basic change in digital computer architecture. The present invention is a digital computer that uses partitioned memory, which is always available to external events, independent of internal arithmetic logic unit requirements. The central processor or arithmetic logic unit continues to run at a given rate, yet, for most computational requirements is never stopped with respect to external events. To achieve this result the memory and the I/O are combined into a single intelligent module with the memory structure utilizing multi-synchronous ports. The central processing unit (CPU) thus communicates with the composite intelligent memory and input/output module (MIO) during one phase of a three phase clock cycle, while the other two phases of the clock cycle enable the MIO to communicate with external devices. Thus, unlike the prior art computer architecture, the amount of data transferred between the memory and the external devices can never adversely affect the computational abilities of the CPU since access to the memory by the CPU can never be impeded by data transfer to and from external devices.

Furthermore, the present invention, by use of interprocessor modules (IPB), which may be software modified MIO's, allows the addition of any number of additional CPU's with their own associated MIO's and IPB's. The IPB with its associated memory allows two interconnected CPU's to communicate with each other through the use of shared memory. However, since the IPB, like the MIO, utilizes the same three phase timing cycles, interference between communicating CPU's is prevented. A cascade arrangement of CPU's with associated MIO's is achievable by the present invention. Thus a multi-processor digital computer is realizable in a simple and straightforward way.

SUMMARY OF THE INVENTION

A digital computer according to the present invention comprises one or more central processing units (CPU's) communicating by a bus with one to fifteen composite intelligent memory and input/output modules (MIO's) or with from one to fifteen interprocessor modules (IPB's) or a combination of MIO's and IPB's totaling from one to fifteen modules. Each MIO is a combination of memory and I/O channels which provides for high speed input/output to and from memory and external devices without requiring the use of the bus interconnecting the MIO with the CPU. Each CPU, MIO, and IPB is packaged in a separate physical block which is connected to the bus. Up to sixteen blocks can be connected to a single bus, only one of which may be a CPU. Since, as explained below, data is transferable from a public memory portion of each MIO with external devices and the CPU during separate phases of a three phase clock cycle, the CPU can operate in parallel with each of the I/O channels of each MIO connected to the bus without interference with the I/O channels, and vice versa.

Each MIO, according to the preferred embodiment of the present invention, can transfer in or out up to 2.66 megabytes, each byte having eight bits, or 666,000, thirty-two bit words per second. With fifteen MIO's servicing one CPU, the CPU can handle a simultaneous input/output rate of 40 megabytes, a rate comparable with the largest of mainframe computers in existence at the time of this writing. At the same time, the CPU can be performing computations at 100% efficiency.

Each MIO unit has a public memory, an input/output control section, and an onboard microprocessor. The public memory of each MIO range in size from 64K bytes to 256K bytes. The CPU assigns unique address space for each byte in each public memory of each MIO. When fifteen MIO's are interconnected to the bus, a maximum addressable memory of 3.75 megabytes is obtained.

A three phase public memory is used in each MIO. Each memory phase has a duration of 0.5 microseconds and dedicates the public memory of the MIO in turn to the CPU, serial input/output, and direct memory access (DMA) input/output. The CPU accesses the public memory using the bus which has a thirty-two bit wide data path. High speed parallel input/output is performed using known DMA techniques. Low speed serial input/output is performed using the microprocessor in the MIO to transfer the data to and from the public memory and the associated external device or devices.

The microprocessor controls the handshaking between the MIO and its peripheral device or devices, including generating interrupts to the CPU so as to indicate the completion of a desired input/output command. The microprocessor also performs a diagnostic check of the public memory on power initiation (power up) and when instructed to do so by the CPU. It also has a 300 baud diagnostic port which has facilities for debugging microprocessor input/output programs resident in private memories within the MIO.

The CPU is built around a series bit slice logic processor. In the present invention, a 64-bit wide processor that is microprogrammable is utilized. Instructions to the CPU cause micro-instructions to be executed from a 4K×128-bit writable control store. These micro-instructions are user programmable. The CPU has 16,32-bit general purpose registers and incorporates a microprocessor for hardware diagnostic checking and for loading the microcode into the writable control store. The standard microcode instruction set supports a wide range of logical, fixed and floating point operations.

The bus interconnecting the CPU with the MIO's and IPB's is a three phase clock cycled bus, each clock phase corresponding to one of the MIO public memory access phases. The bus has 32 data/address lines which are used as address lines during one clock phase and as data lines in another clock phase. In addition, there are eight unary select CPU interrupt level lines controlled by the microprocessors in the MIO's. There are also control lines by which the CPU's can interrupt each of the MIO microprocessors. Each phase of the three phase clock cycle utilized by the bus is 0.5 microseconds in duration and is thus synchronized with the three memory phases of the MIO's.

Each interprocessor buffer (IPB) communicates by the bus with the first CPU and by a slave bus with an additional CPU with associated additional MIO's and/or IPB's. The IPB also operates on a three phase clock cycle; the clock cycle communicating with the CPU operating synchronously with other IPB's and MIO's interconnected to the same bus associated with that particular CPU. The IPB also contains pubic memory which may be accessed by either of the interconnected CPU's.

The slave bus interconnects and communicates data from the IPB to the second CPU during one of the other two clock cycles of the three phase clock cycle. In this manner, CPU's with associated MIO's and additional IPB's can be cascaded to the first CPU. A network of resultant CPU's, MIO's and IPB's is thus obtained with all data communication between external devices and this resultant computer taking place through the MIO's so as not to affect the computational speed of the CPU's. The result is addition of memory to one or more central processing units in a manner that does not degrade execution time of the CPU's but which provides for high speed data communication between the computer and external devices by use of the MIO. Multiprocessor capability is synergistically realized by incorporation of interprocessor buffers which provide for communications to and from central processing units as well as MIO's while again not degrading the execution time of each CPU.

A guiding principle of hardware design which is also a global system concept may be expressed in terms of ease of use and reliability, however, these principles can be summarized as no nonsense and the belief that it is possible to deliver solutions to complex problems without making them more complex or creating new problems. It means control of design and manufacturing processes at each level and attention to detail at each level. Another way of stating the philosophical requirements is that to strive for benchmark performance in hardware as many manufacturers do is self defeating because the true power of the computer system is in its architecture, its availability, its parallel I/O, and its software concepts. To push for higher performance or the use of exotic technology in hardware would merely reduce the amount of memory which could be placed on line, make reliable components more difficult to obtain, and make the equipment more difficult to repair. For this reason design is aimed at the very center of current silicon technology rather than at its fringes. Well known techniques of improving maintainability and reliability will, of course, be used, but they will be pursued with exceptional vigor and innovation in this area will be stressed.

At the risk of redundancy, some practical aspects of the hardware philosophy can be stated. First, diversions into conventional thinking are to be avoided in order to take full advantage of our clean slate and architectural power. For example, automatic system start-up, avoidance of "swapping," absolute system partitioning, non-removable disk, editing and prompting by means of color, just to mention a few. Second, the "slower is faster" idea means extremely solid, uncritical timing margins, low component stress, and adherence to established yet modern technologies. Third, on-line performance tests to insure valid operation at the module level are to be incorporated, insuring that each electronic assembly functions properly and correctly regardless of its system environment. The same principles are extended to firmware and system software design as to protection of circuitry from power line transients by means of several levels of isolation. This is merely one aspect of a commitment to build "crash proof" equipment. Such commitment also extends to memory addressing hardware within the CPU. Fourth, is the designing in of adequate "hooks" for manufacturing test and advance planning for manufacturing process control including component and module preconditioning, inspection, traceability, etc.

OBJECTS OF THE INVENTION

It is therefore a principal object of the present invention to provide a digital computer which incorporates at least one central processing unit with one or more composite memory and input/output modules (MIO's) which provide for memory access between the CPU and the MIO during one phase of at least a two phase clock cycle, with the other phase or phases of the clock cycle providing memory access between the MIO and one or more external devices.

An additional object of the present invention is to provide a digital computer of the above description in which a three phase cycle is incorporated in each MIO for memory access from the public memory of the MIO with the CPU during one phase of the three phase clock cycle, with one or more serial input/output channels to external devices during a second phase of the clock cycle, and with a direct memory access parallel channel for high speed data transferral during a third phase of the clock cycle.

Another object of the present invention is to provide a digital computer of the above character in which each MIO further incorporates a microprocessor for controlling the handshaking between the public memory and external devices interconnected to either the serial input/output channels or the data memory access channel as well as to and from the CPU.

A further object of the present invention is to provide a digital computer of the above character in which the microprocessor within the MIO further performs a diagnostic check of the public memory within the MIO during power initiation and also when instructed to do so by the central processing unit.

A still further object of the present invention is to provide a digital computer of the above character further incorporating one or more interprocessor buffers (IPB's) connected to the bus so as to allow communication from the central processing unit to a second bus associated with a second central processing unit, which by the second bus can communicate with one or more MIO's and/or additional IPB's for communication with still further central processing units.

Another object of the present invention is to provide a digital computer of the above description wherein the interprocessor buffer communicates with the first CPU during the same phase of the clock cycle in which the other MIO's or interprocessor buffers connected to the bus communicate with the same CPU and where the interprocessor buffer communicates with the slave bus associated with the second CPU during one of the other phases of the clock cycle in a manner analogous to the operation of the MIO's with interconnected external devices.

A still further object of the present invention is to provide a digital computer of the above character in which the bus interconnected between the CPU and the MIO's or IPB's utilizes a three phase clocked operation for communicating with the MIO's in which two of the phases concern the placing of the address and the desired data on the bus and the third phase concerns the actual reading or writing of the data from or to the public memory of the associated MIO.

A still further object of the present invention is to provide a digital computer of the above description in which the address space for the public memories in each MIO associated with the bus connected to one CPU is uniquely identifiable by the CPU.

Another object of the present invention is to provide a digital computer of the above description in which each MIO, IPB, or CPU is housed in a separate block.

Another object of the present invention is to provide a digital computer of the above description in which two blocks form a portion of a functional support unit which further houses a power supply for driving the electronic circuitry within the two blocks, the functional support unit further housing a portion of the bus which is in turn connected to other functional support units placed below or above itself, thus providing for reliable and easy field installation of the resultant digital computer.

A still further object of the present invention is to provide a digital computer of the above description which can be configured in a multi-CPU arrangement without degrading the computational speed of the individual CPU's forming the multiprocessor system.

A further object of the present invention is to provide a digital computer of the above description in which each CPU, MIO, IPB and power supply associated therewith has a resident microprocessor for, among other things, diagnostics and initiation upon start up.

Another object of the present invention is to provide a digital computer of the above description being relatively inexpensive to manufacture yet having a high reliability.

Other objects of the present invention will in part be obvious and will in part appear hereinafter.

THE DRAWINGS

For a fuller understanding of the nature and objects of the invention, please refer to the following detailed description which makes reference to the accompanying drawings, in which:

FIG. 1 is a block diagram of a typical configuration of the digital computer according to the present invention illustrating the use of multiple central processing units, each central processing unit communicating with one or more composite memory, input/output modules (MIO's) and with one or more interprocessor buffers (IPB's) by means of an interconnected bus, also illustrating the power supply modules and interconnection of the MIO's with external devices;

Figure 1:
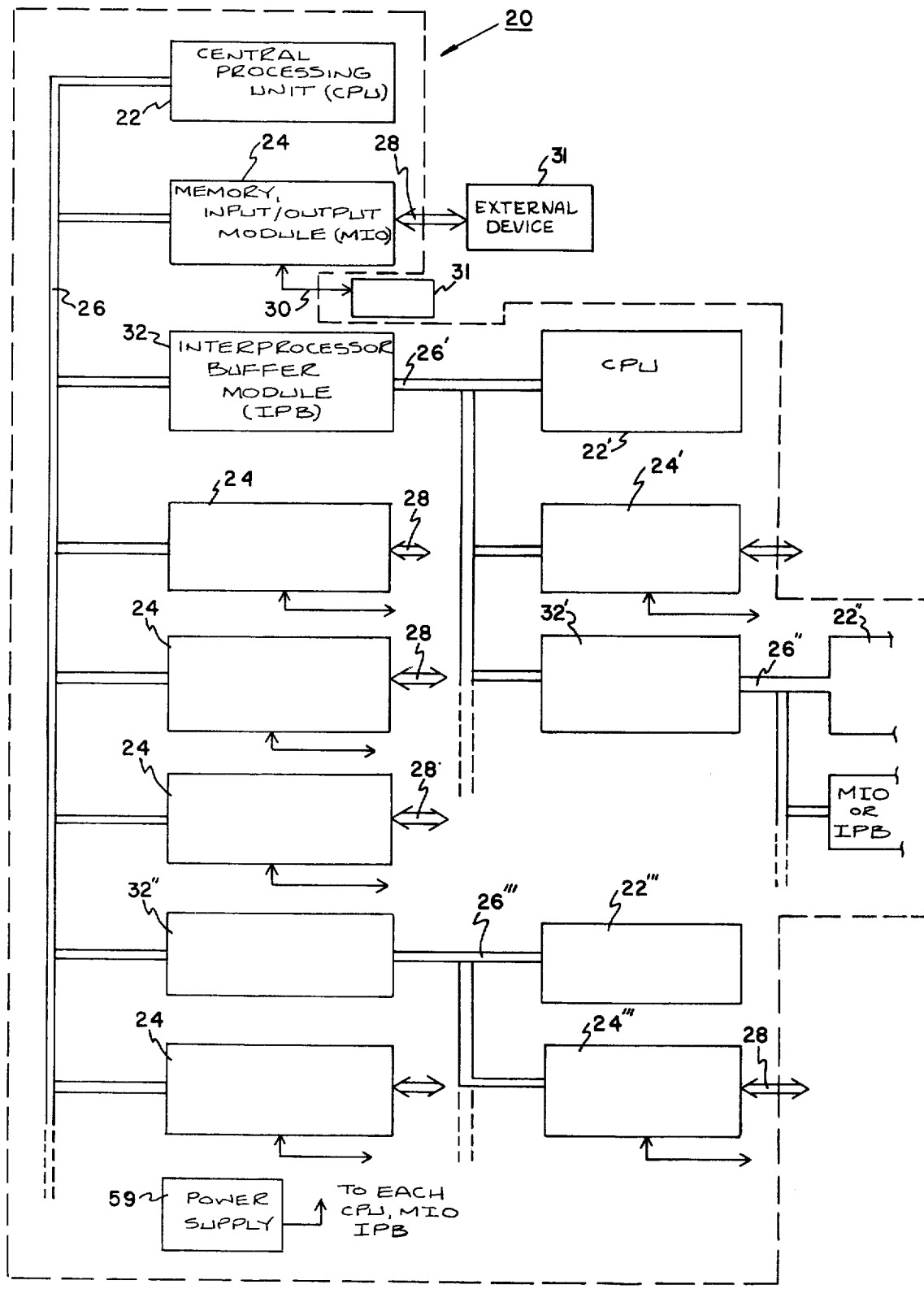
Figure 5:
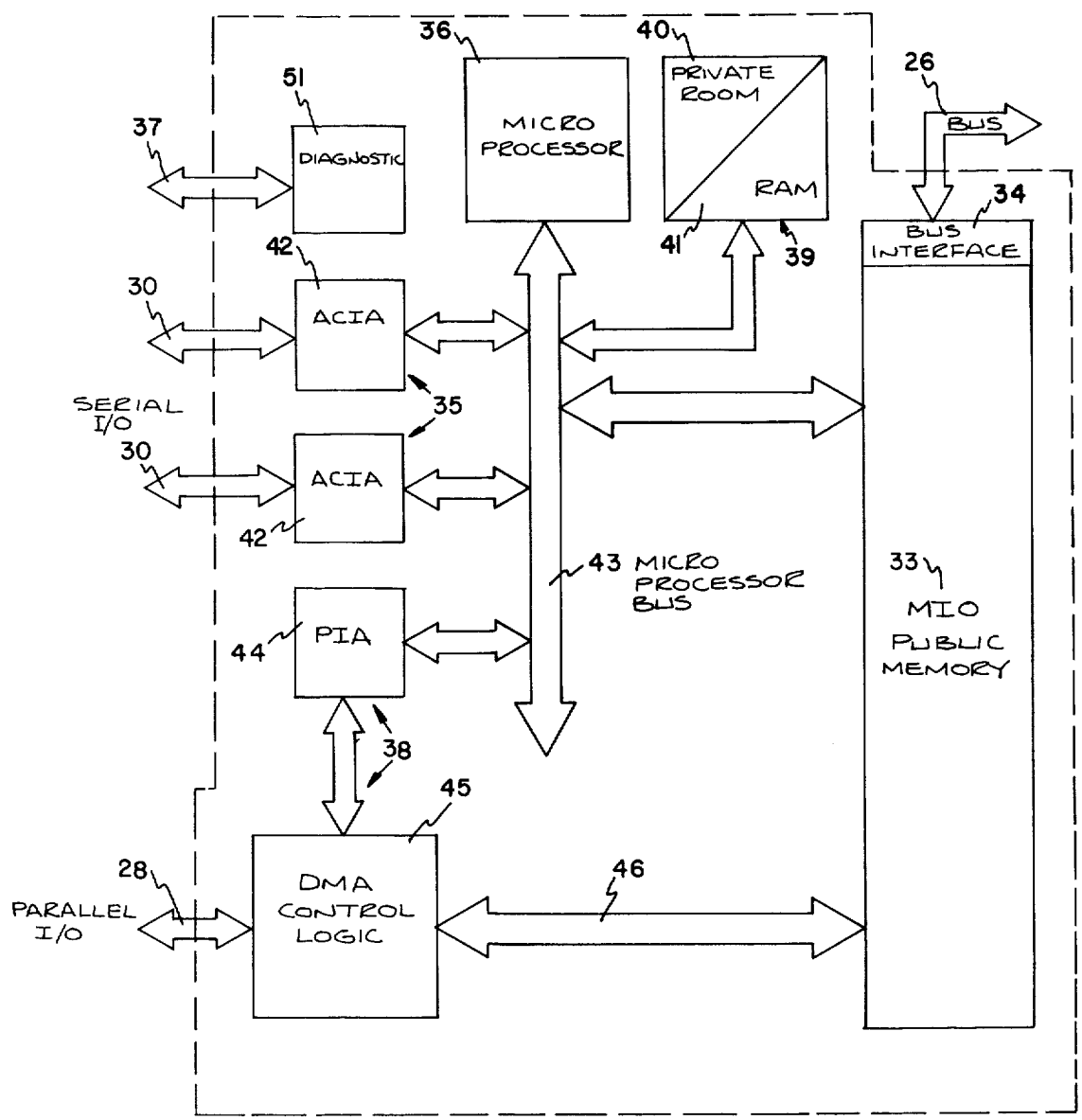
Figure 6C:
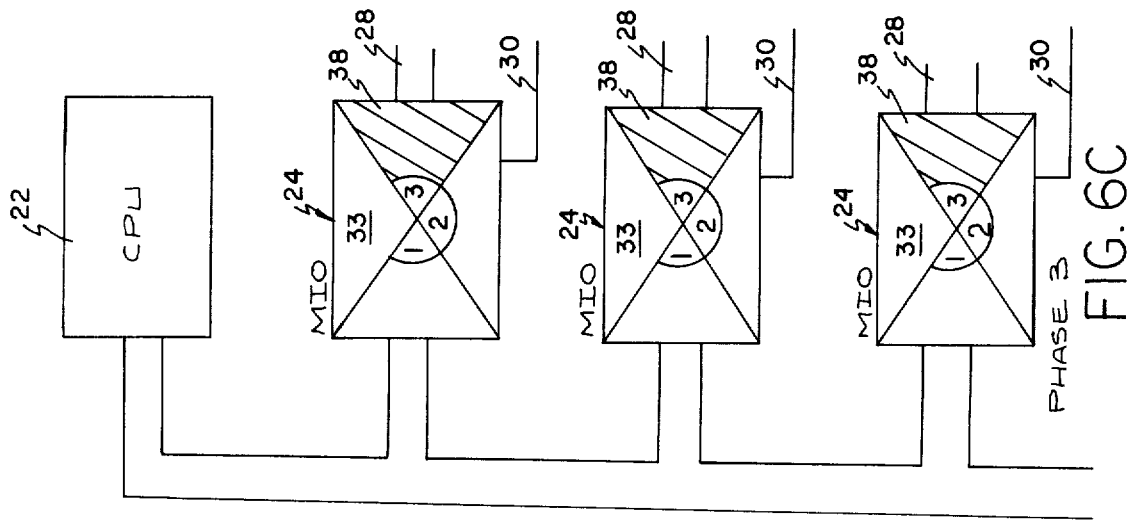
Figure 6B:
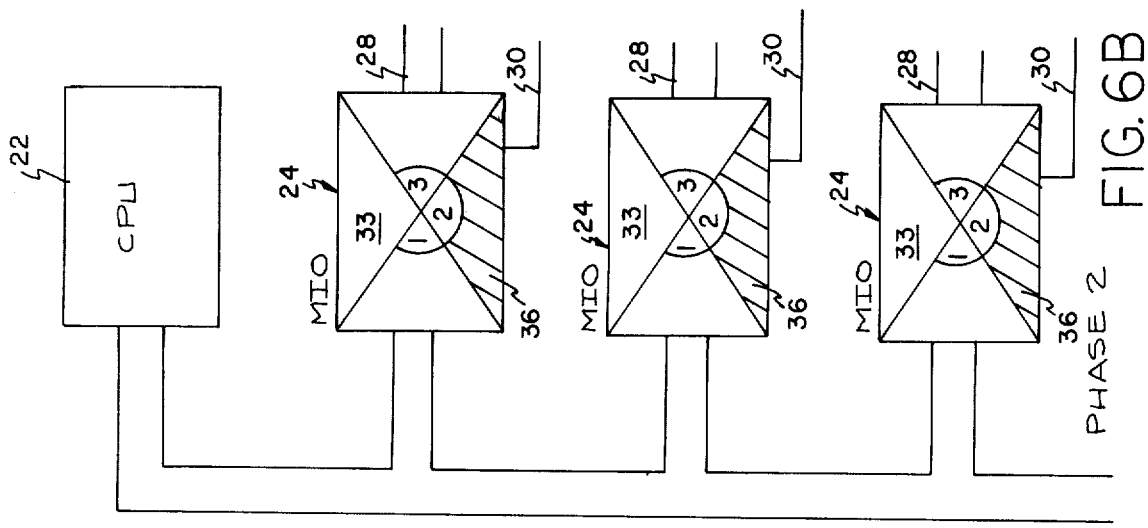
Figure 6A:
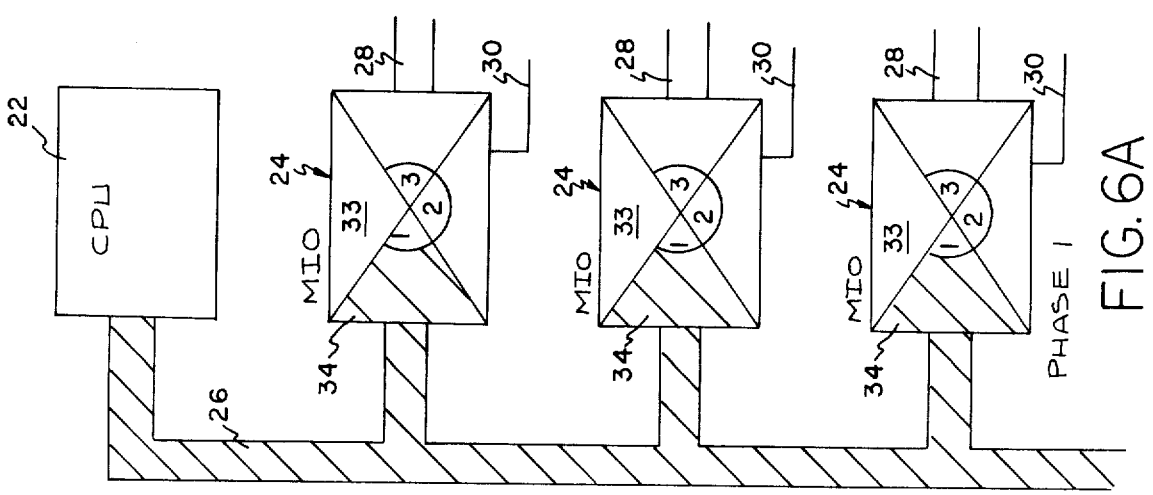
Figure 7:
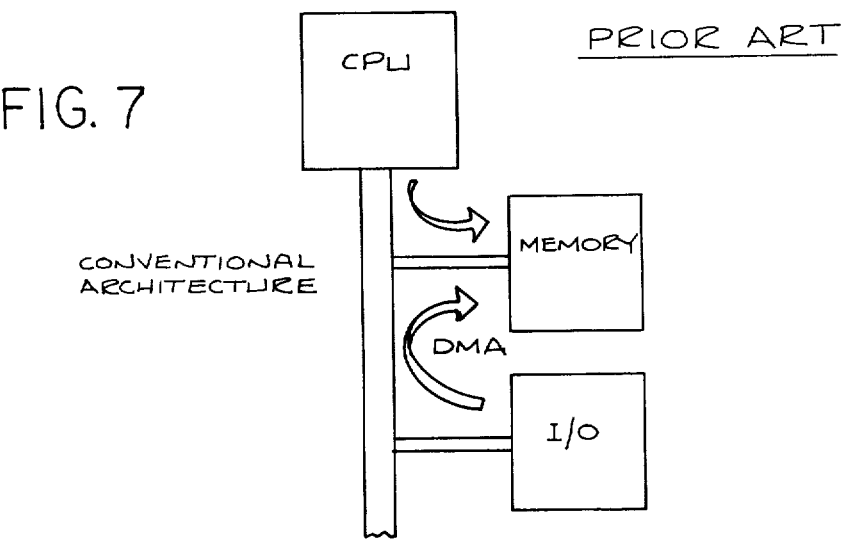
Figure 8:
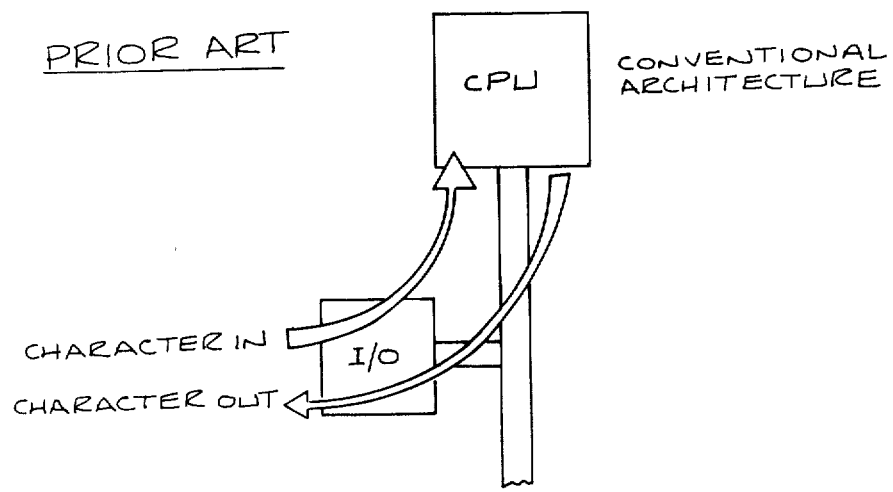
Figure 9:
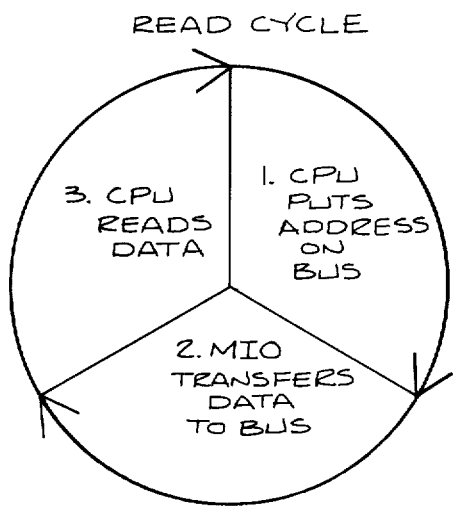
Figure 10:
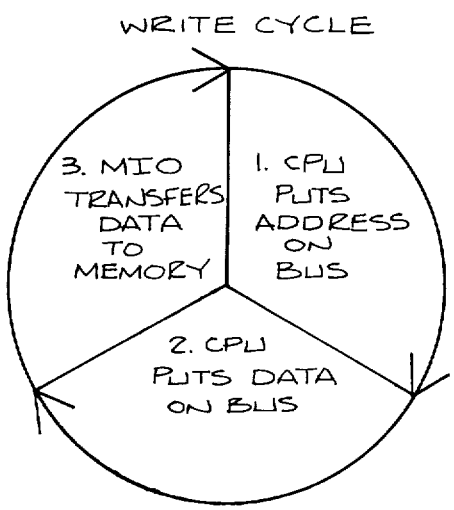
Figure 11:
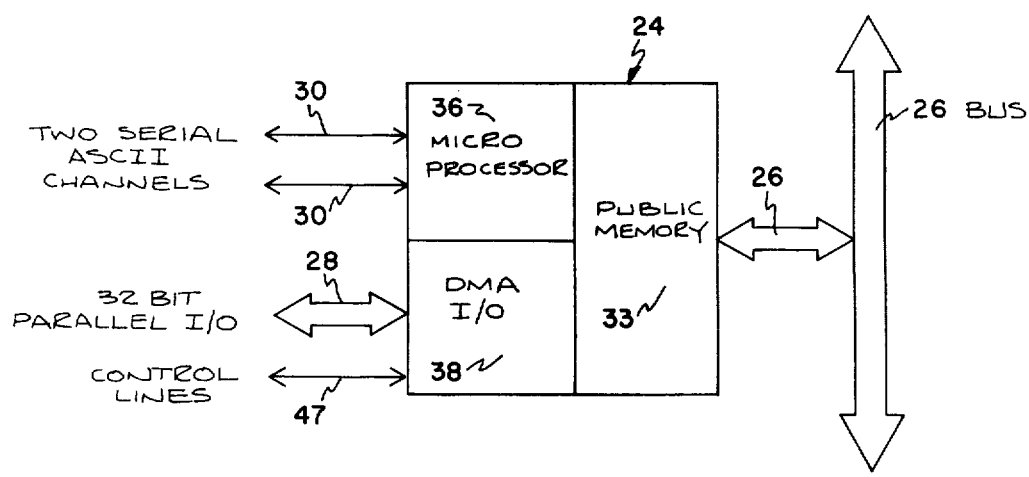
Figure 12:
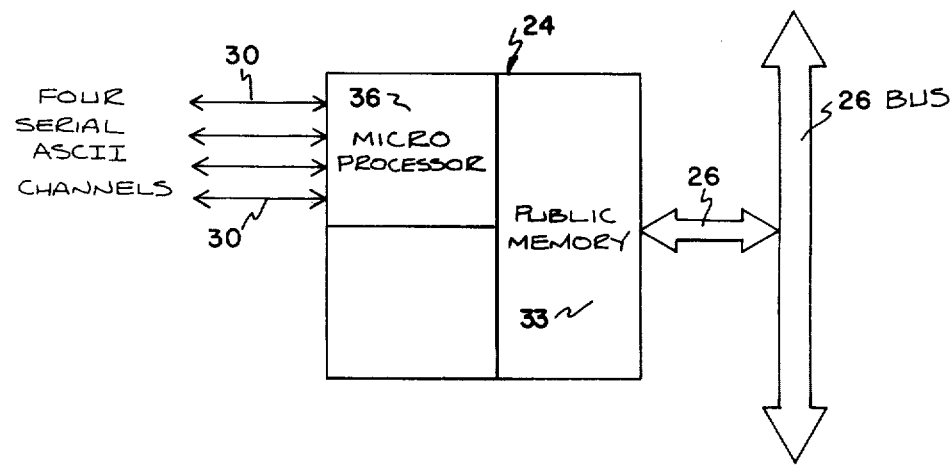
Figure 14:
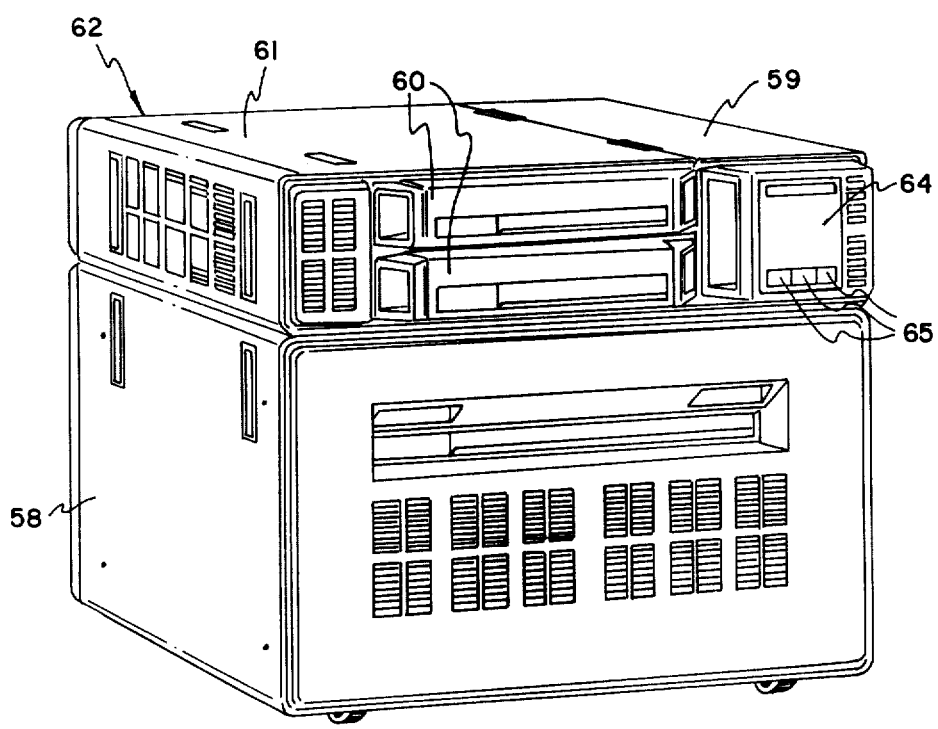
Figure 15:
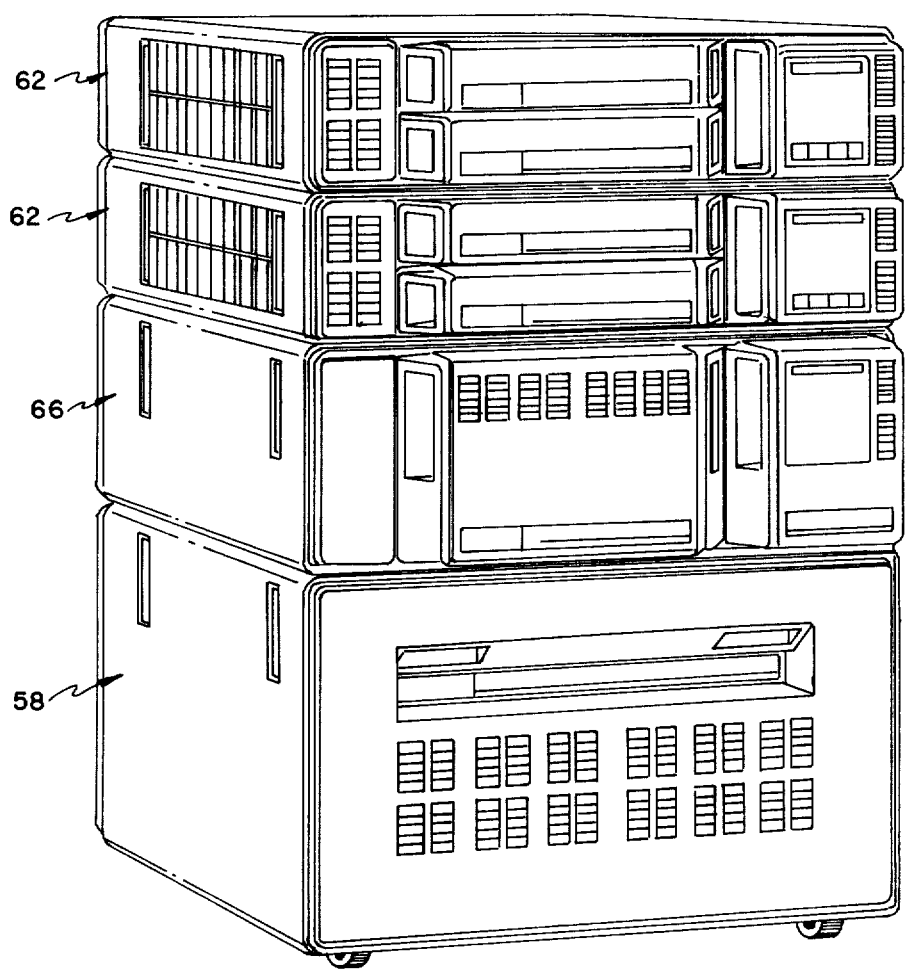
Figure 16:
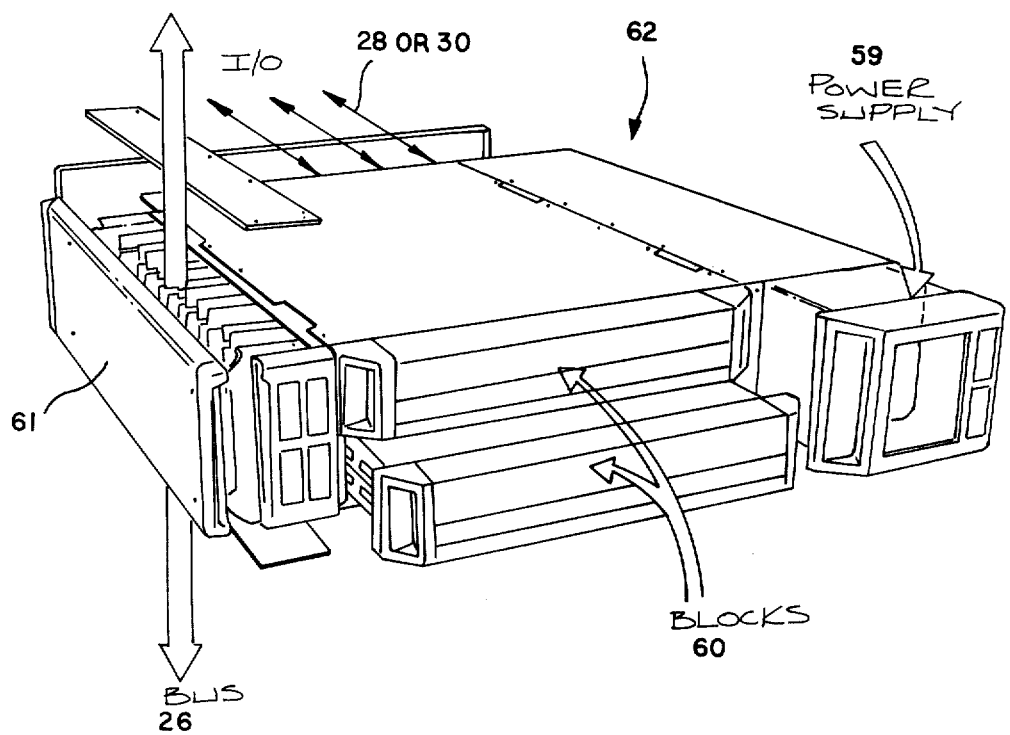
Figure 17:
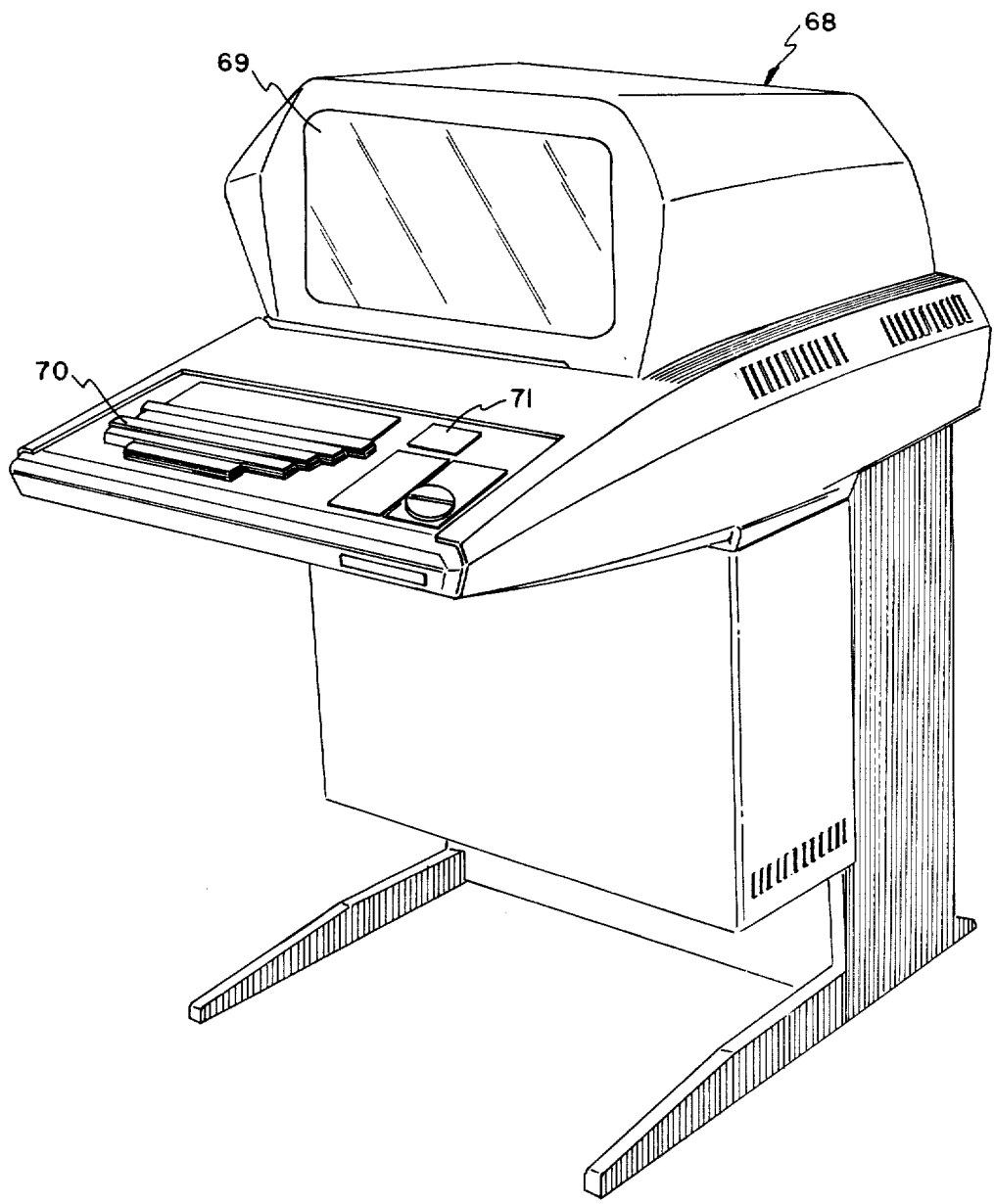
Figure 18:
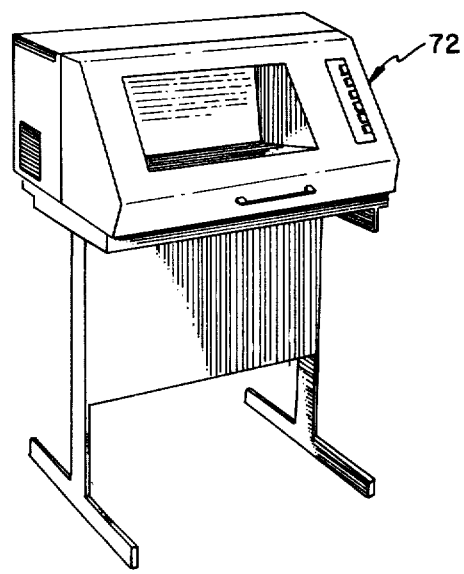
Figure 19:
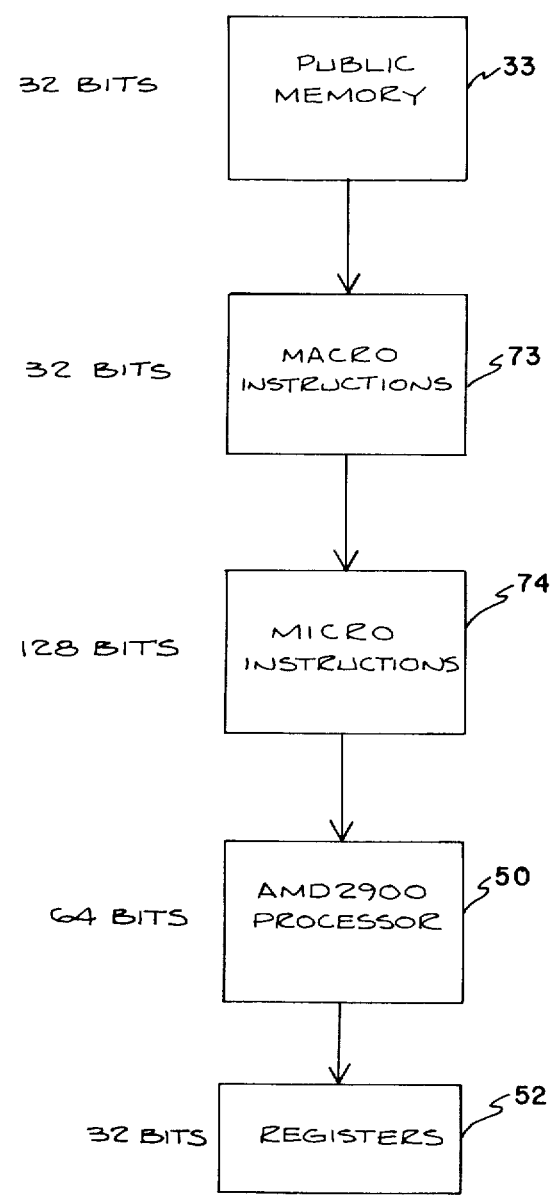
Figure 22:
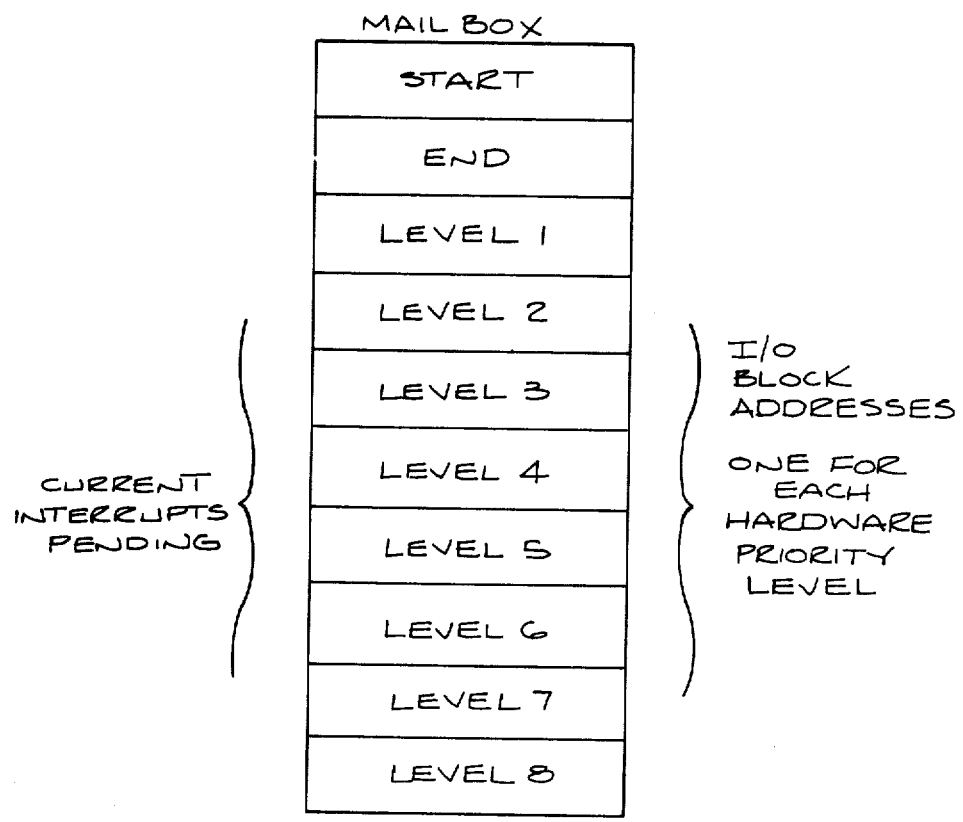
Figure 23:
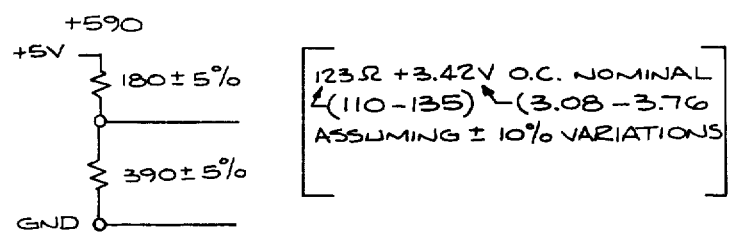
Figure 25:
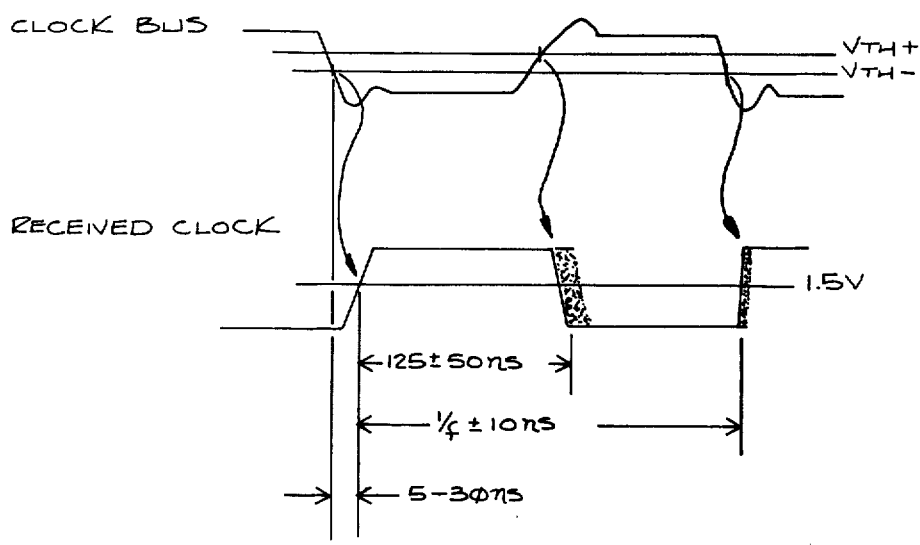
Figure 26:
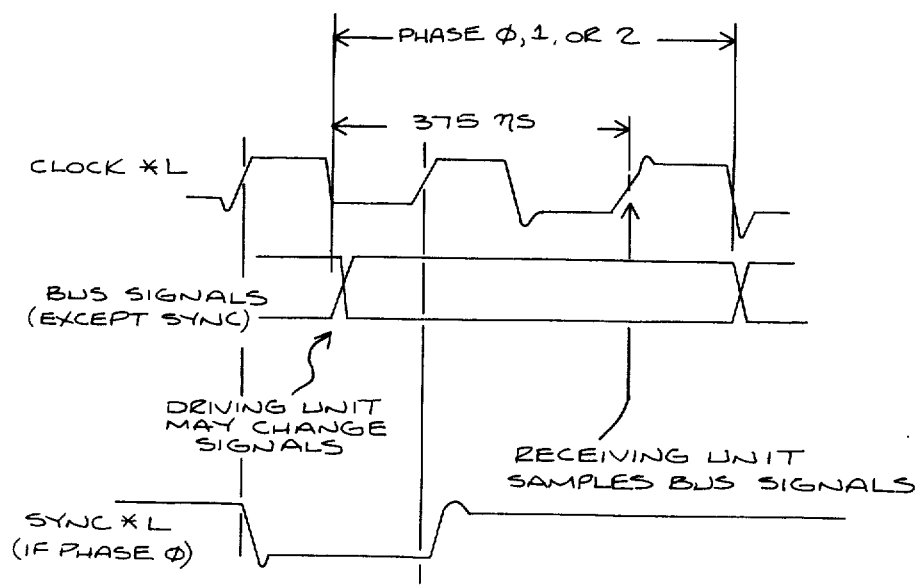
Figure 29:
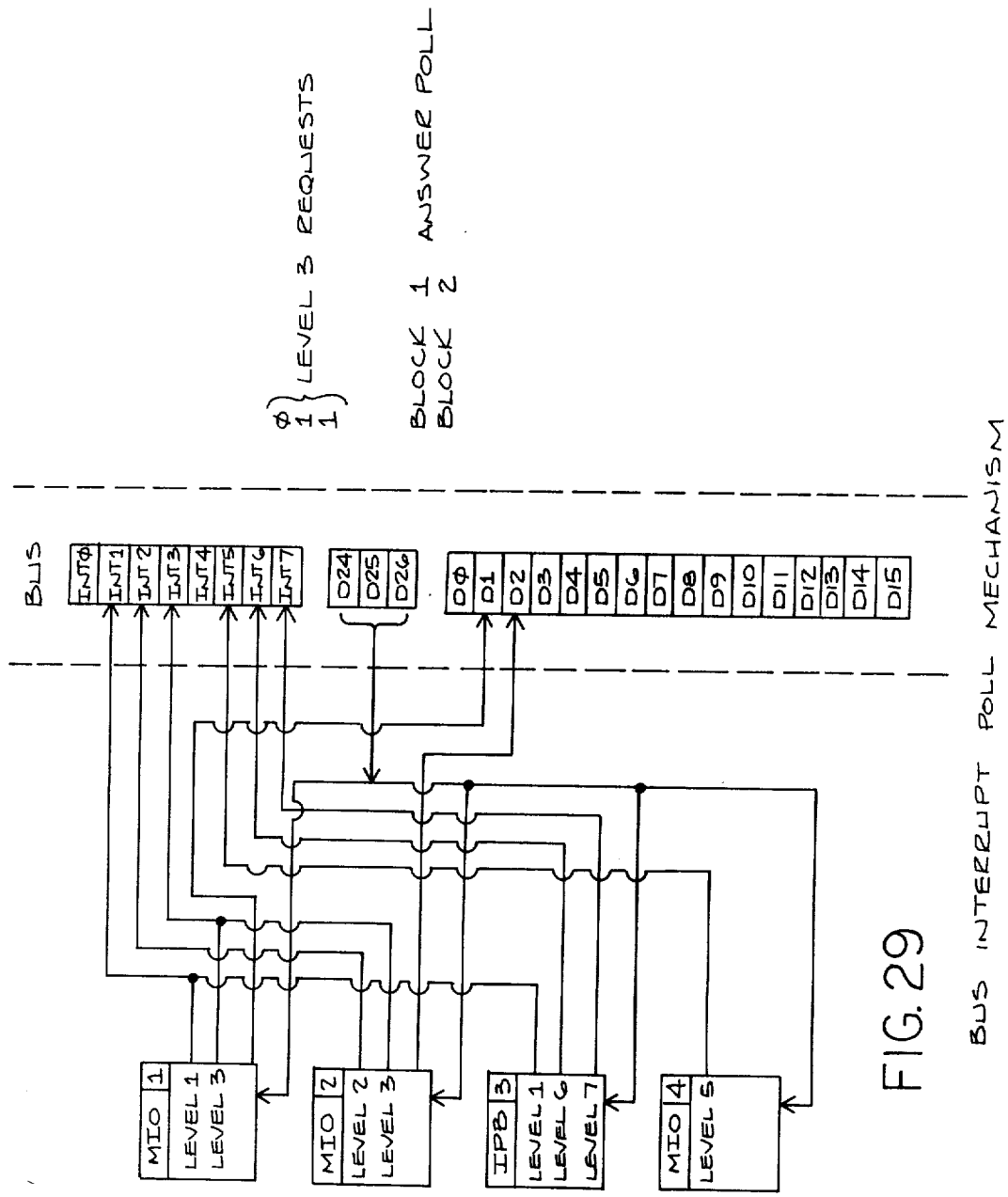
Figure 30:
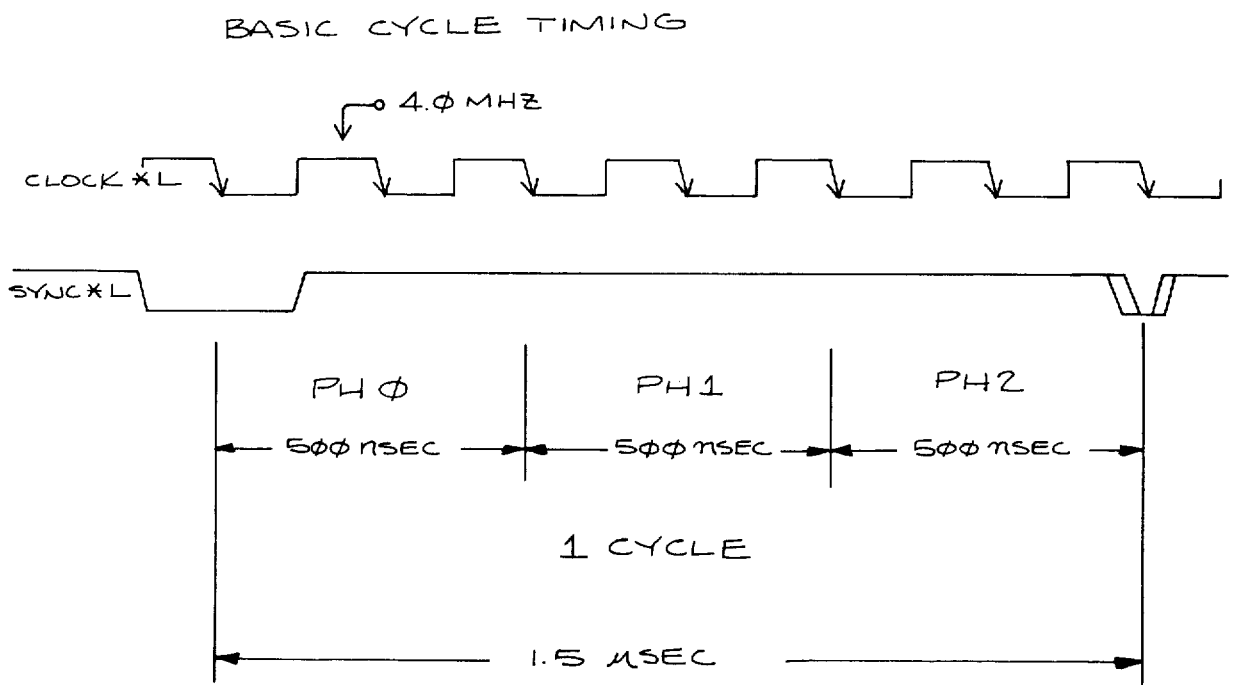
Figure 31:
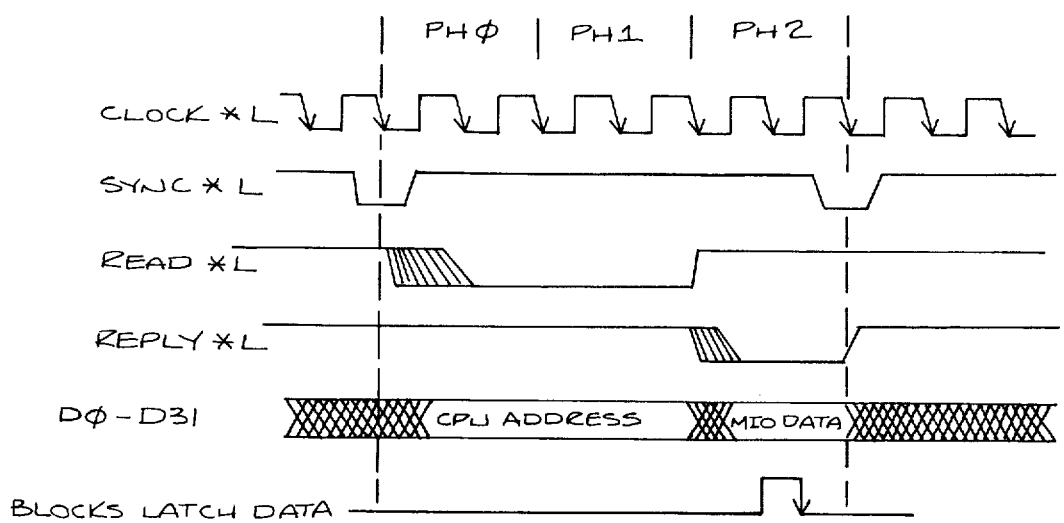
Figure 32:
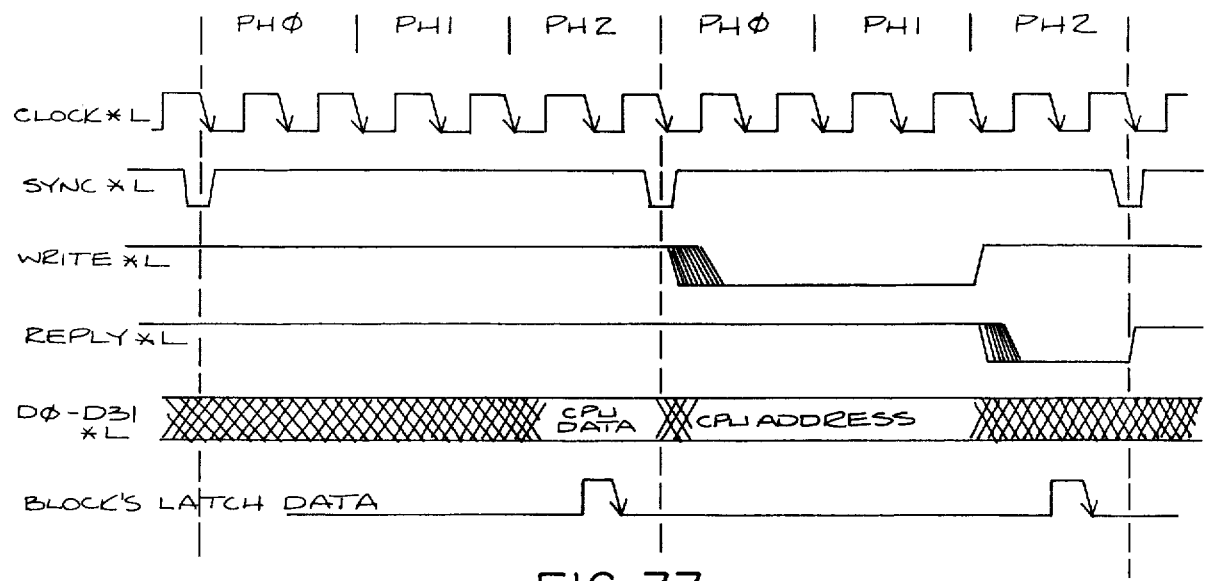
Figure 33:
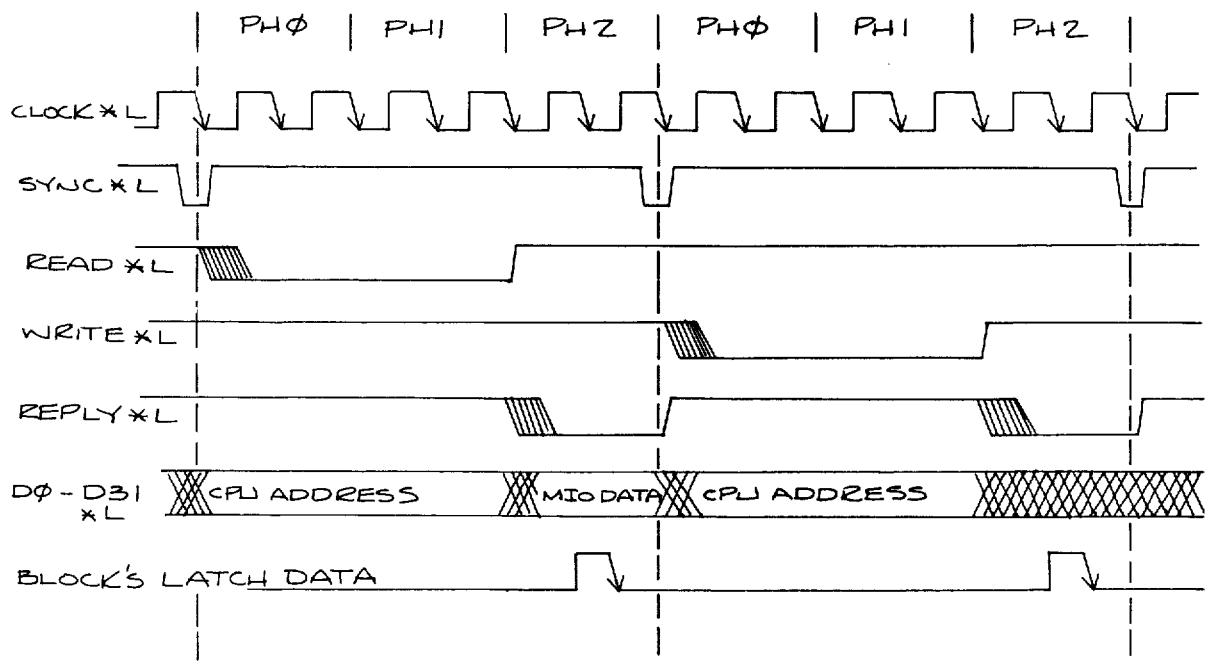
Figure 34:
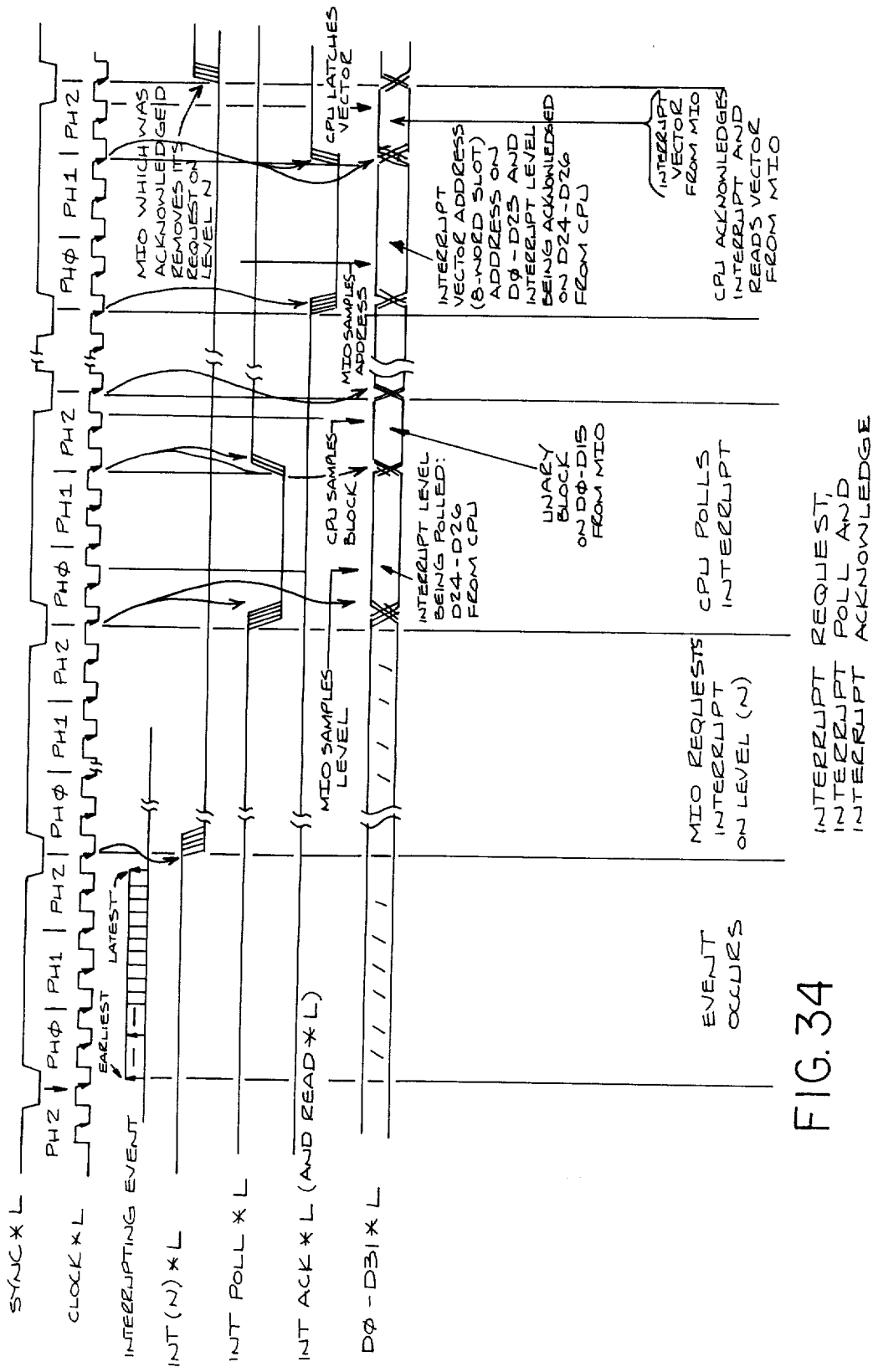
Figure 35:
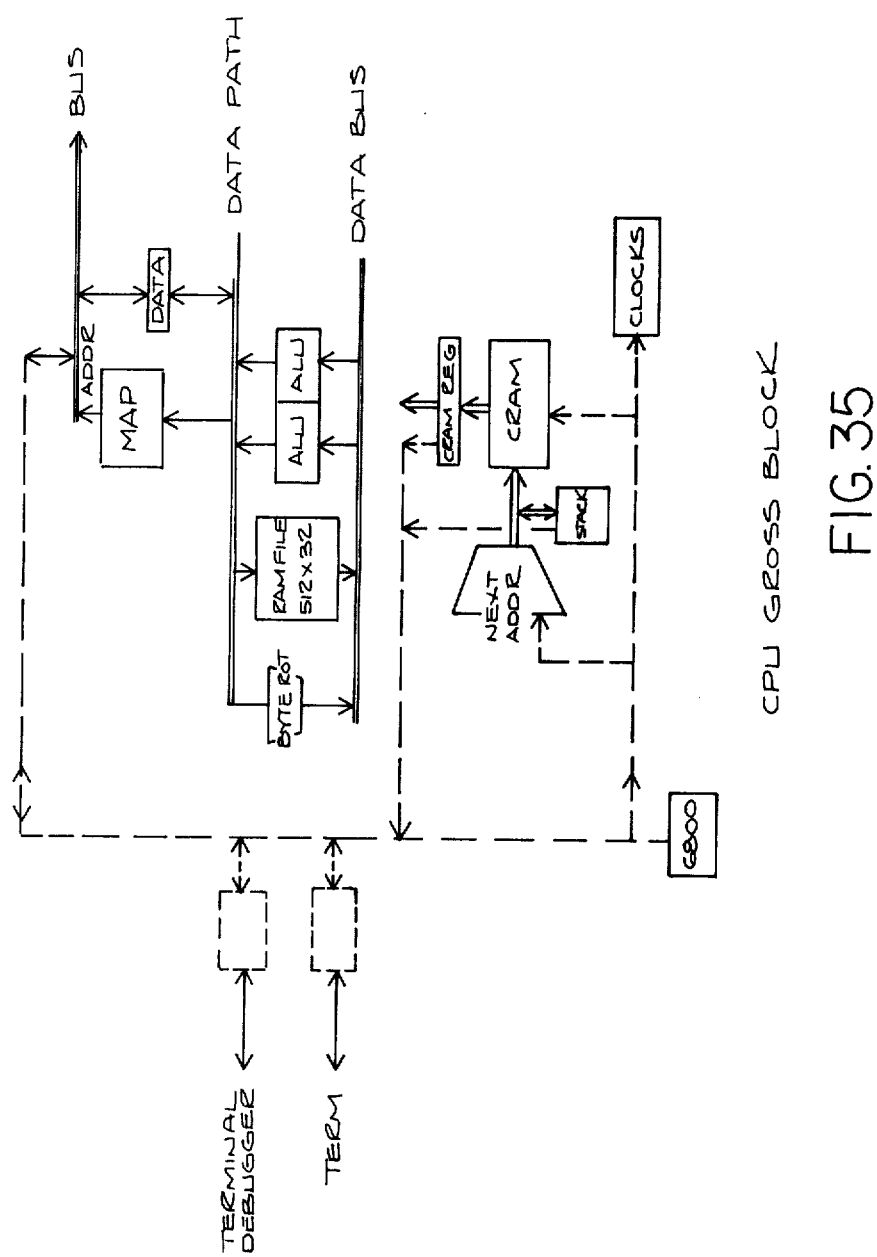
Figure 36:
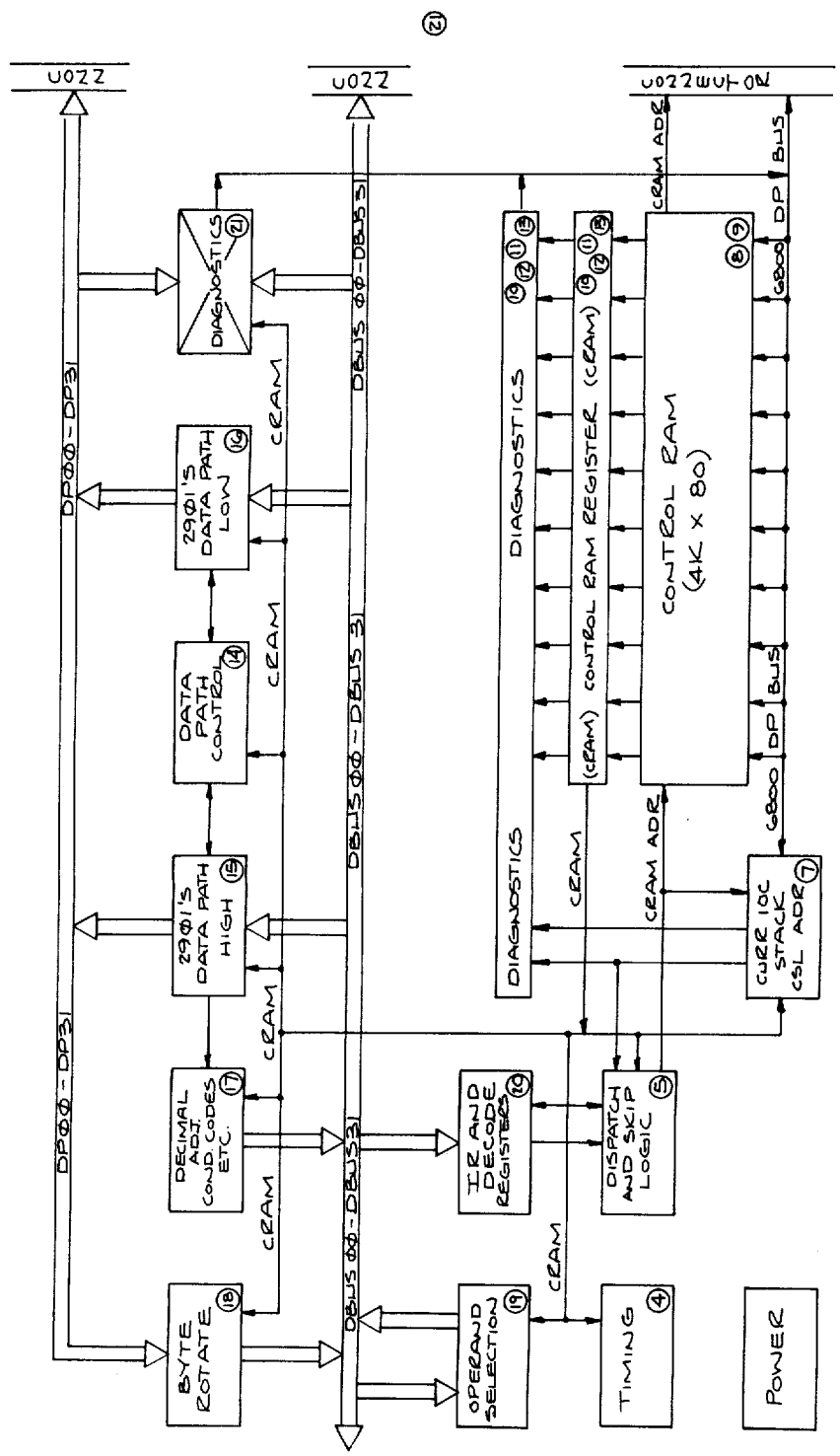
Figure 37:
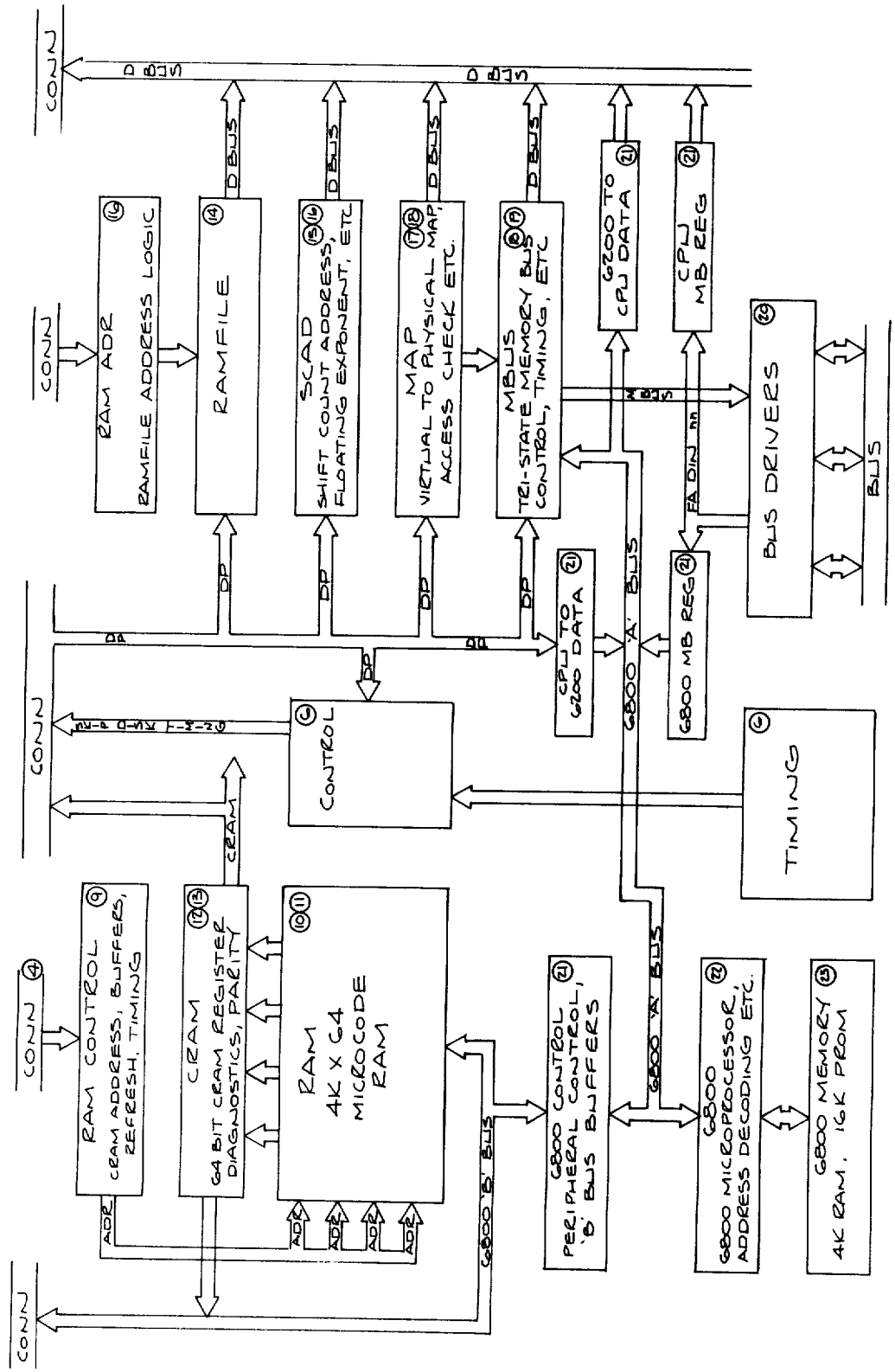
Figure 38:
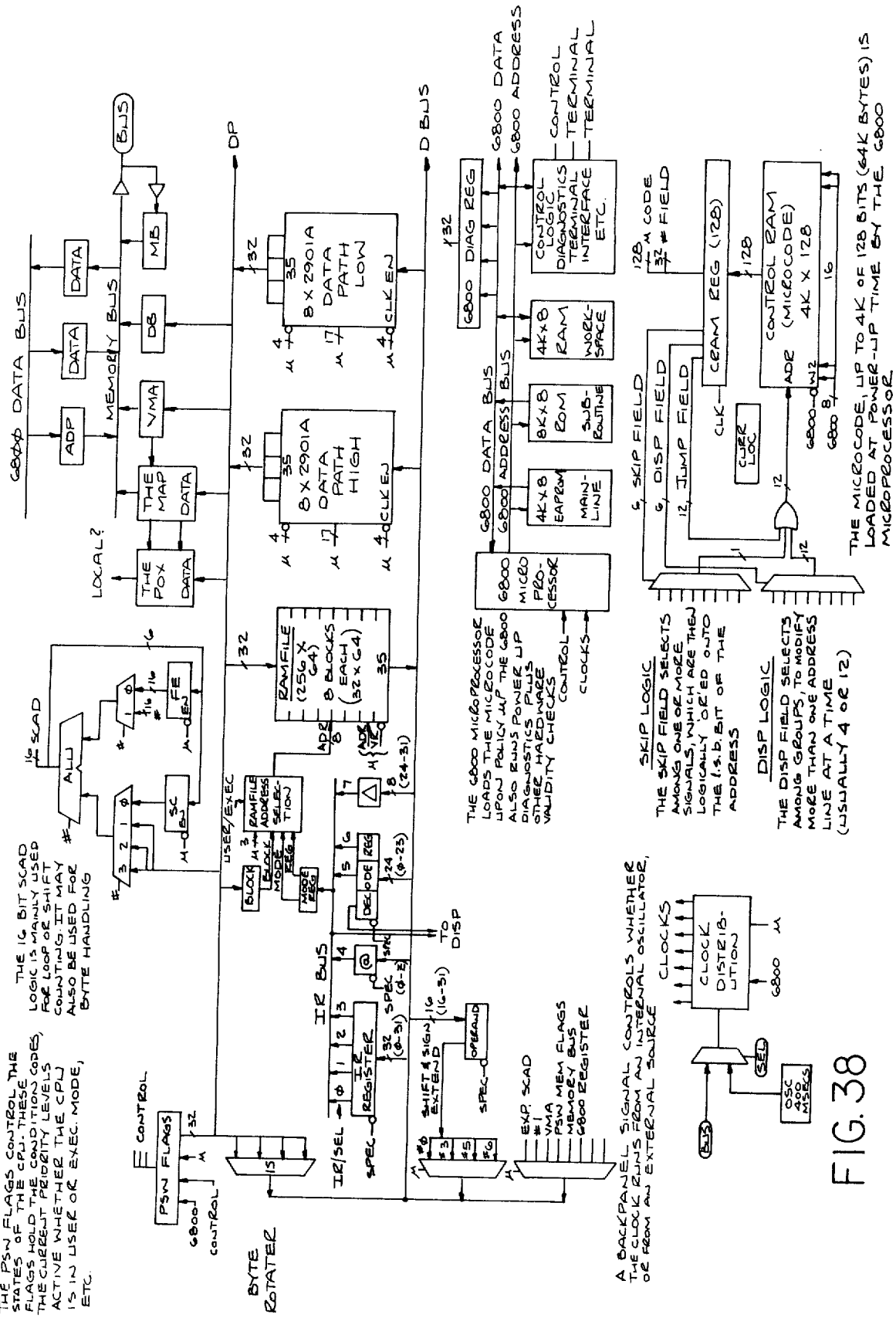
Figure 39:
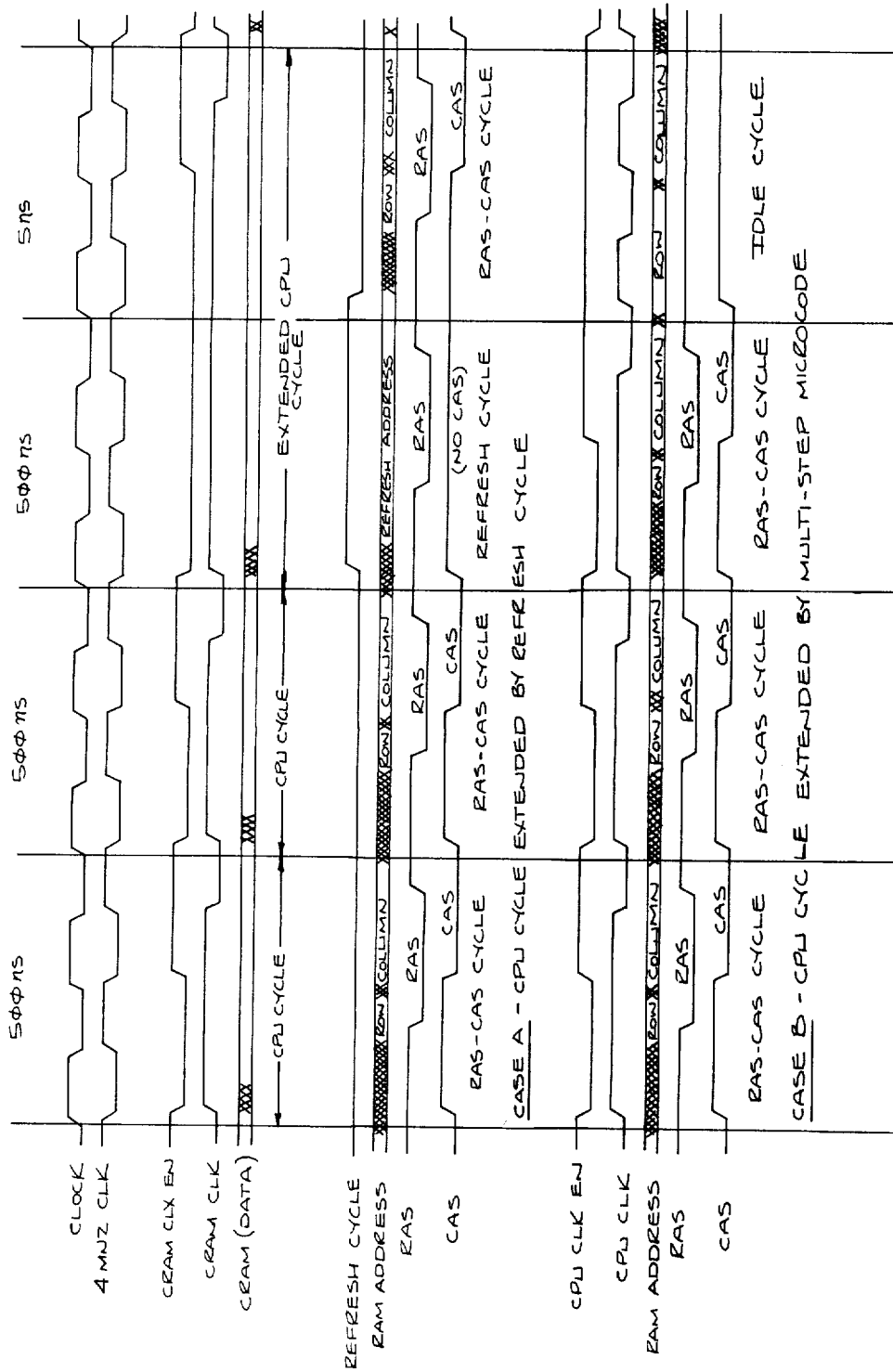
Figure 41:
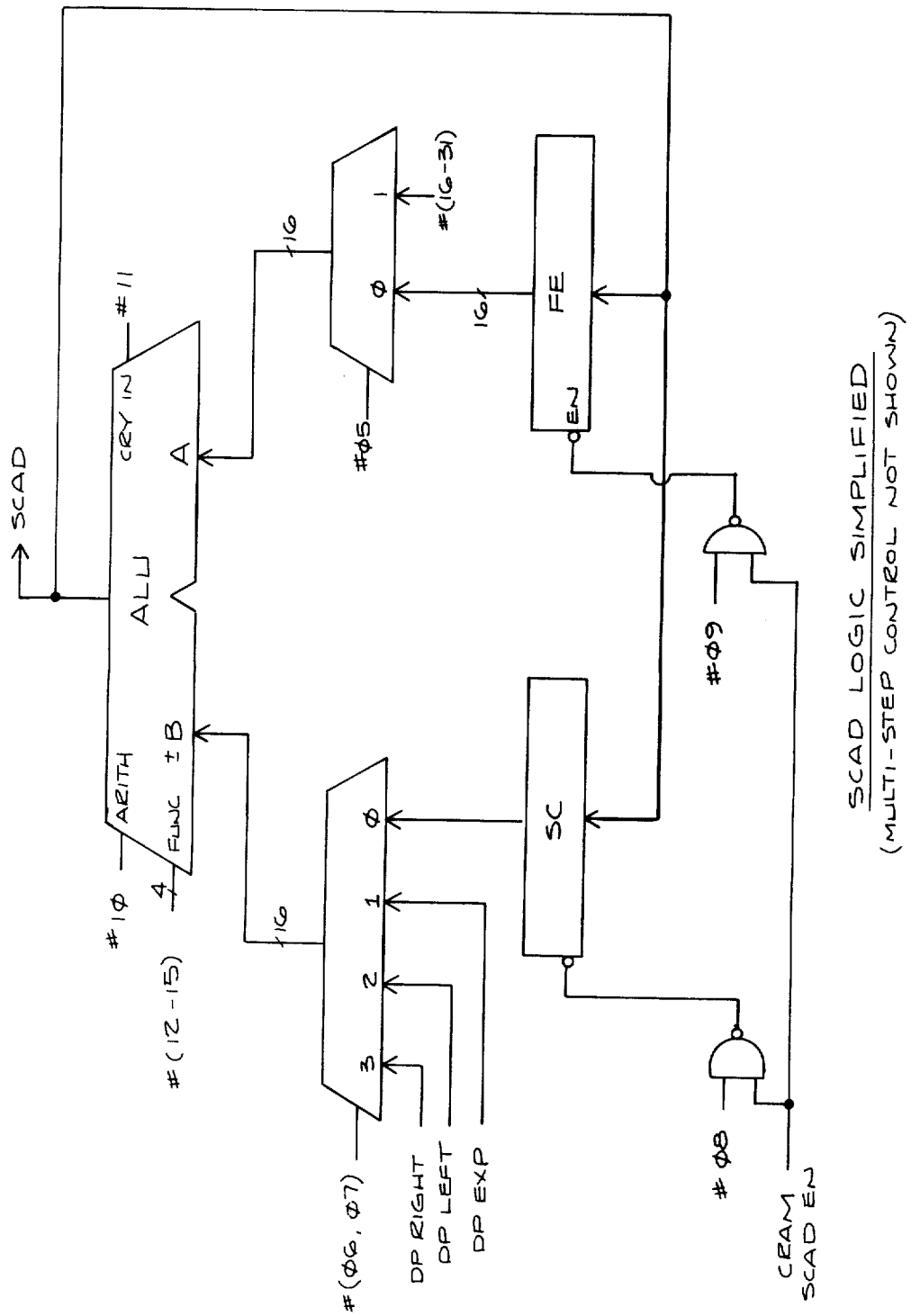
Figure 42:
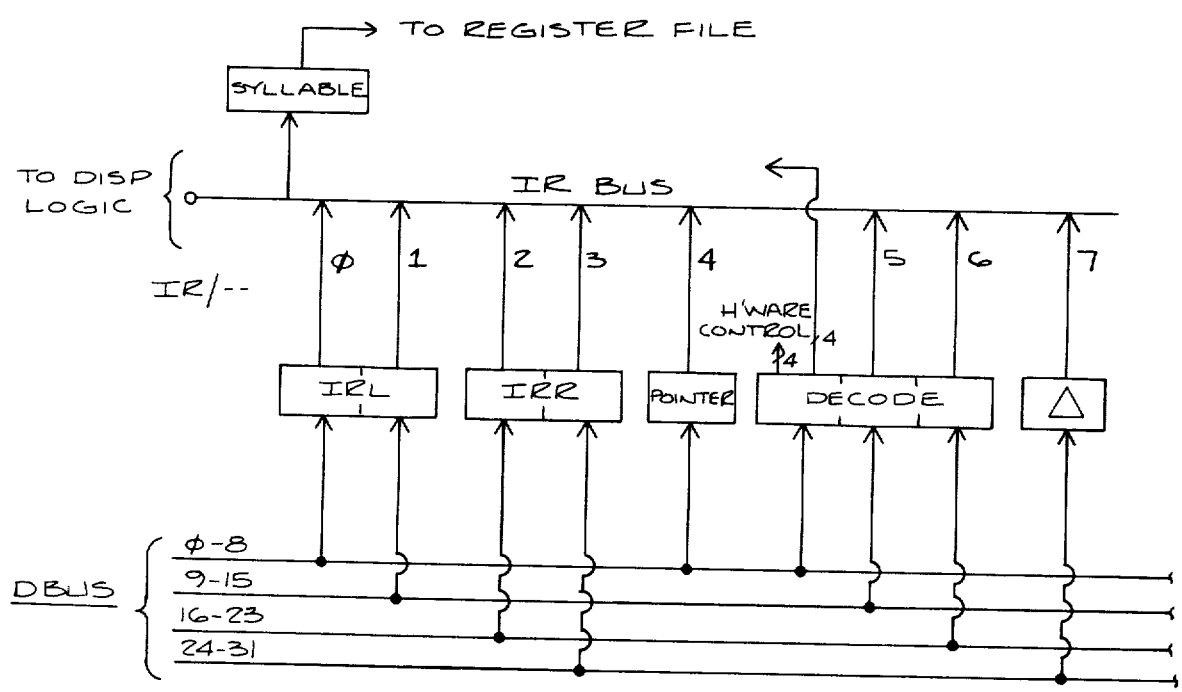
Figure 43:
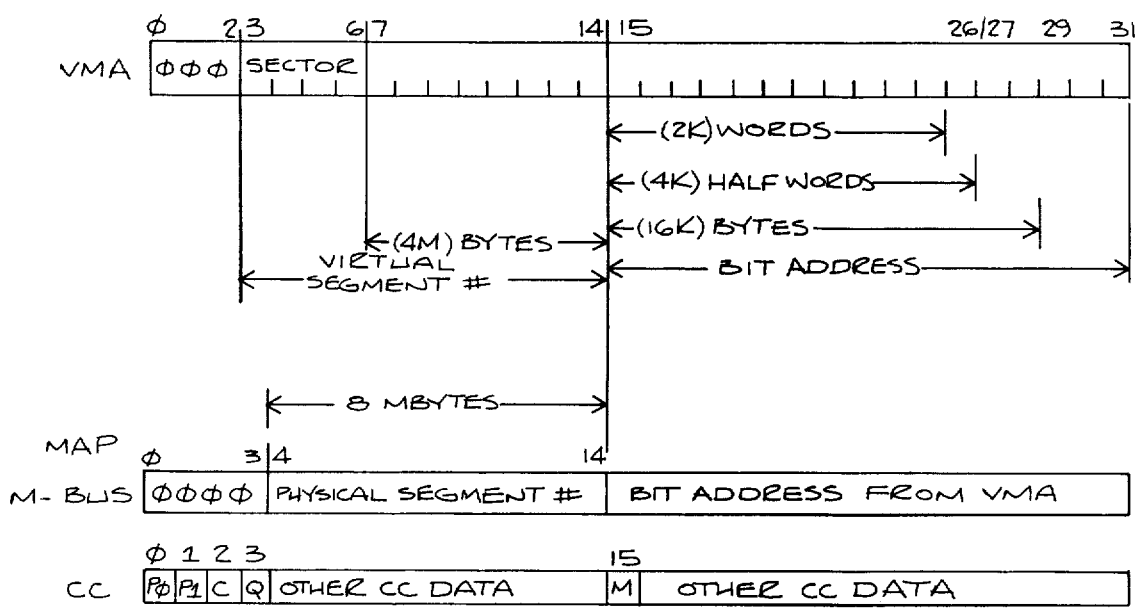
Figure 44:
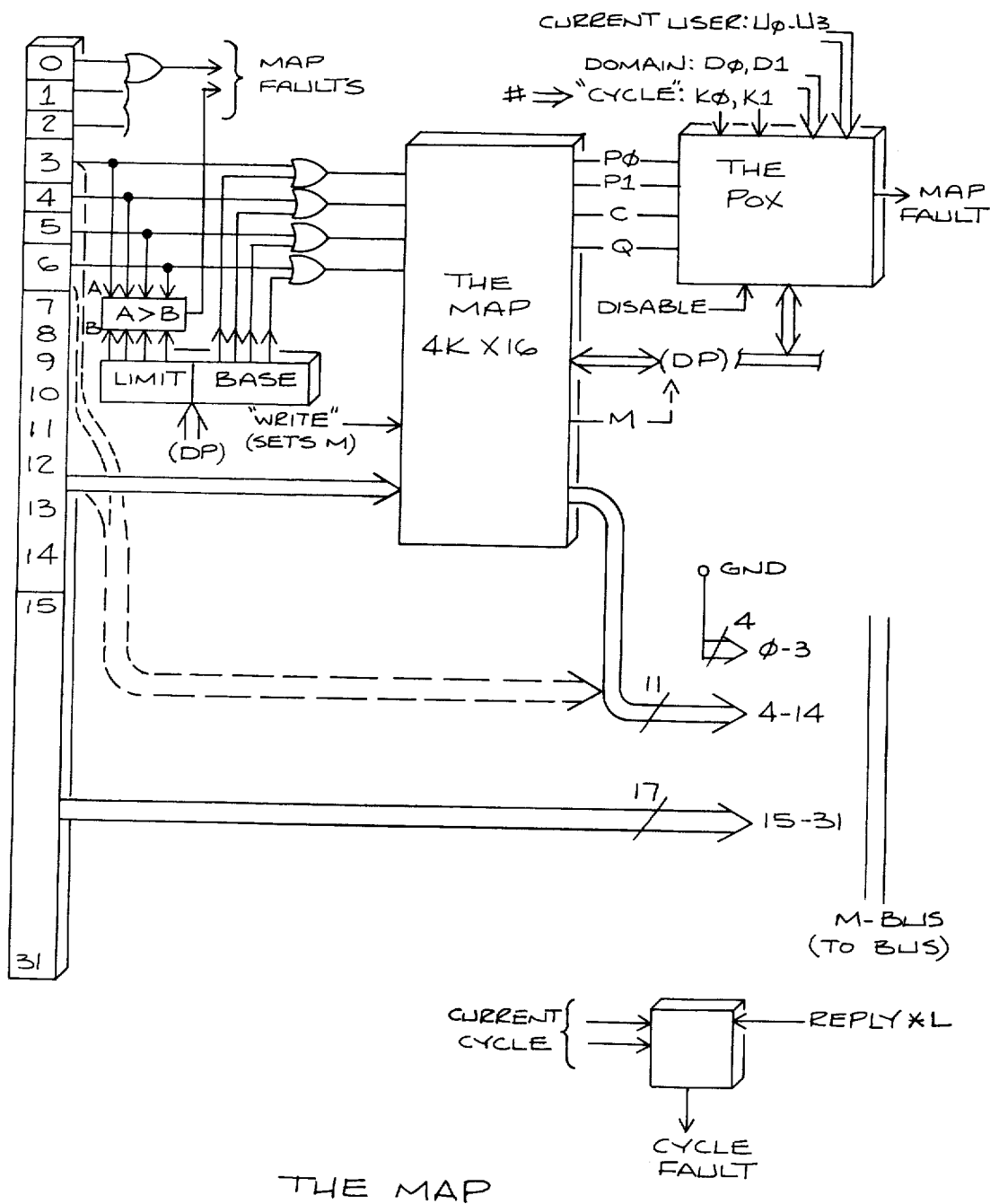
Figure 45:
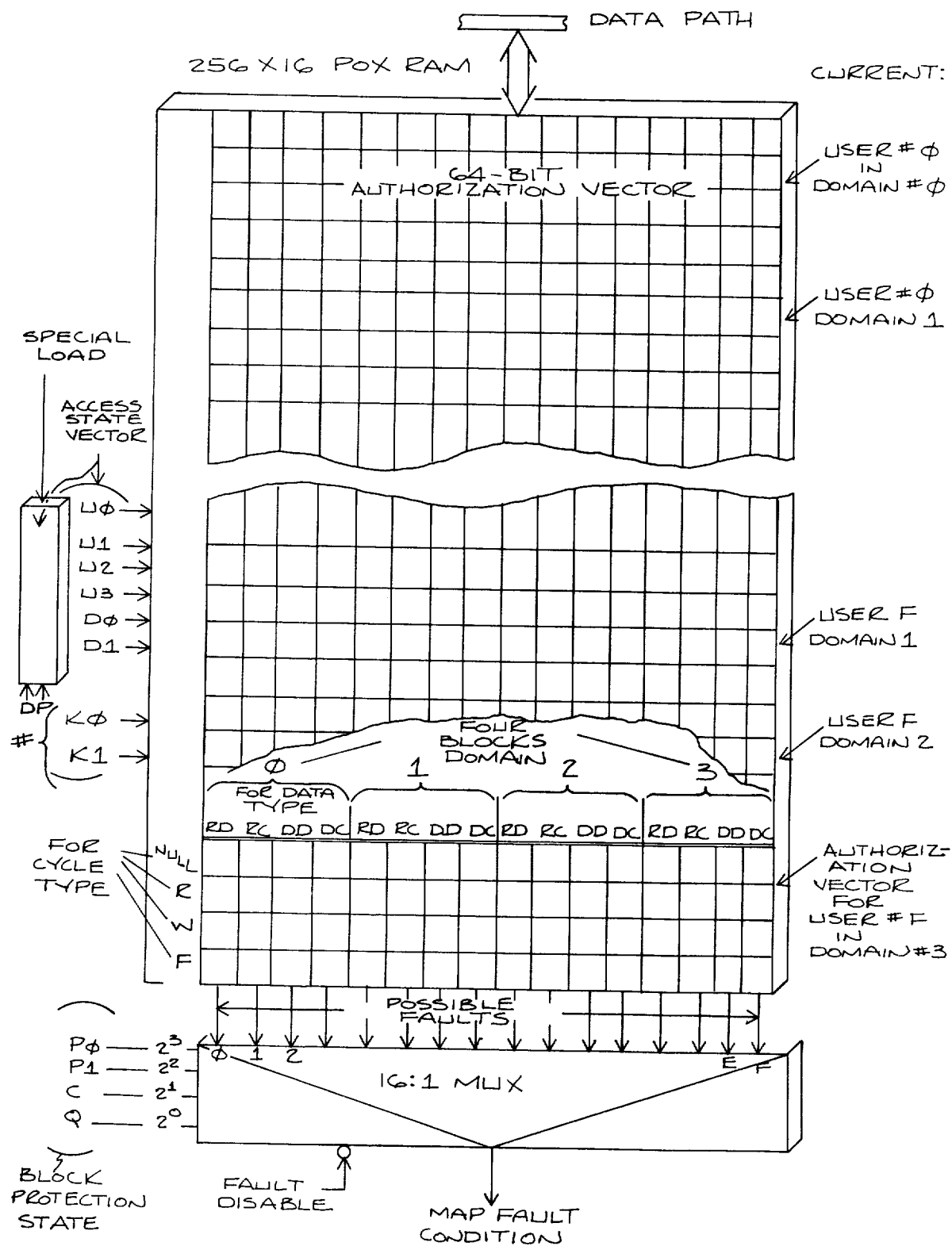
Figure 46:
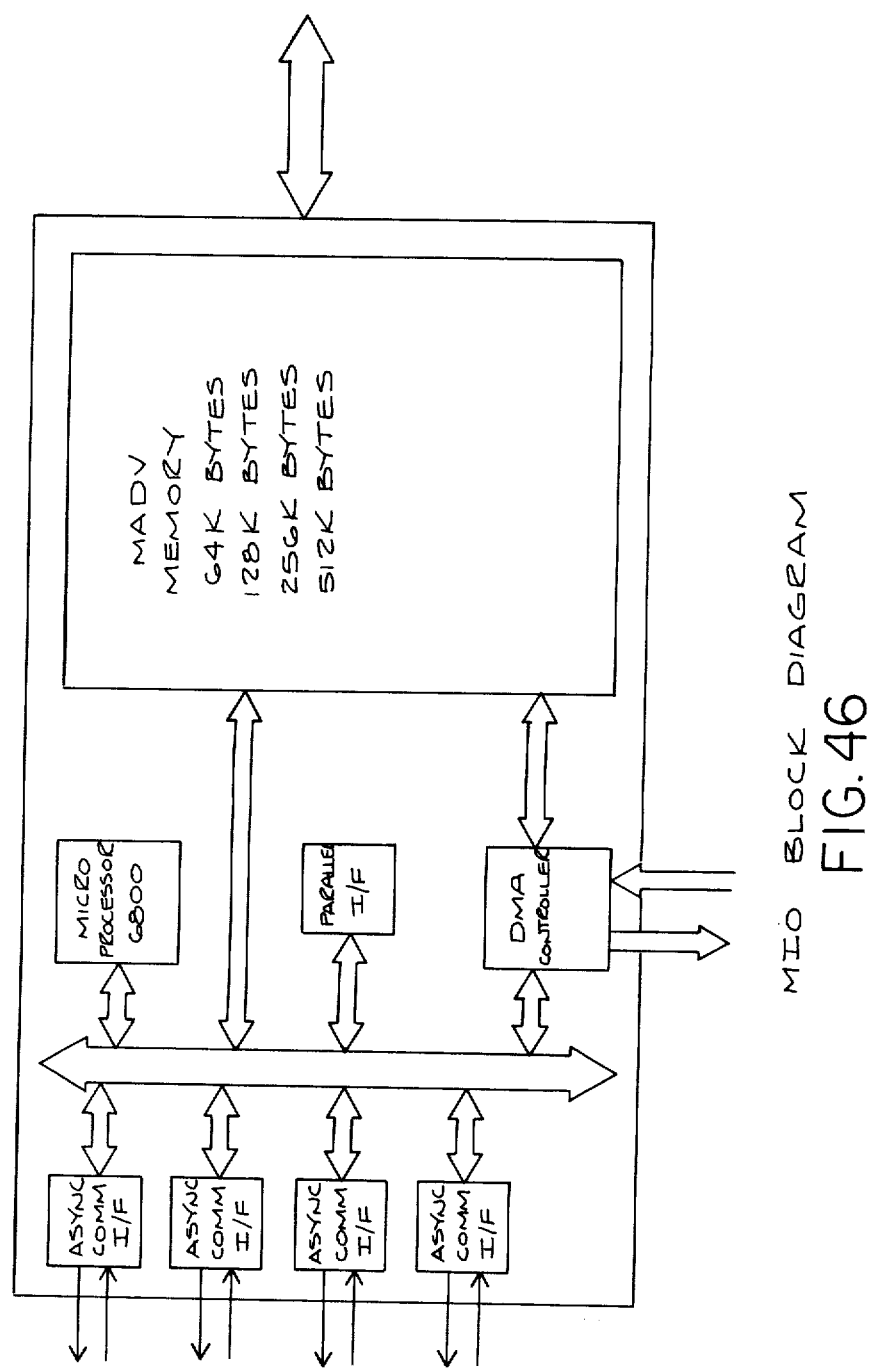
Figure 47:
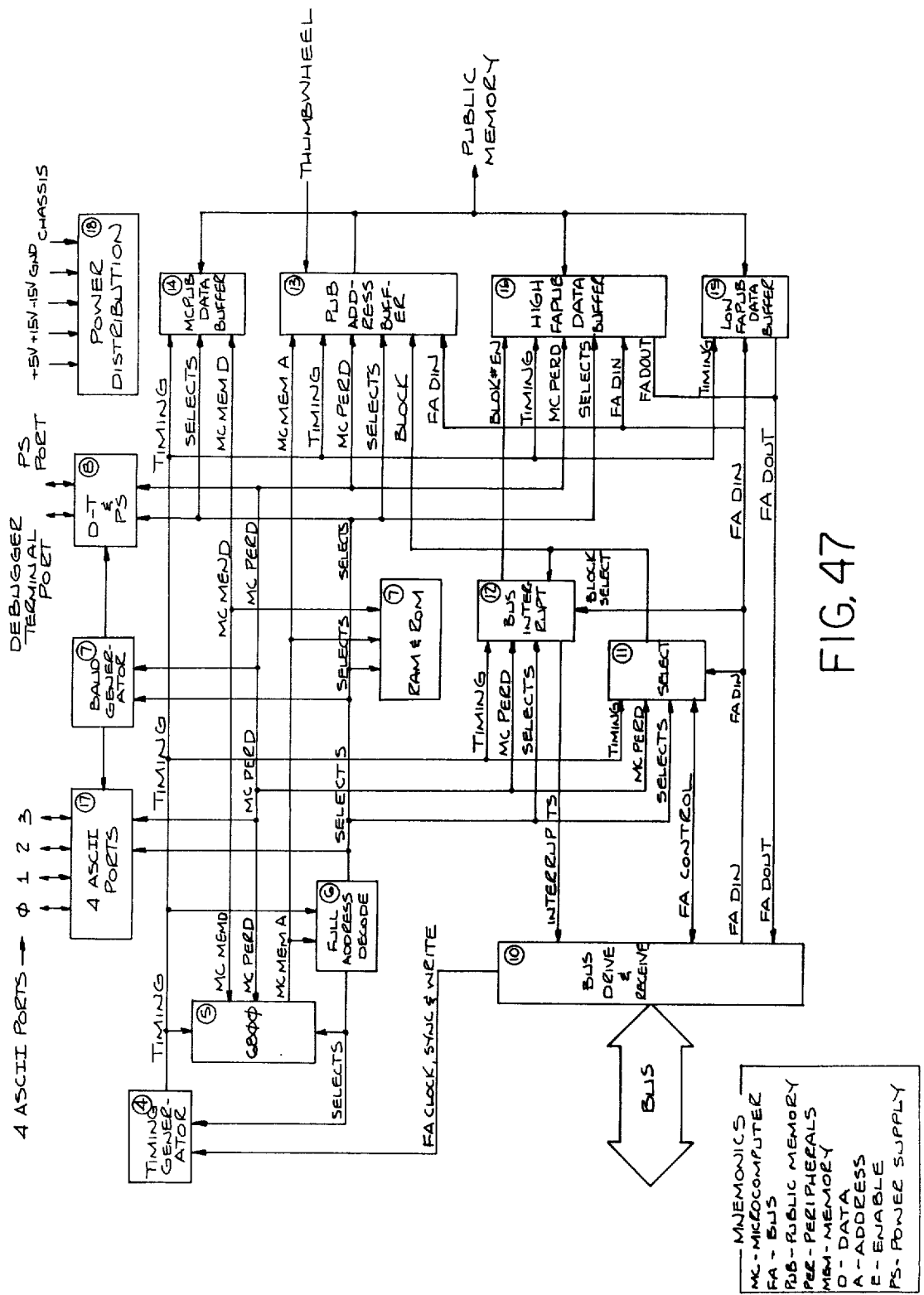
Figure 48:
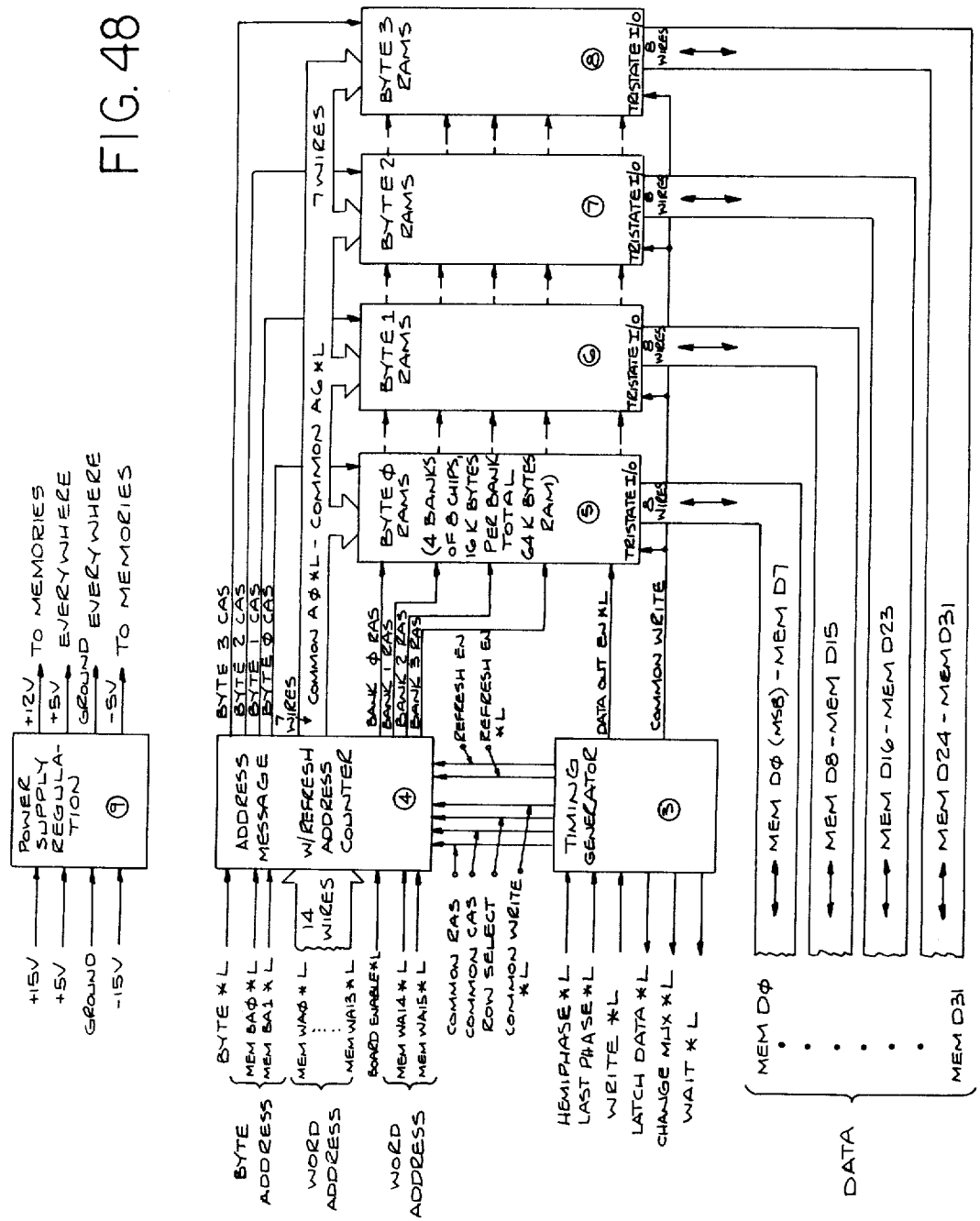
Figure 49:
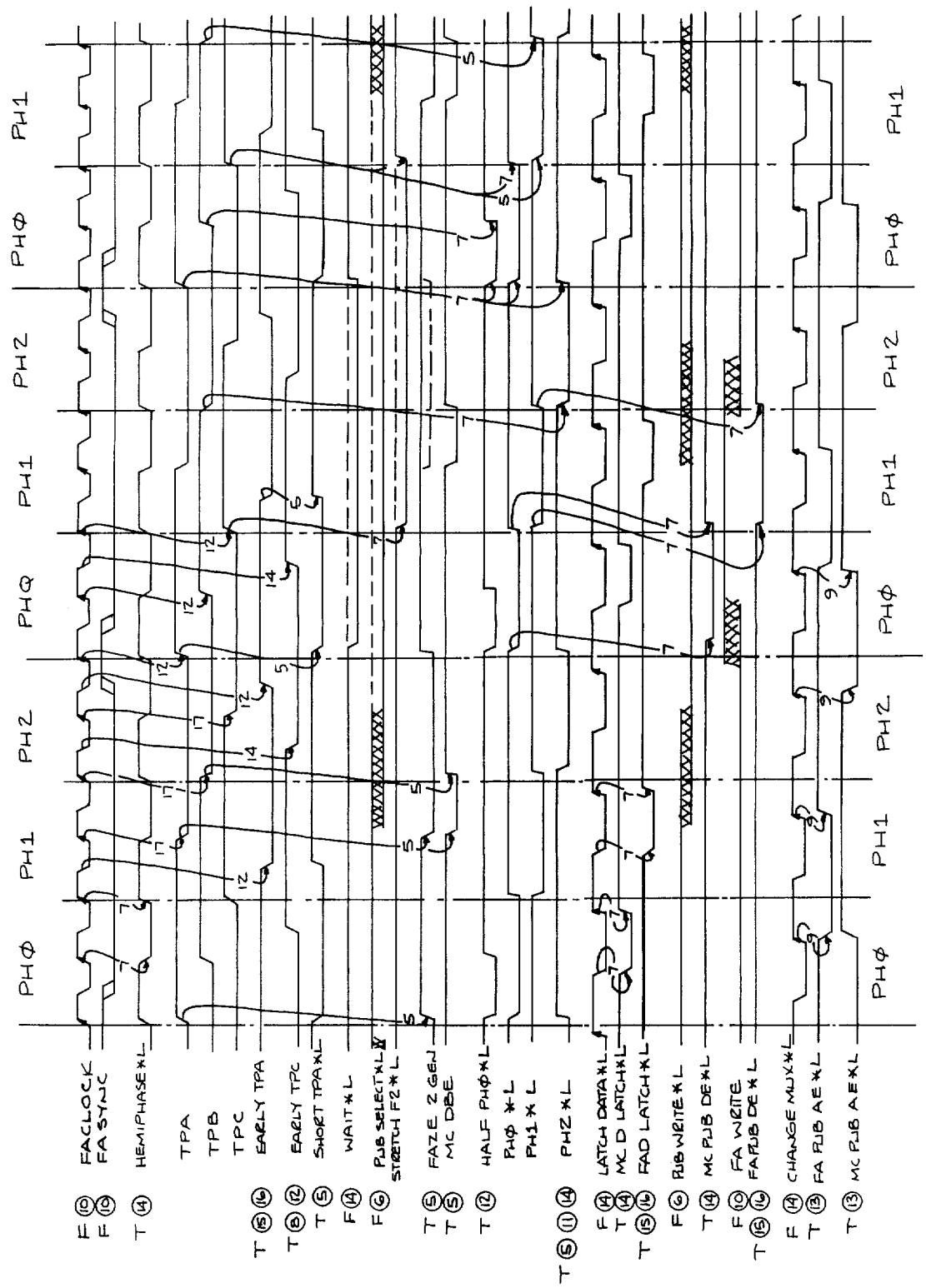
Figure 50:
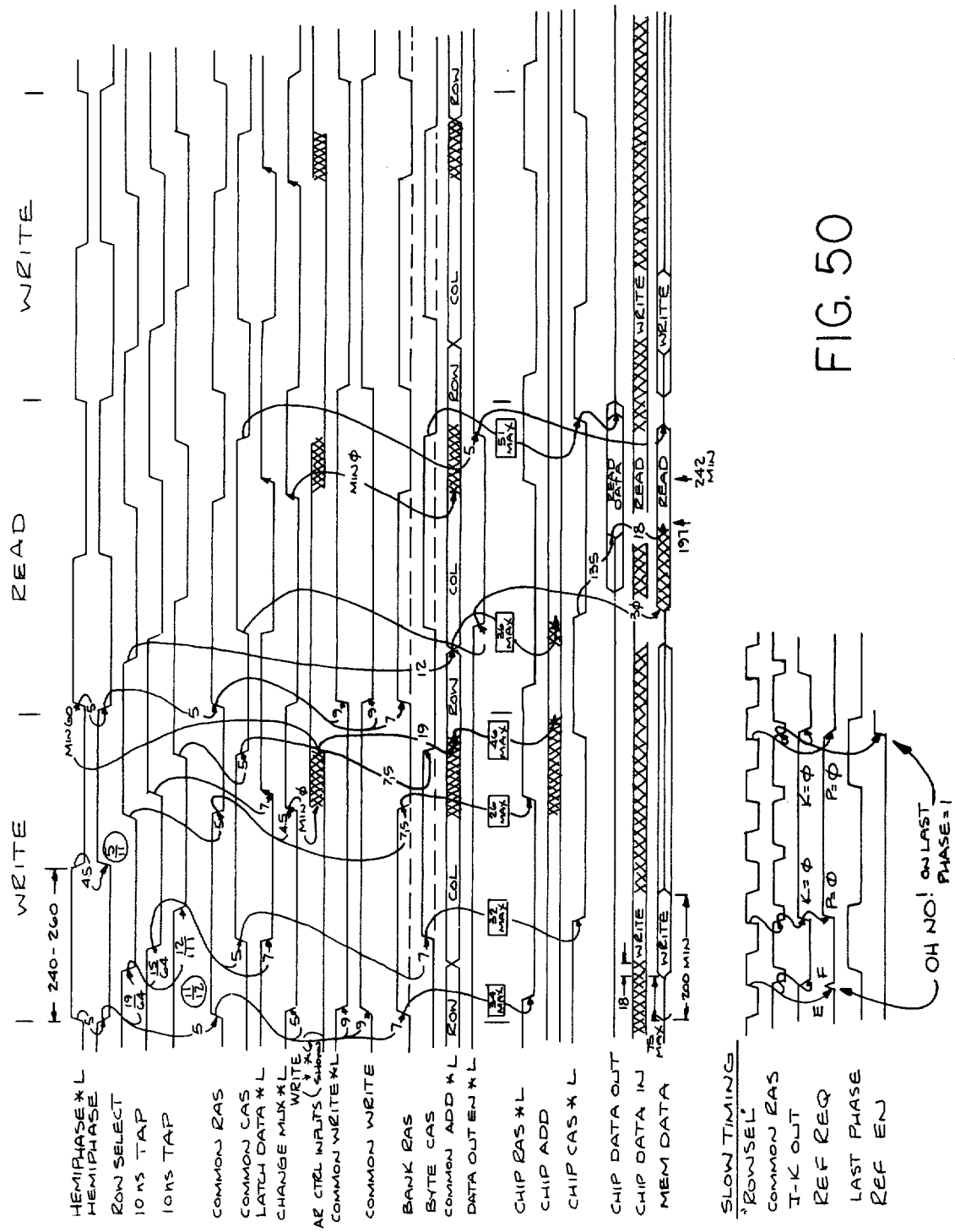
Figure 51:
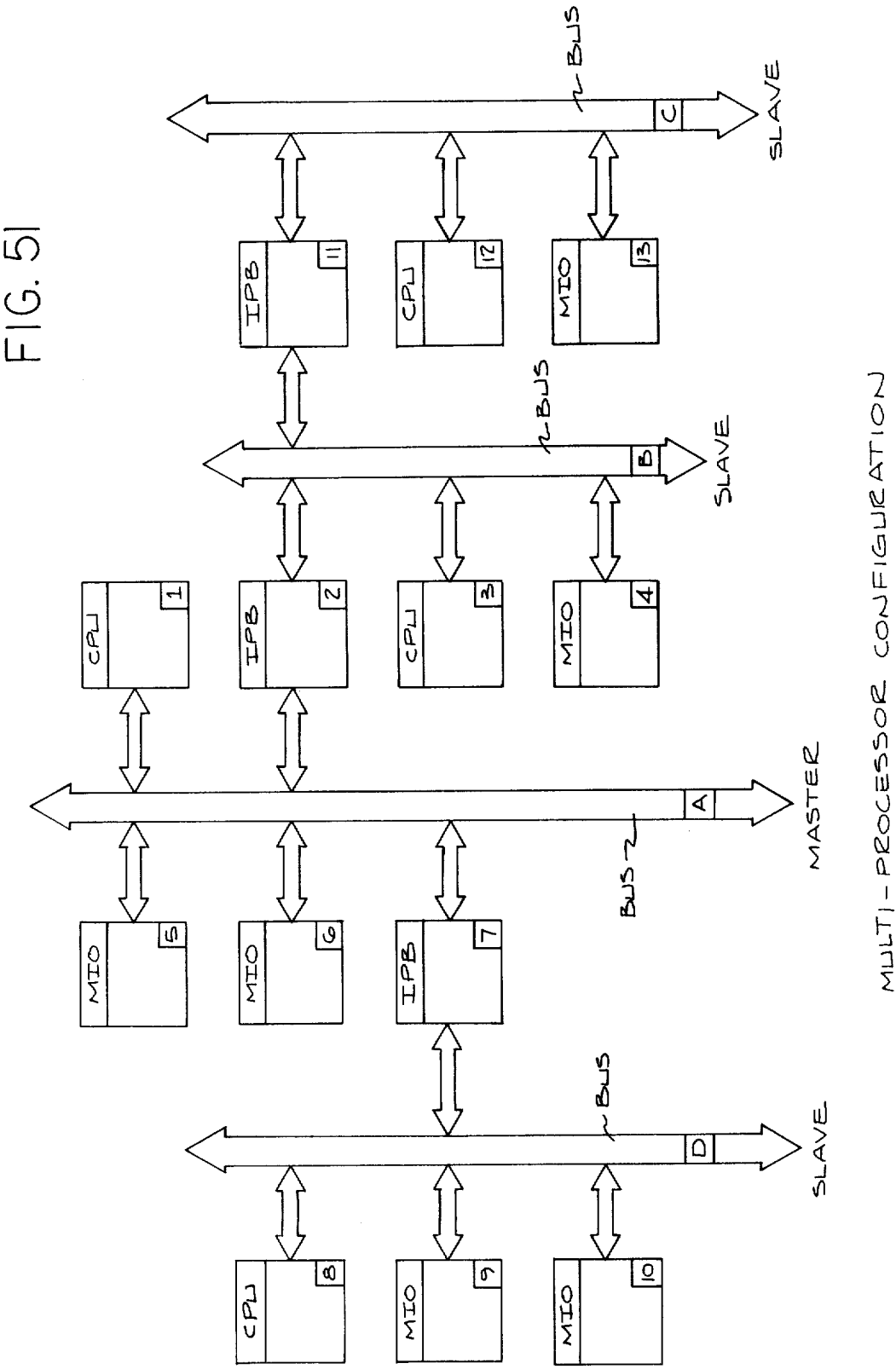
Figure 52:
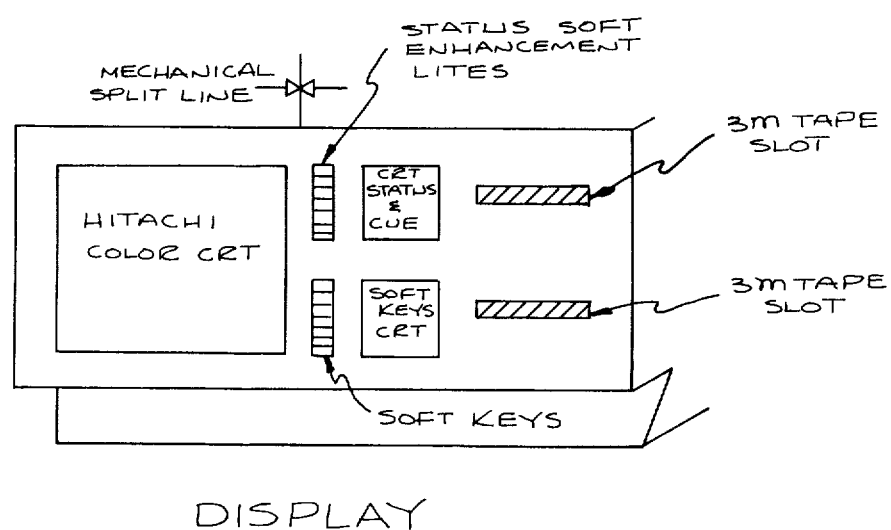
Figure 53:
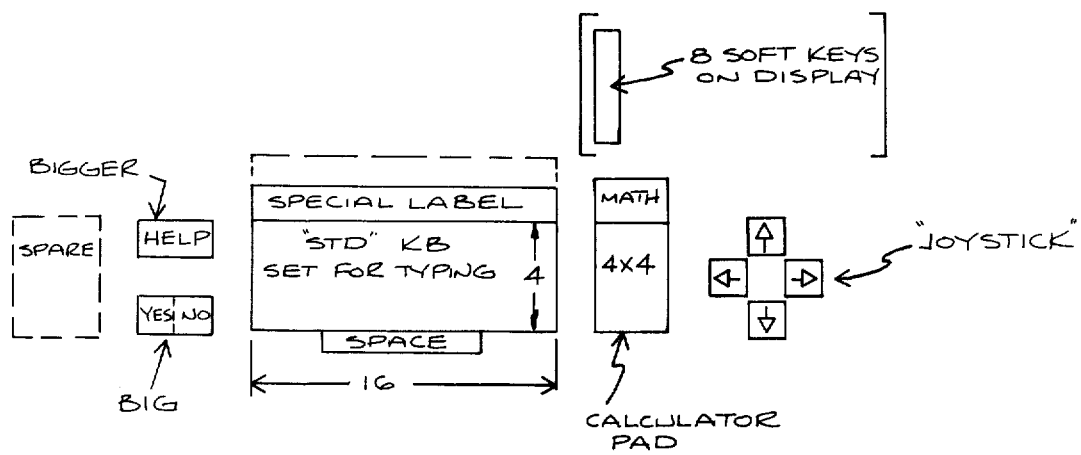
Figure 54:
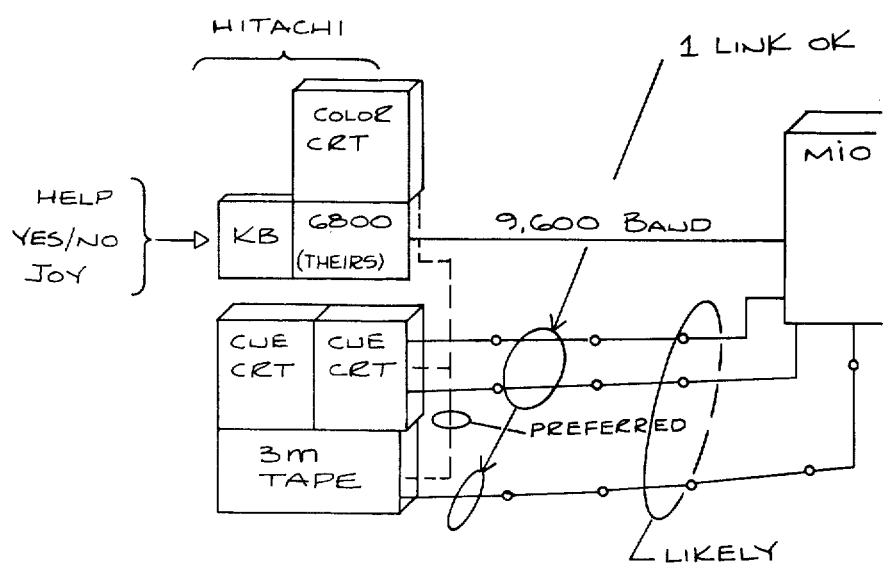
Figure 55:
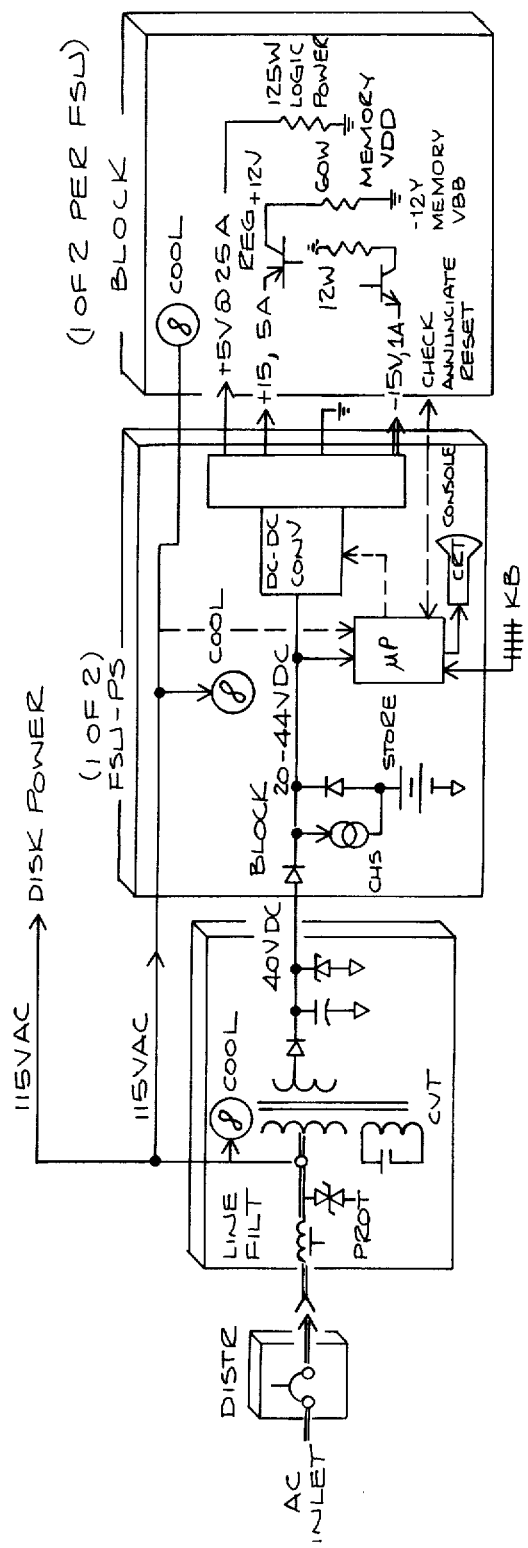
Figure 56:
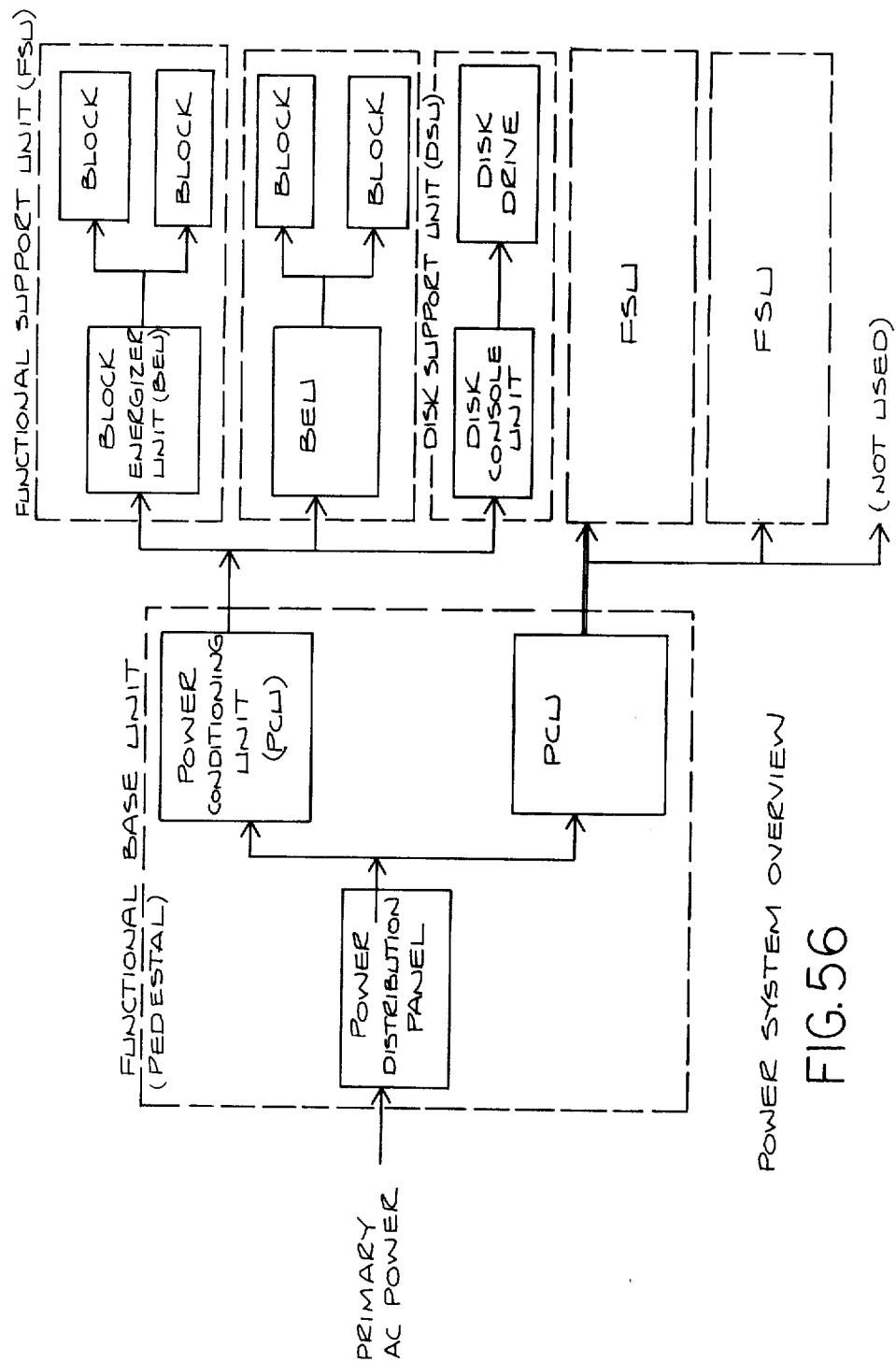
Figure 57:
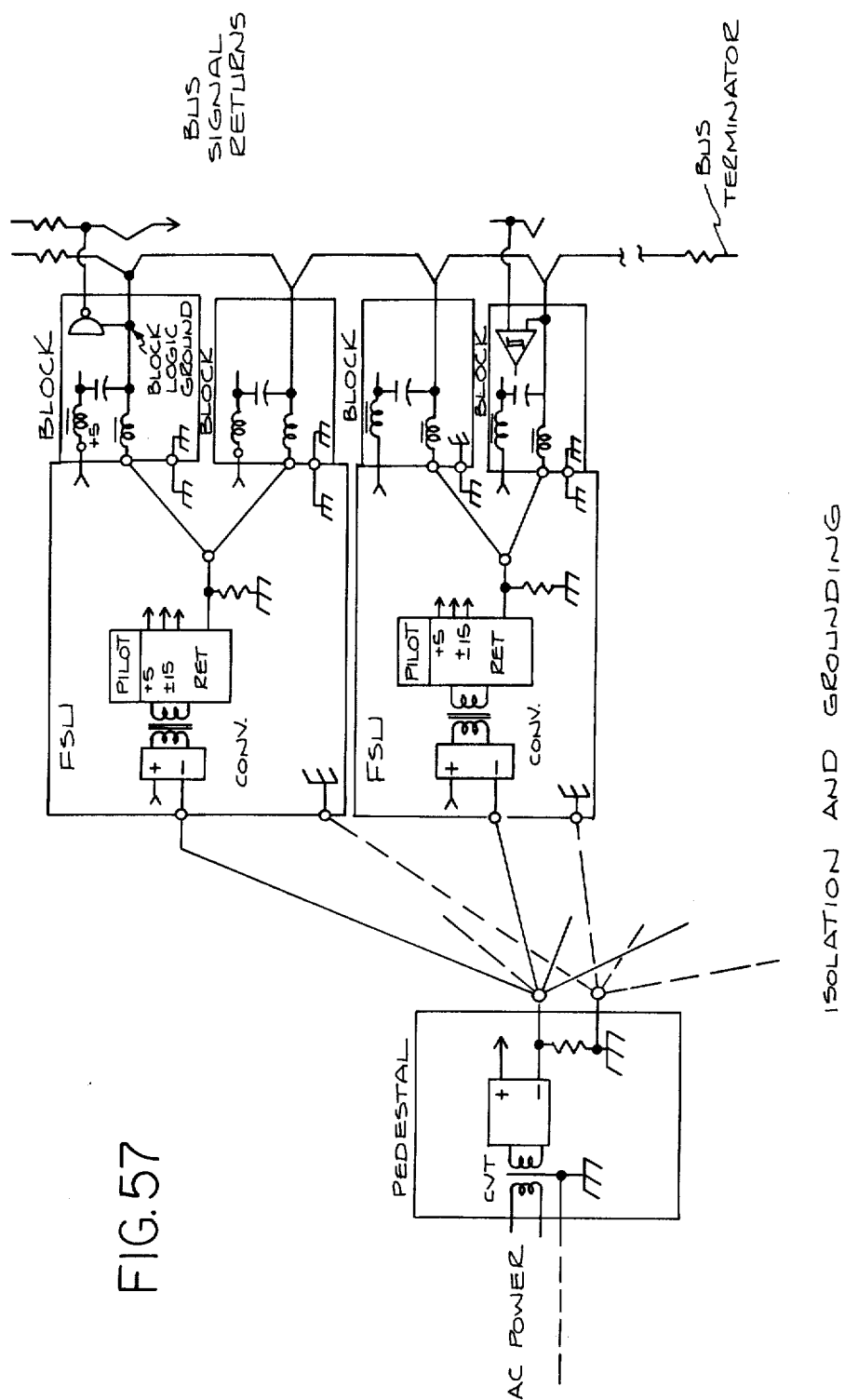
Figure 58:
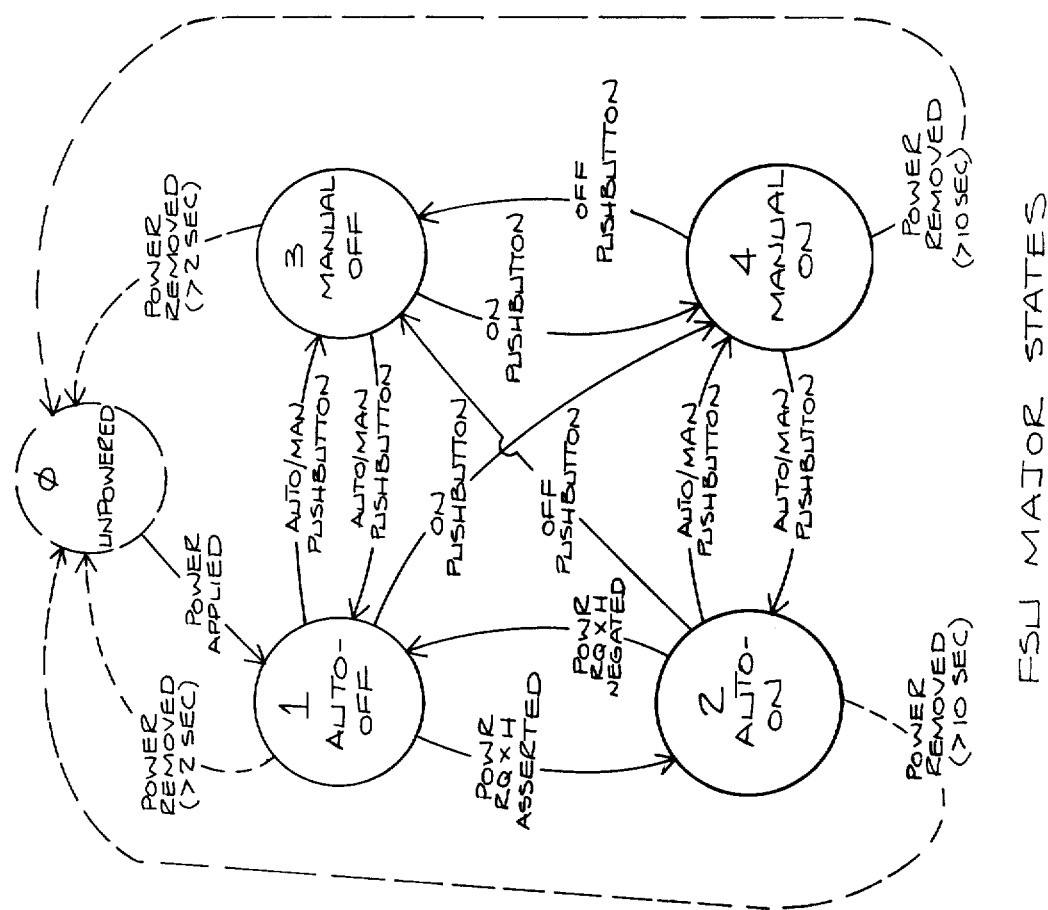
Figure 59:
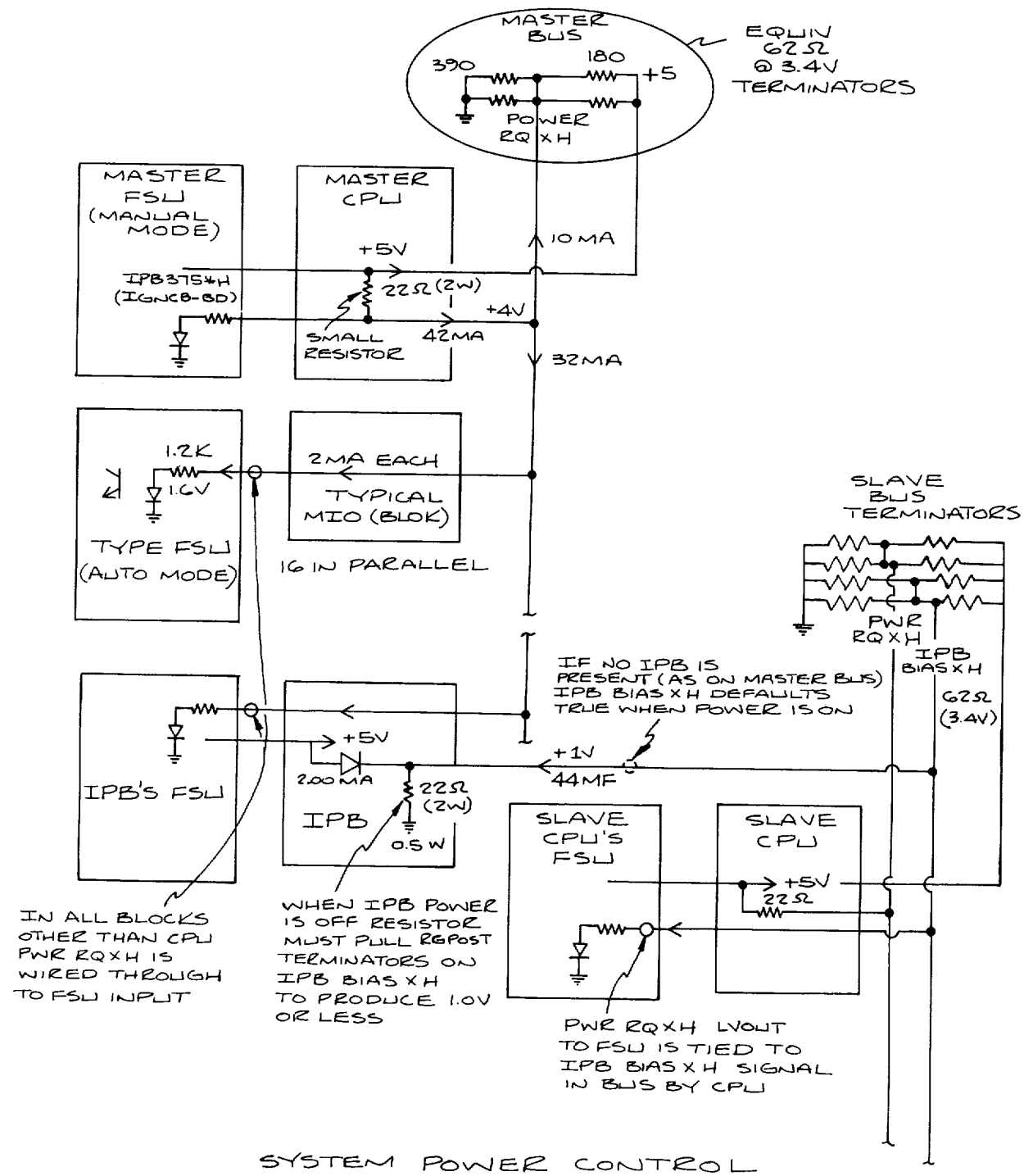
Figure 60:
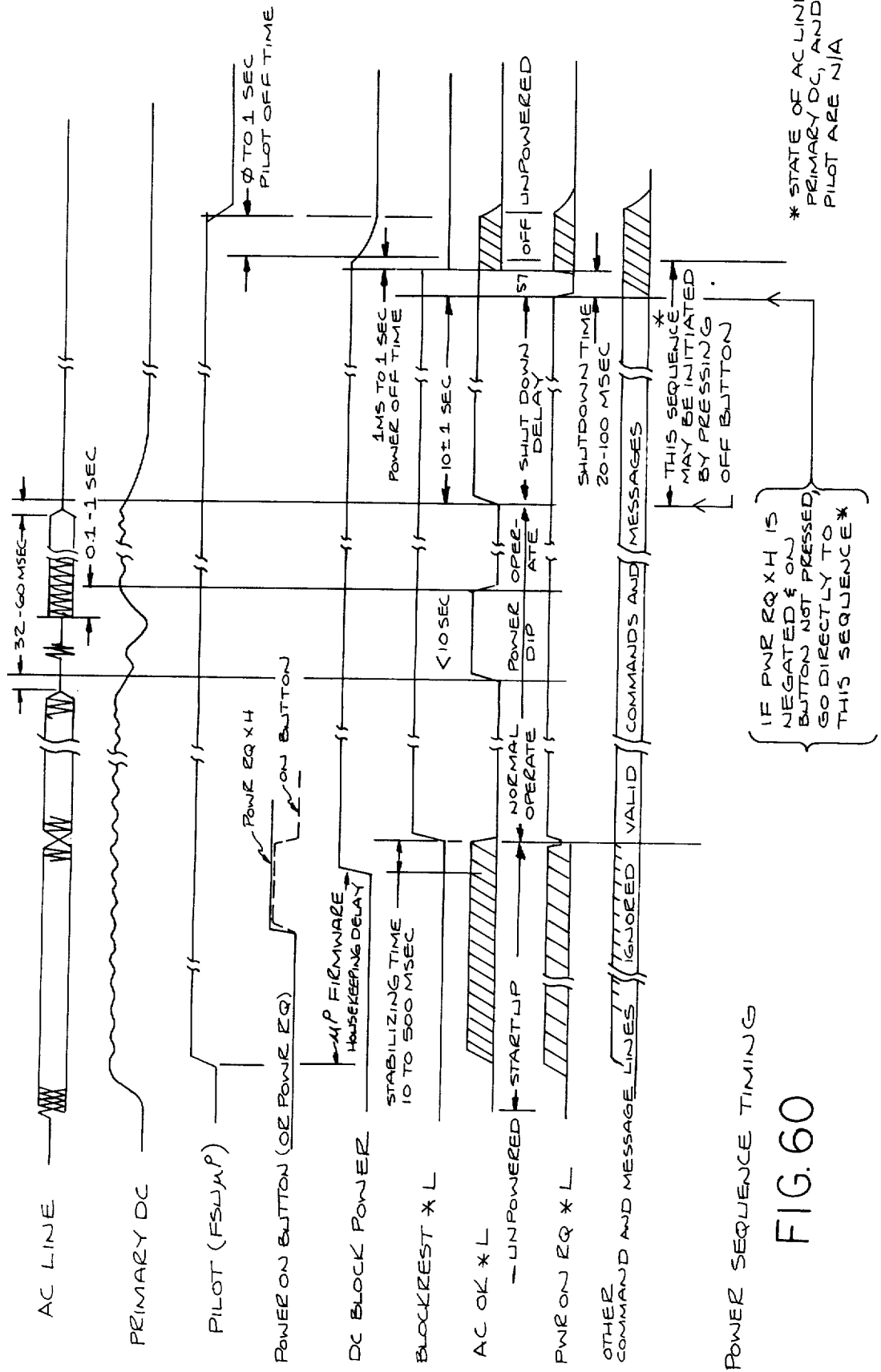
Figure 61:
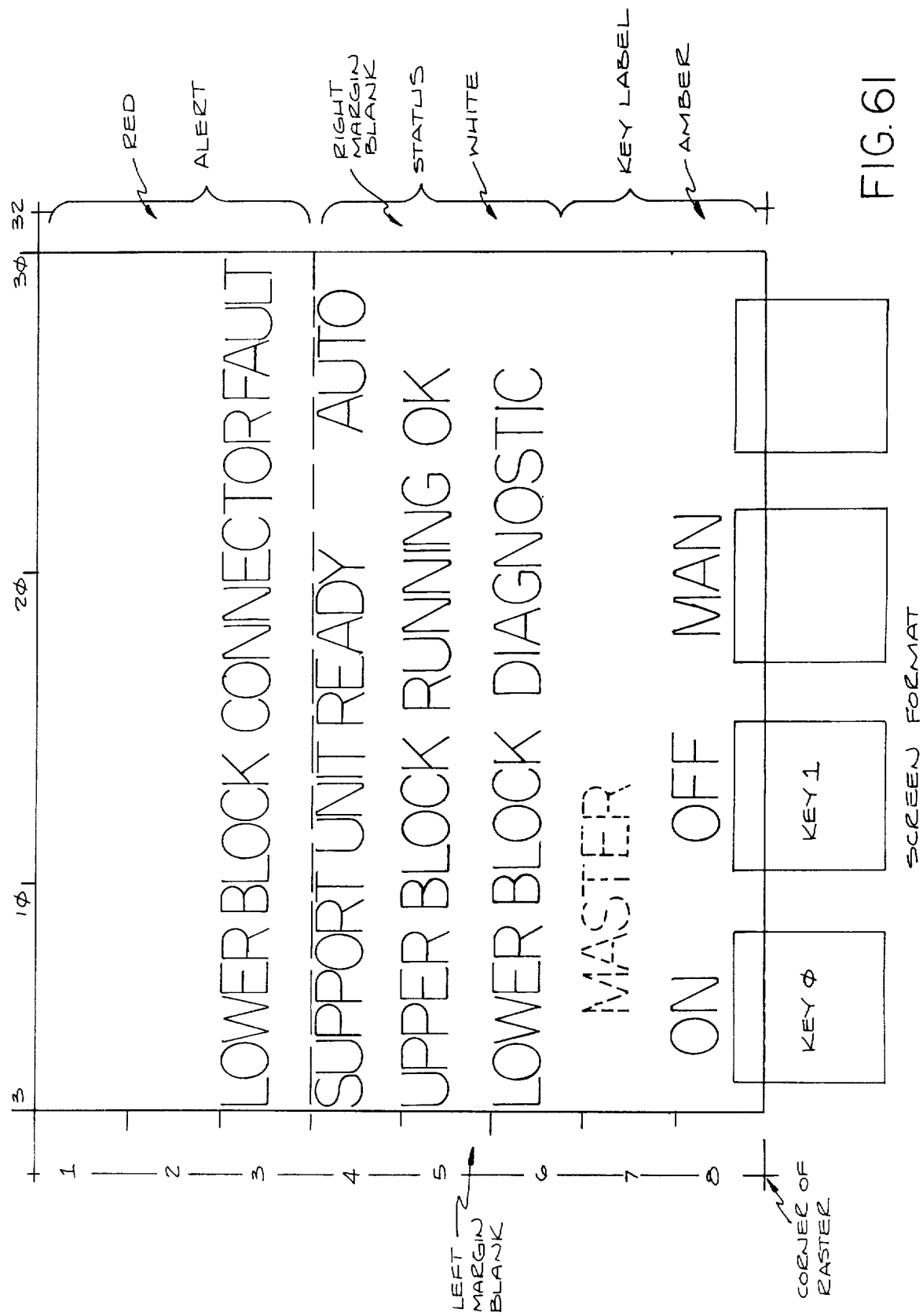
Figure 62:
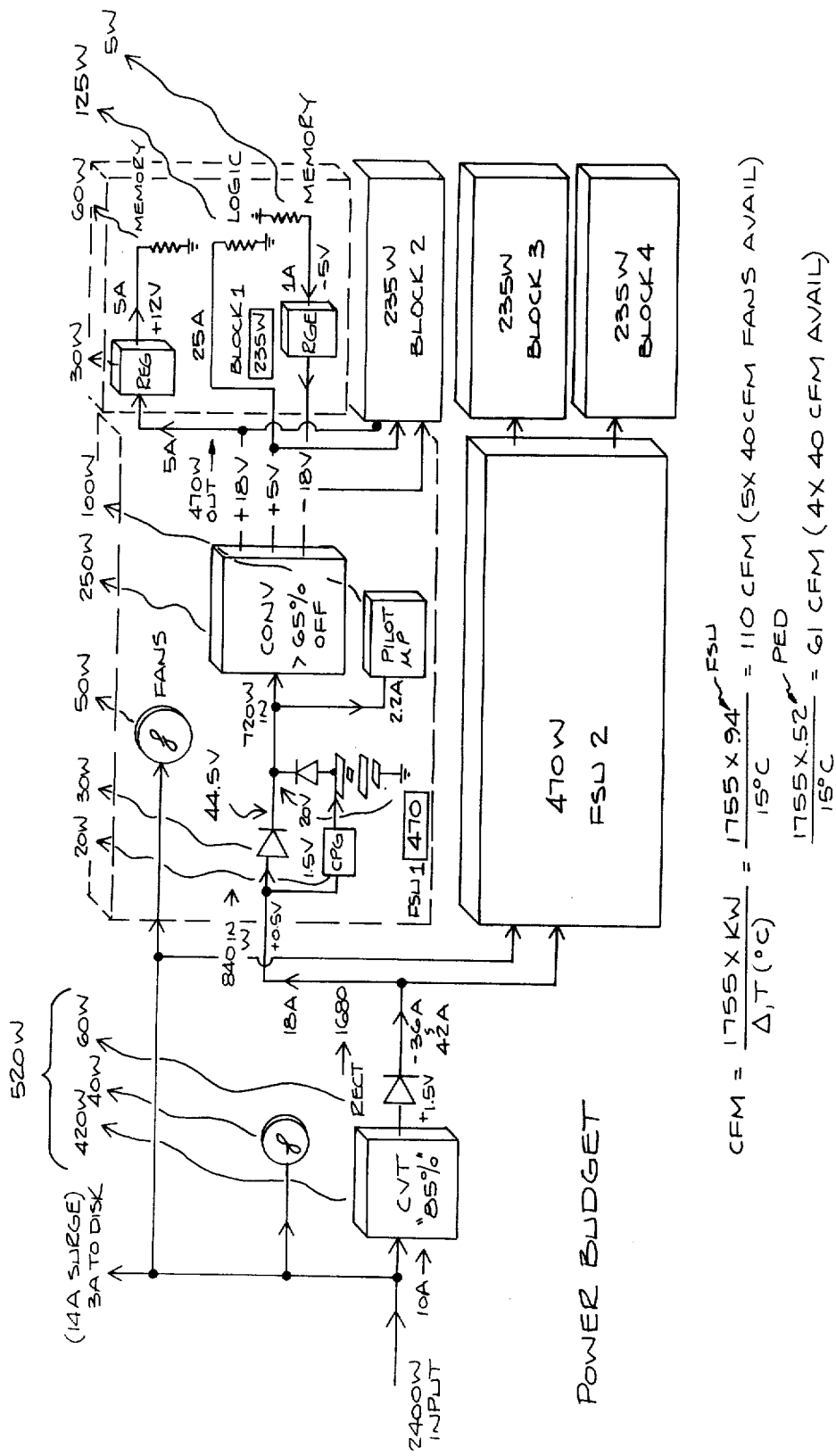
Figure 63:
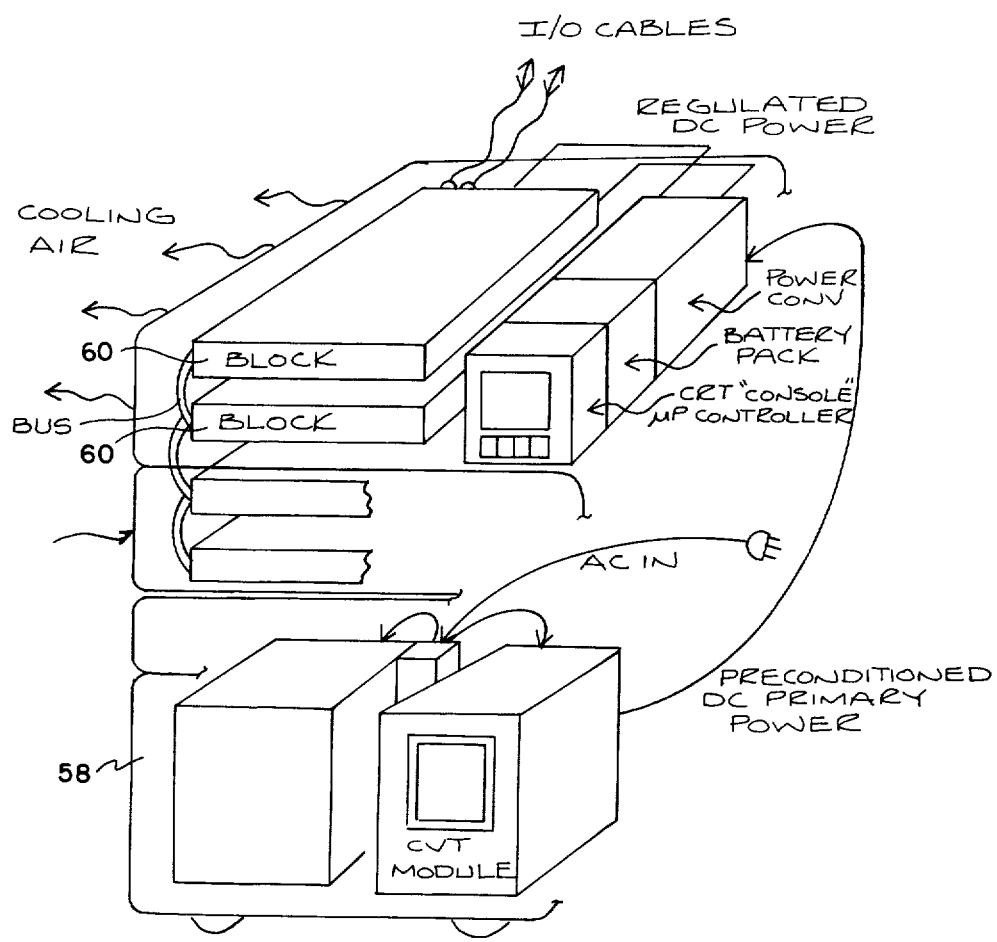
Figure 64A:
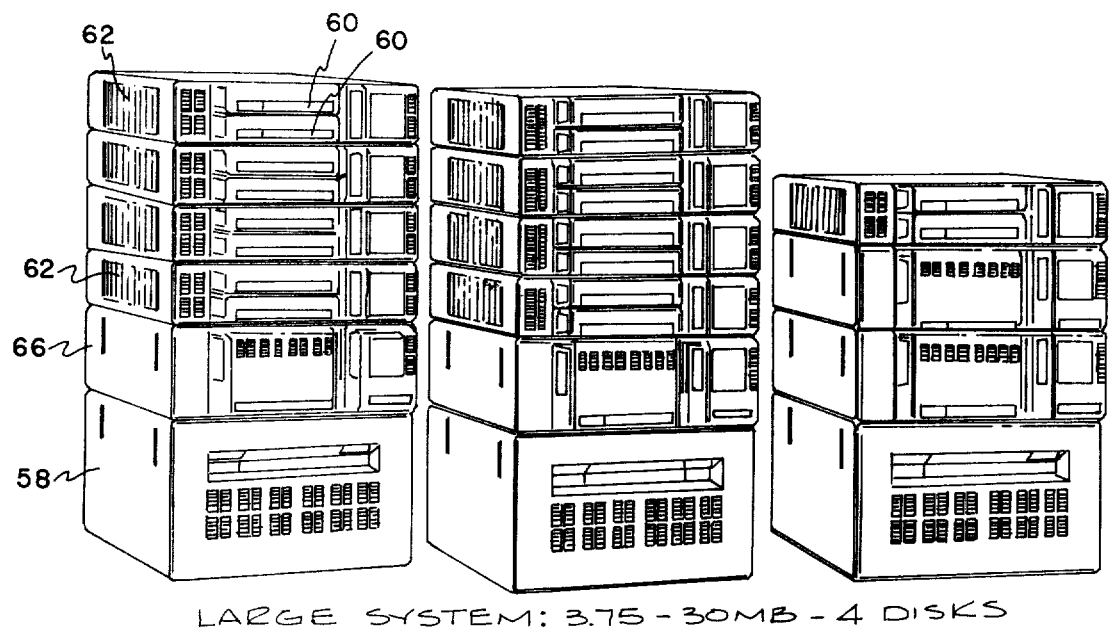
Figure 64B:
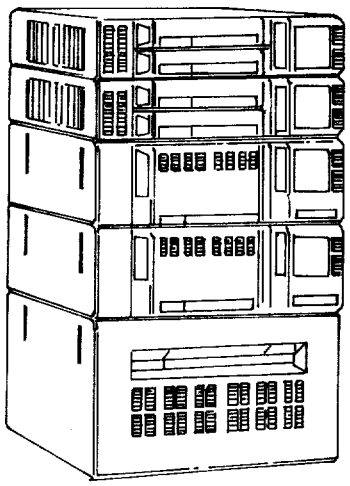
Figure 64C:
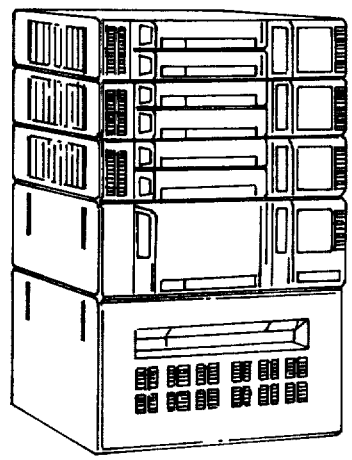

FIG. 5 is a more detailed block diagram of the MIO illustrating the onboard microprocessor with its associated read-only memory (ROM) and random access memory (RAM) as well as the microprocessor bus and the asynchronous communication interface adapters for communication with serial input/output devices and a parallel interface adapter communicating with a direct memory access control logic module for transferring data to and from parallel input/output devices such as disks;

FIG. 6A illustrates the interconnection of a central processing unit with multiple MIO's illustrating the interconnection of the bus with the public memory during the first phase of a three phase timing cycle;

FIG. 6B is similar to FIG. 6A showing the interconnection of the public memory with the serial input/output channels during the second phase of the three phase clock cycle;

FIG. 6C is similar to FIGS. 6A and 6B illustrating the interconnection of the public memory with the parallel input/output channel during the third phase of the three phase clock cycle;

FIG. 7 is a block diagram illustration of prior art computer architecture showing communication of the direct memory access to and from the memory and input/output utilizing the same data bus interconnecting the CPU with the memory;

FIG. 8 is another block diagram illustrating prior art computer architecture illustrating the operation of such architecture for serial input/output;

FIG. 9 is a diagrammatic representation of a read cycle as performed by the bus interconnecting the CPU with the MIO's and IPB's;

FIG. 10 is a diagrammatic representation of the write cycle for the bus similar to the read cycle shown in FIG. 9;

FIG. 11 is a block diagram of the MIO when operating as both a parallel input/output and as a serial input/output;

FIG. 12 is a block diagram similar to FIG. 11 illustrating the use of the MIO for only serial input/output purposes;

FIG. 13 is a block diagram of the MIO similar to FIGS. 11 and 12 illustrating its use for communicating with two disks;

FIG. 13A is a detailed block diagram of the central processing unit of the present invention;

FIG. 14 is a perspective view of a functional support unit of the present invention housing two blocks, each block housing either a CPU, MIO or IPB and the associated power supply and bus forming the rest of the functional unit, as well as the pedestal upon which the functional support unit rests which in turn houses the constant voltage transformers and rectifiers for producing raw DC voltage;

FIG. 15 is a perspective view of the digital computer similar to that shown in FIG. 14, also illustrating a disk module placed atop the pedestal for communication with the blocks of the functional support unit;

FIG. 16 is an exploded perspective view of the functional support unit shown in FIGS. 14 and 15;

FIG. 17 is a perspective view of a color cathode ray tube (CRT) terminal for user interaction with the computer according to the present invention;

FIG. 18 is a perspective view of a line printer that may be used as an external device with the computer of the present invention;

FIG. 19 is a flow block diagram illustrating the execution of instructions within the computer of the present invention;

FIG. 20 is a diagrammatic block diagram showing the input/output programming utilized by the computer of the present invention;

FIG. 21 is a diagrammatic block diagram illustrating the input/output command blocks used with the retrieval and transferral of data to and from external devices;

FIG. 22 is a block diagram of the types of interrupts associated with the computer of the present invention;

FIG. 23 is a schematic diagram of a terminating network for the bus used to interconnect the CPU with the MIO's and IPB's;

FIGS. 24A and 24B illustrate a comparison of thresholds and show typical cable waveforms of the bus used to interconnect the CPU with the MIO's and IPB's;

FIG. 25 is a set of waveforms illustrating the clock pulse sent and received by the computer;

FIG. 26 is a group of waveforms illustrating the clock and skew characteristics of the computer;

FIG. 27 is a hardware block diagram of a multiprocessor configuration of a digital computer according to the present invention illustrating the use of multiple CPU's, MIO's and a single IPB, and is similar in format to FIG. 1;

FIG. 28 illustrates the bus-memory access function's timing diagram during each phase of the three phase clock cycle;

FIG. 29 is a block diagram of the bus interrupt poll mechanism;

FIG. 30 is a series of waveforms illustrating the basic cycle timing of a computer according to the present invention;

FIG. 31 is a series of waveforms illustrating the read cycle timing for block data to the CPU;

FIG. 32 is a series of waveforms illustrating the write cycle timing from the central processing unit to the MIO;

FIG. 33 is a series of waveforms illustrating the transfer cycle timing from one block to another block;

FIG. 34 is a series of waveforms illustrating the interrupt request, interrupt poll and interrupt acknowledge timing relationships;

FIG. 35 is a simplified block diagram of the central processing unit;

FIG. 36 is a block diagram illustrating the partitioning and diagnostic aspects of the central processing unit;

FIG. 37 is a block diagram illustrating additional details of the partitioning and diagnostics aspects of the central processing unit;

FIG. 38 illustrates a more detailed block diagram of the central processing unit;

FIG. 39 is a series of waveforms illustrating the timing relationship of the central processing unit with the bus and SYNC pulse;

FIG. 40 is a diagrammatic representation of the microcode word;

FIG. 41 illustrates the logic used to count, control and perform fast microcode loops;

FIG. 42 is a schematic block diagram illustrating how the 8-bit IR bus is driven from the IR register, the decode register, the pointer register, or directly from the right-most byte of the DBUS;

FIG. 43 illustrates the virtual address and map formats used in the digital computer;

FIG. 44 is a block diagram of the memory mapping hardware;

FIG. 45 is a block diagram illustrating the 64 bit authorization vector specifying whether a fault should occur for each type of cycle requested as a function of the block domain and its data type;

FIG. 46 is a block diagram of the MIO board;

FIG. 47 is a more detailed block diagram of the MIO board;

FIG. 48 is a block diagram of the memory board;

FIG. 49 illustrates general timing diagrams for the MIO microcomputer board;

FIG. 50 illustrates timing diagrams of a 256 kilobyte memory board;

FIG. 51 is a block diagram illustrating a large multiprocessor configuration computer according to the present invention and is similar in format to FIGS. 1 and 27;

FIG. 52 is a diagrammatic representation of the display format for a total access port;

FIG. 53 is a diagrammatic representation of the keyboard used in the total access port;

FIG. 54 is a diagrammatic representation of a preferred 9600 baud MIO channel driving a color CRT for the total access port;

FIG. 55 is a simplified block diagram of an overview of the power supply system to power the computer;

FIG. 56 is a block diagram of the power supply system;

FIG. 57 is a schematic diagram of a portion of the power supply system illustrating the provision for controlling system ground loops;

FIG. 58 is a diagrammatic representation of the major states of the functional support unit;

FIG. 59 is a schematic diagram illustrating system power control of the slave buses;

FIG. 60 shows a series of waveforms illustrating the behavior of the system on power-up, during a power dip, and on an unpowered shutdown;

FIG. 61 is a diagrammatic representation showing the typical screen format on the CRT;

FIG. 62 is a block diagram illustrating the power budget for a minimally configured digital computer according to the present invention;

FIG. 63 is a diagrammatic representation of the modular packaging philosophy for the digital computer according to the present invention; and FIGS. 64A-64C are perspective views of different size configurations of the computer according to the present invention, FIG. 64A showing a large system comprising three lower pedestal portions, four disk drive modules, and nine functional support units, FIG. 64B showing a smaller system comprising a lower pedestal portion, two disk drive modules and two functional support units, and FIG. 64C showing a small system comprising a lower pedestal portion, a single disk drive module and three functional support units.

DETAILED DESCRIPTION

General Characteristics

As best seen in FIG. 1, a digital computer 20 according to the present invention comprises one or more central processing units 22 (CPU's), one or more composite memory and input/output modules (MIO's) 24, one or more interprocessor buffers (IPB's) 32, a bus 26 for interconnecting the MIO's and IPB's to the CPU, and one or more power supply modules 59 for providing the necessary DC power to drive each CPU, MIO, or IPB. Each MIO communicates with one or more external devices 31 by either a parallel direct memory access (DMA) port 28, or one or more serial input/output channels 30. As indicated by the phantom extension of bus 26, a total of fifteen MIO's or IPB's (or combination thereof) can interconnect with bus 26 along with CPU 22. Thus sixteen modules (CPU, MIO or IPB) can be connected to the bus at any one time. Although it would be possible to have the bus interconnect with more modules, the preferred embodiment of the present invention has kept the bus length to no more than ten to twenty feet due to the propagation delays of signal travel as dictated by the speed of light.

As shown in FIG. 1 a multiprocessor, that is a multi-CPU configuration, can be obtained by use of one or more interprocessor modules 32 (IPB's) which communicates with bus 26 associated with the first CPU at one end and with a slave bus 26', otherwise identical to bus 26, at its other end. The slave bus is interconnected with a second CPU 22'. The slave bus 26' may also have from one to fifteen MIO's or IPB's interconnected to it. For example, as shown in FIG. 1, slave bus 26' has one MIO 24' and one IPB 32' associated with it. In turn IPB 32' connects to a second slave bus 26" interconnected with a third CPU 22" and one or more MIO's or IPB's. Such a cascading of CPU's can continue indefinitely in the digital computer of the present invention.

Figure 2A:
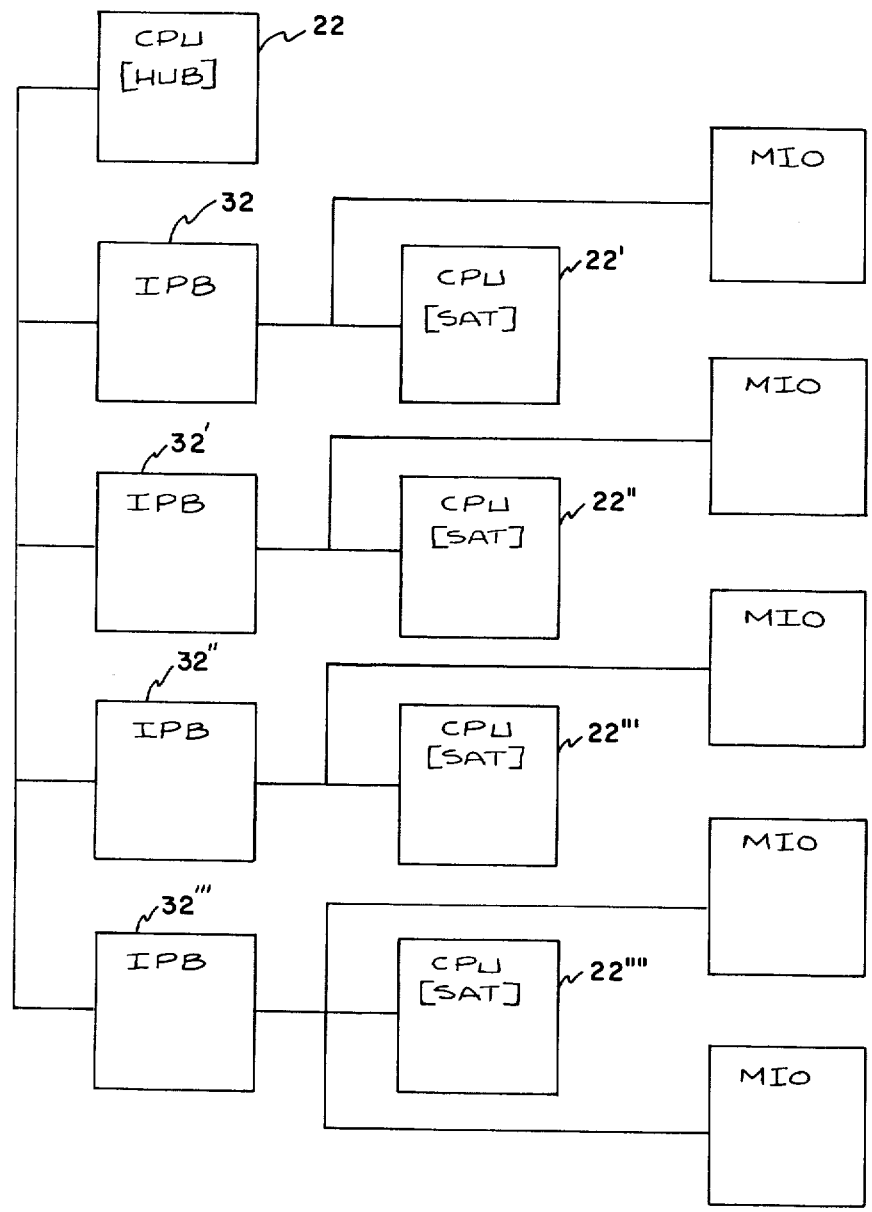
FIG. 2A is a block diagram of the digital computer illustrating the use of one CPU as the hub CPU and four additional CPU's as satellite CPU's.
Figure 2B:
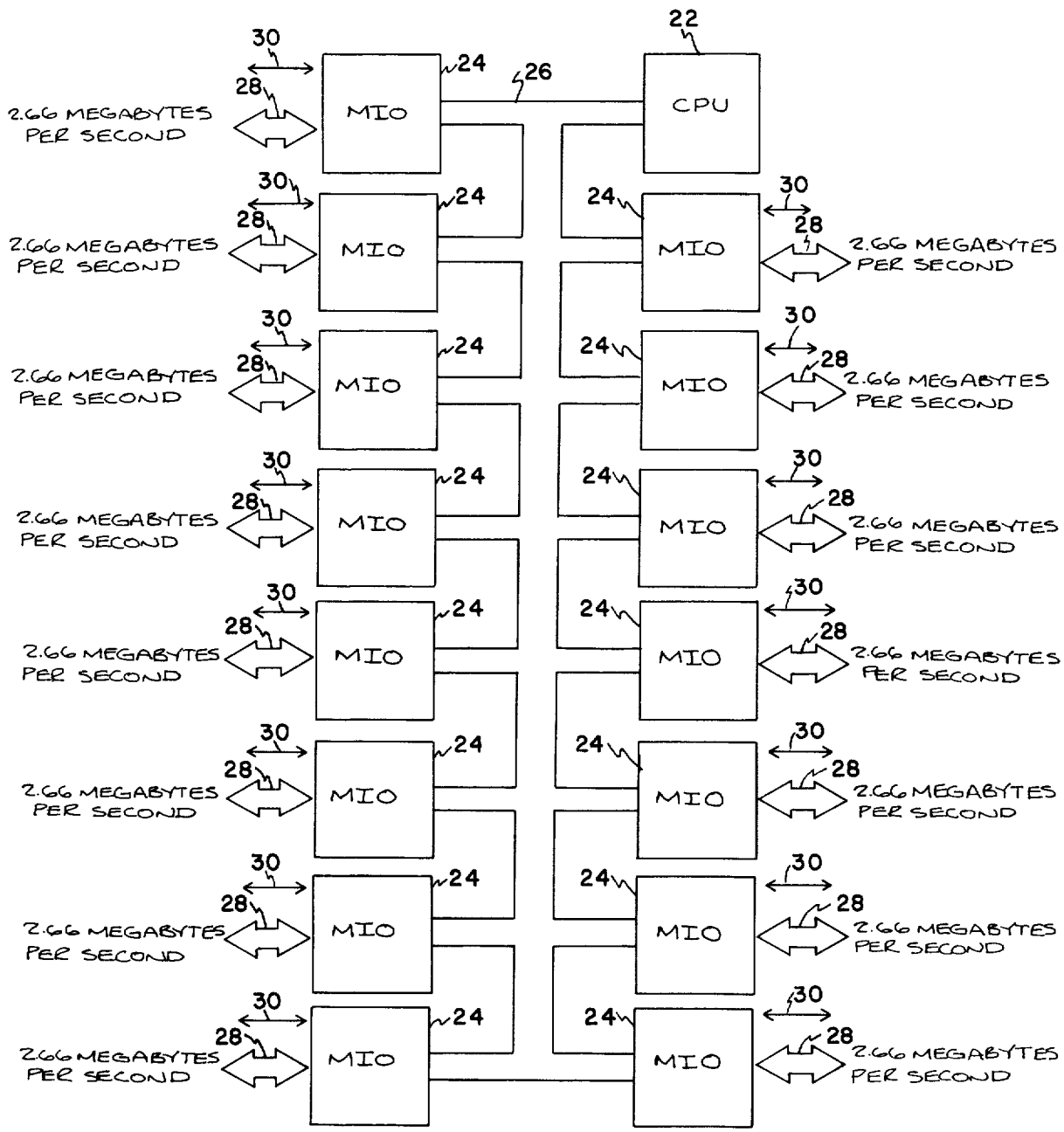
FIG. 2B is a block diagram of the digital computer according to the present invention illustrating the use of one central processing unit with the maximum number of interconnected MIO's; and further illustrating the communication of the MIO with the external world at a rate of the maximum 2.66 megabytes per second per MIO.

As also shown in FIG. 1 bus 26 can interconnect with a second IPB 32" which in turn connects to a fourth CPU 22'" and one or more MIO's and IPB's. This arrangement of additional CPU's is thus configured in a "string" or "star" configuration with the first CPU 22 acting as the hub and the additional CPU's (such as CPU 22'") acting as satellites. FIG. 2A illustrates one CPU 22 associated with four satellite CPU's 22', 22", 22'", 22"" by means of four IPB's, 32, 32', 32", 32'". One or more MIO's or IPB's in turn interconnect with the satellite CPU's. As shown in FIG. 2B a configuration of one CPU 22 communicating with fifteen MIO's is possible in the preferred embodiment of the present invention. As also shown in FIG. 2B each high speed parallel DMA channel can transfer data into and out of the public memory within the MIO at a rate of 2.66 megabytes per second. In addition the public memory associated with each MIO has a unique and continuous address with respect to the CPU in order to make the data within each MIO uniquely available to the CPU. Besides the high speed DMA channel shown in FIG. 2B for each MIO, one or more serial input/output channels 30 are also associated with the MIO for interconnection with external devices. With the parallel high speed DMA channels of each MIO associated with the CPU on the bus, extremely high speed input/output to and from memory can take place without requiring the use of bus 26. This is one of the powerful features of the present invention's architecture since it enables the resultant computer to have high data rate communication with the external world without degrading the execution time of the central processing unit. As a result, maximum throughput is obtained.

Figure 3:
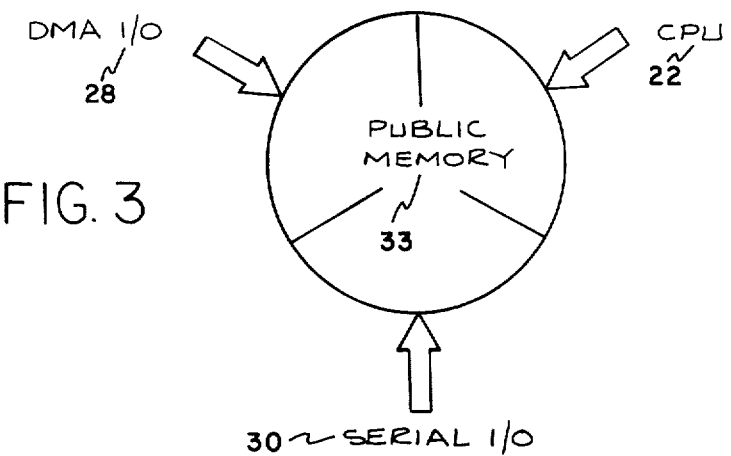
FIG. 3 is a diagrammatic representation of the interconnection of the memory portion of the MIO with either the interconnected CPU via the bus or with a high speed direct memory access input/output channel or with the low speed serial or parallel input/output channels.

Digital computer 20 is able to obtain this result by utilization of a three phase cycle for each MIO and IPB. Each memory phase has a duration of 0.5 microseconds and is dedicated in turn to the central processing unit 22 interconnected on bus 26, the serial input/output channels 30, and the direct memory access (DMA) input/output channel 28. FIG. 3 shows in diagrammatic form the transferral of information to and from public memory 33 associated with the MIO to the CPU, serial input/output, and a DMA input/output during the three phase clock cycle associated with the MIO. Thus, for one complete clock cycle, that is every 1.5 microseconds, the MIO makes its public memory available for reading and writing to the CPU, the serial input/output, and the DMA input/output.

Figure 4:
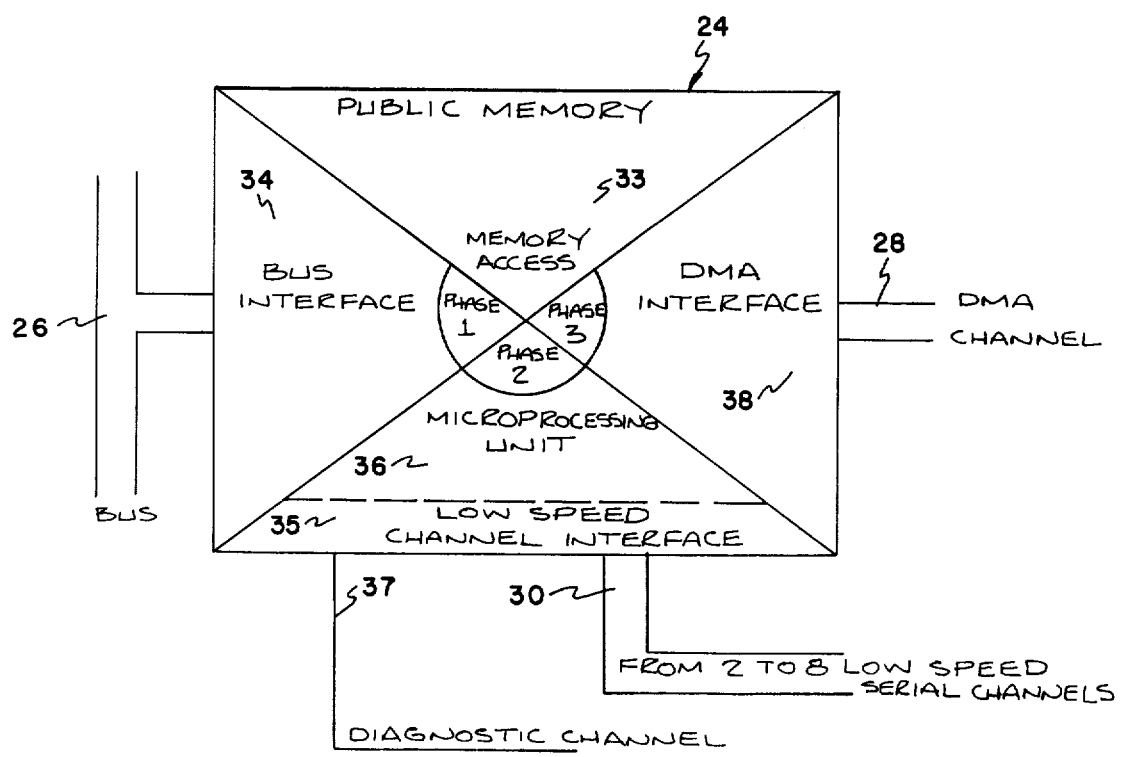
FIG. 4 is a block diagram illustrating the interconnection of the MIO with the bus connected to the CPU and additional MIO's and/or IPB's and with both the serial input/output channels and the direct memory access input/output channel.

As shown in FIGS. 4 and 5, the MIO incorporates a public memory 33, a bus interface 34 connected to bus 26, a microprocessor 36 associated with the low speed serial channel interface 35 connected to serial input/output channels 30, as well as connected to a diagnostic channel 37, and a direct memory access (DMA) interface 38 interconnected to the direct memory access channel 28.

The low speed serial input/output is performed using microprocessor 36 in the MIO. In the preferred embodiment of the present invention this microprocessor is a type 6800 Motorola microprocessor with associated integrated circuit chips.

As shown in FIG. 5, the microprocessor 36 has a bus 43 and an associated private memory 39 comprising read only memory 40 (ROM) and random access memory 41 (RAM). The ROM contains the programs that control the microprocessor in performing memory diagnostics and refresh as well as input/output control. The microprocessor 36 thus controls the handshaking between the MIO and its peripheral devices, including generating interrupts to the central processing unit 22. The microprocessor in addition performs a diagnostic check of the memory during power up and when instructed to do so by the CPU. It also has a three hundred baud diagnostic port 37 associated with a peripheral chip 51. This port has facilities for debugging microprocessor input/output programs.

As shown in FIG. 5 asynchronous communication interface adapters (ACIA's) 42 are used for the serial I/O channels 30 through communication with microprocessor bus 43. This utilizes standard state of the art techniques. Characters coming in on a serial I/O port 30 are processed by the microprocessor before being placed in main public memory 33. The asynchronous communication interface adapters permit asynchronous ASCII transmission at up to 9600 baud. Hence a character at a time, blocked record at a time, and records terminated with a carriage return signal or other delimiter can be handled without CPU intervention.

Parallel input/output is entered directly into memory using direct memory access control logic techniques. Setting up transfer counts and addresses and performing handshaking is controlled by the microprocessor through a parallel interface adapter 44 in conjunction with a direct memory access control logic module 45. A direct memory access bus 46 having a 32-bit width interconnects the DMA control logic module 45 with public memory 33 for rapid data transfer. The direct memory access parallel input/output channel 28 is thus a 32-bit wide channel and has an input/output rate of 2.66 megabytes per second, each byte representing eight bits of data. Microprocessor 36 in the MIO block illustrates the use of state of the art microprocessors to interface a large data based machine by means of available semiconductor integrated circuit chips. Such microprocessors are similarly used in each CPU, IPB and power supply module to achieve this end result.

FIGS. 6A, 6B, and 6C illustrate in diagrammatic form the three phase operation of the MIO. Thus during phase one the CPU 22 has access by bus 26 with the public memory in each interconnected MIO 24. During phase two of the clock cycle the low speed serial input/output channel 30 has access to the public memory within each MIO, while in the third phase of the clock cycle the parallel input/output channel 28 has access to and from the public memory within the MIO. Thus it is readily apparent that the amount of utilization of either the serial input/output 30 or the parallel input/output 28 will not degrade the CPU's utilization of the public memory in each of the associated MIO's. This is a marked departure from the conventional architecture as shown in FIG. 7 where the DMA input/output ports access memory using the bus which interconnects the memory with the CPU. In some of the more advanced architectures or digital computers the input/output access to the memory can be done directly without using the CPU. However, this does not mean that the input/output and the CPU run independent of each other. Thus, in a conventional DMA scheme transfers to and from the memory occur during the execute cycle of the CPU. This works well as long as the total time required by the DMA input/outputs is less than the execute time available. When the input/output rate is exceeded, either the CPU performance degrades rapidly or the DMA input/output cannot take the input/output data, which usually has disastrous results.

In the present invention each MIO can support a 2.66 megabyte transfer rate into the public memory of the MIO, independent of bus 26 and CPU 22. As memory accesses by the CPU are phased with the input/output into one MIO clock cycle, the CPU can be doing computations out of the same memory into which are running a 2.66 megabyte direct memory access transfer without any CPU slowdown.

Likewise, when handling serial input/output devices such as interactive terminals, they usually require the interpretation of each character as received and often a response character. As shown in FIG. 8, in a conventional architecture, this is done by interrupting the central processing unit after each character. This CPU requires many CPU cycles to store away its current state, interpret the characters and then restore it to its previous state. This limits the number of simultaneous serial input/output channels that can be handled by the central processing unit. For example, if it takes the central processing unit 100 microseconds to handle a character, this limits the system to ten 9,600 baud ports. To handle more ports, it is necessary to add external processors to handle the handshaking. This makes the system more complex and obviously more expensive.

In the present invention, these "external" processors are built into the MIO, and these function within the operating system's software associated with the computer 20. As a result, the computer 20 can handle up to 60 ports, each running at up to 9,600 baud, on a single central processing unit simultaneously with full CPU computations. In this configuration, there would be 15 MIO's as shown in FIG. 2B, each MIO with four serial input/output channels. This configuration is discussed more fully later in this description.

Just as each MIO utilizes a three-phase clocking system for utilization of its public memory with the associated CPU, its serial input/output, and its parallel input/output, so the bus 26 is also a three-phase bus. Each phase of the three-phase clock cycle has a 0.5 microsecond duration synchronized with the phases of the MIO. This 500 nanosecond time slot is sufficient for the bus to communicate over its entire length between any of the modules communicating thereon. In the present computer the bus has 32 data/address lines, these lines being used as address lines in one phase of the three-phase clock cycle and as data lines in another phase of the clock cycle. There are also 8 unary select CPU interrupt level lines controlled by the microprocessors within the associated MIO's. There are also control lines by which the central processing unit can interrupt each of the MIO microprocessors.

As shown in FIG. 9, the bus reads information from an MIO by the central processor, during phase 1, putting the address on the bus associated with the data that it desires to read. This data as well as all other data communicated on bus 26 is stored in buffers within each MIO bus interface 34. However, since the address space for the data in all the MIO's has a unique addressable location, the fact that MIO's other than the one with the desired address read the desired address as placed on the bus by the CPU is immaterial to the proper operation of the system.

In phase 2 the MIO with the appropriate address transfers data from the public memory to the bus interface, making the data available to the bus. This phase 2 read cycle thus corresponds to the phase 1 cycle for the MIO in which the public memory of the MIO is communicable to the data bus. During phase 3 of the bus cycle, the CPU actually reads the data placed on the bus by the MIO. Alternatively the CPU can, by entering into a write cycle, cause the data placed on the bus during phase 2 to be stored in a desired public memory location of another MIO. This provides for rapid data transfer between MIO's. This result is accomplished since all the MIO's "listen" when the CPU or other MIO puts data on the bus. This listening does not adversely affect their own three phase data clocking cycle.

A pictorial representation of a write cycle is shown in FIG. 10. In this case phase 1 of the bus has the central processing unit putting the address on the bus for the location in a particular MIO where data is to be deposited. During phase 2 of the bus cycle, the central processing unit puts the data on the bus for storage in the interfaces of the MIO's while during phase 3 the MIO with the correct address space transfers this data from its bus interface to its public memory 33. Thus, the third phase of the write cycle corresponds with the first phase of the MIO cycle in which the MIO allows access to and from the public memory with the bus.

As explained earlier, the MIO can transfer one 32 bit word into or out of the public memory along its DMA input/output channel once every 1.5 microseconds. This is equivalent to a transfer rate of 2.66 megabytes per second per MIO. The pictorial representation of such a parallel operation of the MIO is shown in FIG. 11. The parallel transfer of data once initiated is directed into public memory 33 from the parallel channel 28 without requiring the use of the microprocessor 36 associated with the MIO module 24. It also is independent of bus 26 or the CPU. However, initial set up of the data transfer is under the control of microprocessor 36 through the PIA (see FIG. 5).

Transfer is initiated by means of the microprocessor 36 which is given the memory address and data count for the transfer. At the completion of the transfer, the microprocessor interrupts the central processing unit or continues with additional data transfers until commanded to interrupt the central processing unit. This interrupting of the central processing units is performed on one of the eight interrupt lines associated with bus 26.

Hardware handshaking is accomplished by means of a ready/done control line 47 on both input and output. The parallel MIO is also equipped with two serial ASCII channels 30 to allow terminals to be connected to the MIO when operating in this configuration. It should be noted that the architecture employed for the MIO does not limit the phase 2 cycle of the memory to two serial input/output channels but indeed is unlimited in its architectural sense. It is just the size of the printed circuit board upon which the MIO is fabricated which limits the serial channel to two channels when utilizing the direct memory access parallel channel.

FIG. 12 illustrates the use of an MIO for only serial input/output. In this configuration up to four serial ASCII channels can have access simultaneously with the public memory 33. Each serial ASCII channel has selectable speeds up to 9,600 baud. Serial channel interfacing is by means of four wires and obeys full duplex RS 232 protocol, this protocol being known in the art. Transfers can be by a character at a time, fixed length records at a time, or variable length records with terminator characters. All characters are under control of the microprocessor 36 associated with the MIO.

FIG. 13 illustrates the use of an MIO to control up to two disks 48 and 49 on separate parallel channels associated with direct memory access interface 38. These disks can be considered external devices 31 as shown in FIG. 1. The disks typically have a simultaneous transfer rate of 1.2 megabytes per second on each channel 28. The channels are totally independent enabling reads and writes to take place simultaneously on both disks. The microprocessor 36 in conjunction with the hardware controller of the direct memory access interface handles all of the handshaking with the disks, including error detection and correction.

Neither the central processing unit nor the bus 26 is used in the data transfer, thus completely eliminating one of the major causes of system slowdowns in classical computer architectures. Multiple disk MIO's can be connected to a single bus, each of which runs independently of the other MIO's in the interconnected CPU area.

FIG. 13A is a more detailed block diagram of a central processing unit 22. The central processing unit is built around series bit slice logic and in the preferred embodiment of the present invention uses the 2901 bit slice logic series of components built by both Motorola and Advanced Micro Devices of 901 Thompson Place, Sunnyvale, Calif. 94086. This series of devices is a variable width processor which is controlled by a writable control store 52. In essence the bit slice processor is a series of four-bit chips that are put side by side to make up a 64-bit word which is utilized in the central processing unit 22. For arithmetic operations there are also carry forward and borrow bits that can shuffle to the right or the left of this 64-bit word.

Instructions to the central processing unit cause micro-instructions to be executed from the writable control store. In the preferred embodiment of the present invention this writable control store has a 4,000×128 bit memory. The micro-instructions are user programmable in order to allow flexibility to the user. The central processing unit has sixteen 32-bit general purpose registers 52.

As was noted earlier, the memory associated with each MIO 24 is 32 bits wide. That means that 32 bits of information can be moved into or out of the memory every 500 nanoseconds. However, as explained earlier, the public memory of the MIO is only associated with the CPU during one of three phases of the 1.5 microsecond clock cycle. Therefore, the central processing unit only sees one-third of that nanosecond rate which corresponds to 32 bits every 1.5 microseconds. In this way, the computer takes advantage of the memory at the highest rate that it can function without degrading its performance but also provides for relatively reliable bus operation by not requiring the bus 26 to operate with full data transfers every 500 nanoseconds. The 2900 series bit slice logic used in the central processing unit 22 operates in the 50 to 125 nanosecond time frame as can the writable control store. By means of this architecture, all of the selected components can be used to their fullest advantage. That is, current state of the art memory access times have a high reliability in the 500 nanosecond range as used in the public memory and writable control store, while the bus 26 when used to service up to 15 MIO's and an associated CPU, by having a length of approximately 10 feet, has a reliable speed in the 1.5 microsecond range. Thus, the bus runs at a speed that is convenient to it while the memory at the MIO runs in a speed that is convenient to it while the bit slice chips in the CPU operate at a speed that is compatible with the other circuit components. Thus, there are no artificial bottlenecks within the computer architecture of the present invention. That is, the present invention is a computer architecture which utilizes the maximum number of process bits through a given configuration.

Referring again to FIG. 13A, the central processing unit further incorporates a microprocessor 54 whose function is for hardware diagnostics and for loading the microcode into the writable control store when specified by the user and during power start up. Thus, the microprocessor 54 is not involved with the actual computation performed by the central processing unit. A standard microcode set can be utilized within the writable control store to support a wide range of logical fixed and floating point operations. The writable control store 52 is used to generate instructions in a virtual manner to operate with software that is used in conventional machines. Thus the 64-bit wide bit slice processor 50 is really limited in doing three things—moving bit to the left and right, adding in a binary fashion, or selecting registers. An instruction such as "multiply" is thus out of the scope of direct performance by the bit slice processor. But a multiply is really a sequence of add and shifts, and thus a subroutine that selects the appropriate register "adds" and "shifts" is located in the writable control store. When regular software specifies a "multiply" instruction, a pointer goes to the appropriate subroutine in the writable control store which then instructs the bit slice processor how to perform the requested instruction. It is thus the writable control store that stores the microcode for performing the user designated instructions.

The use of a 64-bit wide word in the central processing unit allows the computer to do high precision arithmetic with double word accuracy. Thus two consecutive 32-bit words are put side by side within the accumulator of the bit slice processor when an arithmetic operation is to be performed from such data. For instance, if a multiplication of two 32-bit words is performed, the result ends up as a 64-bit word and it is thus much easier to use a 64-bit accumulator than a 32-bit accumulator.

A basic set of microcodes stored in the writable control store can represent the assembler level language which the user normally uses to write his application programs. However, the capability does exist for the user to write his own microcode for specialized applications.

Sixteen 32-bit registers 89 for general use are also with CPU 22. Finally, a clock 56 which communiates with bus 26 generates the three-phase clock cycle, each phase having a 0.5 microsecond duration. Referring to FIG. 1, it should be noted that the first central processing unit 22 is solely utilized for the clock function. When other central processing units are coupled to the first central processing unit by an interprocessor buffer (IPB), the third clock phase of the first central processing unit is used for communication between the IPB and the second central processing unit, such as CPU 22'. Thus the third phase clock cycle of the first central processing unit is interpreted as the first clock cycle of the additional central processing unit. Thus, the slave bus 26' is truly a slave and is not activated by clock cycles from the second CPU but only from clock cycles of the first CPU. The circuitry resident within the additional central processing unit synchronizes its clock and allows tolerance for deskewing.

FIGS. 14, 15 and 16 illustrate the packaging of computer 20. The lower pedestal portion 58 houses constant voltage transformers and rectifiers necessary for generating the raw DC power for energizing the power supplies modules 59 which are used in turn to power the central processing units 22, MIO's 24 and IPB's 32. (See FIG. 1) The MIO's, IPB's, CPU's are individually housed in blocks 60 which combine with the power supply 59 and bus module 61 to form what is called a functional support unit 62. The functional support unit is thus a housing and power supply for two blocks, each block being either a CPU, MIO, or IPB. These blocks are field installable modules. The power supply 59 provides the smoothed DC power to drive each block 60. The power supply 59 includes a CRT 64 and four control switches 65, which are under the control of a microprocessor resident within the power supply. The CRT is used to display in plain English the hardware status of the blocks 60 as well as the power supply 59. The switches are used for hardware control of the blocks 60. As is evident in FIG. 15 the functional support units can be stacked on top of each other. In addition, since the MIO'DMA input/output can be associated with a disk, a disk drive module 66 can be placed atop pedestal 58, in essence taking the place of one of the functional support units.

FIG. 16 illustrates in more detail the functional support unit internal configuration. As seen therein, the input/output channels from the blocks 60 emanate from the rear portion of the blocks 60. These blocks have an approximate relay rack width and the two may slide in and out of the functional support unit 62.

The disks within the disk drive module 66 are of the Winchester-type and have moving heads. For high reliability these disk drives have a non-removable field storage medium. Since the heads are integral with the sealed storage medium, no head alignment is required as in other types of disk drive modules. The data transfer rate is 1.2 megabytes per second, thereby allowing each MIO to potentially service two disk drive modules. The spindle speed of these modules is 3,600 revolutions per minute, while the access time is 10 milliseconds to 60 milliseconds with a latency of 8.3 milliseconds average.

As best seen in FIG. 17 a CRT terminal 68 is the basic unit by which the user communicates with the computer. This terminal is thus another one of the external devices 31, shown in FIG. 1, that can be interconnected with one of the MIO input/output channels. The terminal incorporates a color CRT screen 69 which makes possible a more sophisticated user interface to the computer system. It also has a full upper and lower ASCII keyboard 70, as well as a 3M cartridge tape receptacle 71 for use in program loading and storage. The terminal can be connected to any of the serial ASCII ports 30 associated with the MIO's and communicates with the MIO's at 9,600 baud. Alternatively, the terminal could operate from one of the DMA input/output ports 28 for providing full page real time display of data within a particular MIO. In this configuration the user, with appropriate controls, can actually "flip" through "pages" of data stored in the MIO's in a manner analogous to flipping through the pages of a book. This function, which is user controllable from the CRT terminal 68, can provide a means to easily access information within storage where a particular address is unknown to the user.

FIG. 18 illustrates a line printer 72 that can be interconnected as an external device 31 to one of the serial input/output ports 30 associated with an MIO 24. The line printer in the preferred embodiment of the present invention is manufactured by Printronix of 17421 Derian Ave., Irvine, Calif. 92714. It has a print capability of up to three hundred lines per minute. It is a matrix printer and can print a full upper and lower case ASCII set.

Printing can be up to one hundred and thirty-two columns wide on up to six part paper. This printer also has full graphic capability, enabling it to plot graphs and drawings with up to one thousand points per line.

FIG. 19 illustrates the types of instructions that are utilized by the computer 20. The central processing unit 22 executes thirty-two bit macro instructions 73 that it receives from one of the public memories 33 associated with any MIO 24. These macro instructions are of the familiar operation code, source, destination and modifier format. The central processing unit executes an instruction by a series of micro instructions 74 which control the 2900 series bit slice processor 50 associated with the CPU. The macro instruction addressing modes include immediate, register, direct, indirect, indexed, and stack. The data modes include bit, byte, halfword, word, doubleword, floating point, double precision floating point, decimal, and packing decimal. The instructions of course can vary for the particular application to which the computer is assigned. The instructions shown in FIG. 19 are specific to an application utilizing the 2900 series bit slice processor and specifically with a language associated and particularly formated for the disclosed computer, having a pseudonym "FASL". As shown in FIG. 19 the execution of the instruction first requires a fetch from the public memory 33 for the macro instruction, the macro instruction pointing to a particular micro instruction nest of code which configures the 2900 series processor into a special configuration, by means of the writable control store 52. The result may be stored in temporary thirty-two bit registers 89 for later use. This procedure in instruction fetching and solving is well described in 2900 series bit slice processor literature.

SUBSECTION DETAILS

BUS DESCRIPTION

One important characteristic of the bus is that it is synchronous as are all system activities, using the bus as a sync reference. Although this does not make for maximum burst transfer rate, it insures predictability and total transparency of DMA and microprocessor activity. This is much more important in terms of overall philosophy. Moreover, the 1.5 microsecond bus transition time permits multiplexing of address and data on the bus signal lines making possible interconnection of blocks in a clean and straightforward manner. Within the CPU, microcode cycles are also synchronized to the 500 nanosecond clock so that resychronization overhead is not required and all system activities proceed without random phase relationships.

BUS—INTRODUCTION

This specification defines the main bus of the digital computer 20. The bus is a moderate-speed, parallel interface between blocks 60 which provides for bidirectional data transfer, initialization, system configuration, and all communication between blocks.

The bus connection is made with 3M-style flat cables and connectors. All signals are in parallel to all blocks and all slots on the bus are identical.

Timing on the bus occurs in three-phase cycles, referenced to a master clock. Each cycle permits a memory access by the bus. One phase is dedicated to local microprocessor access and refresh of the large RAM 41 in each block. The second phase is used for bus access to the RAM, and the third phase is used for DMA data transfer in those blocks that require high-speed transfer.

All bus operations are on full 32-bit words. The CPU 22 may modify a byte if it rewrites the other three bytes at the same time.

BUS—MECHANICAL (see FIG. 1, bus 26)

The bus is carried on three 50-conductor 3M-style flat cables, each cable provides 22 signal wires, 4 +5 v wires, and 24 grounds.

A cable assembly consists solely of cable and female connectors. Assuming each block has bus connectors only on its lower board, two more connectors are needed than blocks in the system. A terminator plugs into the remaining connector at each end.

All terminators are identical. Each contains 44 resistors, 3 capacitors, and a 3M male connector. This should nestle in an appropriate slot in the side of the top and bottom blocks on the bus.

It is expected that cable length will not exceed 20 ft. in this system, more likely 10 ft. for a single cabinet system. The three bus connectors occupy the frontmost three positions of the six available at the edge of the lower board in each block. IPB blocks use the rear three positions.

All connectors have similar pin assignments so that identical terminators can be used. Furthermore, any cable or terminator can be plugged in upside down and will still work properly.

Every signal is shielded between two grounds. The CPU board supplies +5 v on pins 24 thru 27 for the terminators (max. 1.32 amp per cable.)

BUS—ELECTRICAL

Bus logic levels are open collector "party line" TTL. Receivers with hysteresis or high threshold are used to provide noise immunity. With the exception of special power sequencing control lines, all signals are active-low, open collector.

Each bus line is terminated at both ends with a 120 equivalent resistor divider which establishes a +3 v minimum high level when the line is open. Drivers must be able to sink minimum 60 mA at maximum 0.8 V. Receiver thresholds, must guarantee 1 volt minimum noise immunity at high and low levels.

A recommended terminating network is shown in FIG. 23.

Recommended alternate transceivers are AM26S10, AM26S11 (second sourced by TI) and AM2905-7 (second sourced by Motorola). These devices all are capable of sinking 100 ma @ 0.8 V and thus are acceptable drivers for any line. All are quads.

In the present design, the AM26S10 transceiver is used throughout.

FIGS. 24A and 24B give a comparison of thresholds and show typical cable waveforms.

CLOCK

The clock 56 is well isolated from other bus and system signals to minimize noise and distortion of rising and falling edges since either edge may be used by a block for timing. The falling edge is the primary timing event. Pulse-to-pulse jitter observed at the receiver output within a block should not exceed ±10 ns with respect to this edge of ±20 ns at the rising edge. Asymmetry of the clock waveform as observed at the receiver output within a block should not exceed ±10 nsec from the nominal midpoint of each clock interval. FIG. 25 illustrates this clock waveform.

SYSTEM TIMING

CLOCK AND SKEW (See FIGS. 13A and 26)

All system timing is derived from a single phase clock 56 at 4.00 MHz, 50% duty cycle. This is generated with an 8.00 MHz crystal oscillator and a flipflop on the CPU board, and is driven on the bus 26 with a standard open-collector driver.

The clock is received with standard receivers having hysteresis. This, plus the delay along the length of the bus, implies that a block's conception of where the clock edge occurs may differ up to ±50 ns from the CPU's conception of the same clock edge. Since only one receiver per block may actually be on the bus, the block must use the output of this receiver as its reference.

Worst-case occurs with CPU and addressed block at opposite ends of the cable. Both CPU and block use the same receiver type from different manufacturers, which may have widely differing propagation delays, but this is the closest that the two clocks can come to simultaneity in practice. Using the signal that drives the clock in the CPU is unsuitable, because in multiprocessor configurations, the IPB pulls down a bus line called SLAVE, which disables the clock and sync drivers in the CPU. On the slave bus (e.g., 26' in FIG. 1), the clock and sync are driven by the IPB. Besides, the extra skew introduced by the driver chip would be unwelcome.

Expecting a propagation delay of 2 ns/ft. max., a 10 ft. bus would cause 20 ns difference between the same reference falling edge at opposite ends of the bus; a 25 ft. bus would cause 50 ns difference.

Using 26S10, max. propagation delay is 30 ns; typical is 18–20 ns; minimum unspecified, conservative estimate 5 ns, allowing a total of 25 ns skew due to differences between chips. The total skew if the CPU has a fast receiver and the block has a slow one, is +75 ns later than the CPU sees the clock edge. Any further buffering of the clock on either board adds to the problem.

Allowing the data to remain for one more edge (either polarity) allows a minimum 100 ns of deskewing, which should handle worst case for both edges. The worst case negative skew would be a fast receiver IPB driving a slow receiver CPU at the opposite end of the bus. The CPU would lag 75 ns, so 25 ns deskewing is assured when opposite clock edges are used.

To insure consistency of bus timing, all units drive the bus clock on the falling edge (as observed on the bus itself). All units receiving signals from the bus clock on the previous rising edge. The signal called SYNC is a special case. This signal changes at the rising edge of clock.

SYSTEM OVERVIEW

FIGS. 1 and 27 present an overview of the digital computer 20. A basic system consists of a bus, a CPU, and one of more MIO units. A maximum of sixteen blocks (comprising MIO's, IPB's or disks) may be attached to a bus. Multiprocessor configurations are achieved by use of the IPB.

As seen in FIG. 16, blocks 60 are mounted in functional support units 62 (FSU). An FSU contains a maximum of two blocks and its own power supply. FSU's stack together on a pedestal. Blocks are connected via the bus. Certain bus signals are also available to the FSU.

A unique feature of the digital computer is that each block in the system, including the power supply, is microprocessor controlled. A Motorola 6800 provides several functions on each block including: Module initialization, diagnostic capability, I/O handling, and DMA control. The exact functions of each 6800 on each module will be discussed with the module.

HARDWARE SELECTION

An important feature of the digital computer system is its extensive use of dynamic NMOS RAMS. These are, at present, the highest density form of this well established memory technology. The CPU uses 4K rams as its microcode store and MIO's use the 16K ram as the primary "core" of the system. These devices were chosen because there is a great deal of activity in the semiconductor industry in this area of development, with 64K chips now appearing on the horizon and 16K RAMS well established. Motorola was selected as a prime source for this chip due to their conservatism and volume production capabilities. These devices are, in addition, available from several other vendors and, as stated earlier, conservative timing allows the use of the highest yield parts. Since Dynamic NMOS memory have highly capacitive inputs and since they generate large current spikes when operating, careful attention has been paid to address drivers and memory power distribution. As stated earlier, local regulating and interlock circuitry serves to protect chips against many contingencies including in process mishandling. In addition, this technique tends to isolate current switching spikes from other power supply busses.

The CPU arithmetic unit uses the AMD2901 bipolar 4 bit slice microprocessor chip. This chip is now commonly used in the industry and is available from several vendors. The new 2903 chip contains several enhancements including improved multiply and divide logic plus register file expansion hooks.

The 6800 Motorola microprocessor is used extensively throughout the system. This approach has been taken so that firmware development facilities and techniques can be standardized. Standard ROMs, RAMs, and peripherals are used with this microprocessor in such a way that every module has a standardized memory map and an onboard debugger port. It is believed that this is a significant step towards manufacturability and maintainability.

Mass memory is of two types, Winchester Disk and 3M Data Cartridge cassette. Winchester Disk technology uses a radial arm positioned moving head assembly within a sealed cartridge. The head positioner uses a prerecorded servo track on one of the disk surfaces as a feedback mechanism for seeks. The Control Data Corporation 24 and 80 megabyte (unformatted) can be used. The disk will be used primarily for mass memory, not for swapping. When used, large (4K byte records) will be transferred via a DMA channel to the MIO transparent to the system bus. The 6800 located on the disk controller MIO will translate the record number requested by the system to a physical disk address and will perform the required operations to transfer the data to memory. File management will be kept very simple, with track replacement and protection handled entirely by tables stored locally by the 6800. The reduced average number of seeks performed by the disk should increase its overall MTBF.

In a similar fashion, the 3M tape cassettes which are located at the user's terminals (TAP) and are used primarily for loading and backing up of files, will not be used as an active storage device, thus keeping the number of passes across the tape head to a minimum and promoting longer life. In addition, the tape will initially be operated at the ANSI standard 1600 BPI format until such time as 6400 BPI technology is firmly established.

Units will contain various built-in test features permitting exercise of module functionality to the interface level. Loopback tests on communication channels and on the bus will be accomplished under control of local 6800 processors. Verification of connector integrity and power supply voltage application by the FSU microprocessor will be performed, as mentioned earlier. Performance testing firmware will be built into the operational program for each MIO using the hardware facilities described in addition to normal operational paths.

As mentioned earlier, the address map of each 6800 has been standardized as shown in FIG. 27. An onboard debugger is always resident in the system. This is used both for firmware development and can be used for field service debug. It is a port allowing access into any unit to permit inspection of I/O points, running of diagnostics, testing of memories, or dumping of contents.

Each 6800 system also contains a "dead man" interlock device which forcibly resets the microprocessor if it fails to honor interrupt for an excessive period of time. This may be considered a performance monitor. A block output signal related to this timer is monitored by the FSU microprocessor as a status indication of the "run" condition of each block. In addition, the "dead man" timer reset feature insures that a diagnostic command can have unconditional access to the 6800 in a situation where the firmware/hardware is causing "pathologic" behavior.

Each block attaches to the bus which provides data, control, and timing signals synchronously to all modules. Each bus has one and only one CPU module. The master CPU generates timing pulses which are passed to slave CPU's via the IPB. A bus may have a maximum of fifteen IPB modules. They each must interface to a different bus to allow for proper timing chains.

System I/O is handled via the MIO blocks. Each MIO module provides four serial I/O channels and may provide one or more 32 bit DMA channels. Maximum I/O throughput is specified at 2.67 megabytes per second. The DMA channel allows one 32-bit transfer in either direction per bus cycle (1.5 microsecs). Interprocessor communications appear as a DMA operation through an IPB.

The computer supports eight levels of interrupt from each block. Each block may request interrupts on several levels simultaneously. The CPU uses a polling mechanism to determine which block generated the interrupt request at each level. The interrupt request at each level is the 'OR' of the requests from each block at that level. Thus multiple blocks may interrupt at the same level. The CPU may generate an outerrupt to any block on the bus. An outerrupt indicates to the addressed microprocessor that an extraordinary event has occurred. Data is stored in a predefined location in the RAM area.

BUS (See FIGS. 1 and 27)

The bus is the interface between blocks in the computer. It is a parallel, synchronous data and control bus. Data transfers are bidirectional and 32-bits wide. Control signals include command, initialization, timing, and status information.

BUS TIMING

The bus is a synchronous device and provides the master system timing pulses to all blocks. Each bus cycle is 1.5 microsecs long and is initiated by the SYNC pulse. Each cycle consists of three phases: PHφ, PH1, and PH2. Each block also runs on the same cycle and the phases define both local and global activities.

The cycle phase determines the interpretation of the data lines on the bus as shown in Table 1:

TABLE 1

| Phase | Data Lines |
|-------|------------|
| PHφ | Memory Address |
| PH1 | Memory Address |
| PH2 | Data |

The use of these timing phases with respect to memory access will be discussed later.

In a multiprocessor configuration, the SYNC signal is propagated through the IPB from the master CPU. On a slave bus, the normal timing is disabled by the SLAVE signal. This allows the IPB to assert the timing signal from the master bus to the slave bus. The IPB delays the SYNC pulse for one phase to the slave bus. This phase delay synchronizes accesses to the memory in the IPB by the master and slave buses as shown in Table 2:

TABLE 2

| Master Phase | Slave Phase | Master Activity | Slave Activity |
|--------------|-------------|-----------------|----------------|
| PHφ | PH2 | Memory Address | Data |
| PH1 | PHφ | Memory Address | Memory Address |
| PH2 | PH1 | Data | Memory Address |
| PHφ | PH2 | Memory Address | Data |
| PH1 | PHφ | Memory Address | Memory Address |

The phase delay allows for proper access of the IPB memory which is used for data transfers between processors.

There are three types of bus activities: memory access, interrupt, and initialization.

Memory Access Cycles

Memory access cycles permit five types of operations to be performed: read, write, transfer, outerrupt, broadcast. FIGS. 28 and 30-33 show the activity during each phase for these operations.

Read Cycle

The read cycle allows the CPU to read 32-bits of data from either an MIO or an IPB. The read starts at the beginning of PHφ when the CPU places the address on the data lines and makes the READ signal true. These are held until the end of PH1 while the data is being fetched. During PH2, the data is placed on the bus and READ is made false.

Broadcast

The broadcast feature allows access to more than one MIO/IPB for a read/write operation. All blocks which are enabled to receive broadcast messages respond. High-order address bits are ignored. On a read operation, the data on the bus is the 'OR' of the read data from each block. A write operation places the same data in each block.

Interrupt Cycles

A block requests an interrupt in the CPU by asserting the interrupt line corresponding to the level at which the block wishes the interrupt to be handled. A block may request an interrupt on up to eight levels simultaneously. A block continues to assert the requests until the CPU acknowledges the request. CPU handling of an interrupt request is via a poll and acknowledge sequence.

Interrupt Poll Cycle

The CPU executes a poll cycle when it wishes to determine the source of an interrupt request. INT POLL is made true and bits 24-26 of the data bus are loaded with the interrupt request level during PHφ and PH1.

Write Cycle

The write cycle allows the CPU to write data to memory in either an MIO or an IPB. Write requires three phases but the phases overlap bus cycles. The data is placed on the bus during pH2 and the address is loaded during PHφ. The actual memory write occurs during PH1. Because the data is latched, writes may take place on consecutive cycles at different memory locations with the same data.

Transfer Cycle

The transfer cycle is a combined read and write cycle. The data from the read is latched during PH2 of the cycle and used as write data during the next cycle. A memory-to-memory transfer can be made external to the CPU using just the characteristics of the bus.

Outerrupt

The outerrupt is a write cycle which causes a flag to be set in the MIO/IPB microprocessor. The flag indicates a high priority activity has been loaded into the RAM for the microprocessor's attention.

During PH2 of the cycle, all blocks having a request at that level set the appropriate bit in bits φ-15 of the data bus to identify themselves. The CPU then has a list of all blocks requesting an interrupt at a given level.

FIGS. 29 and 34 illustrate the interrupt poll logic.

Interrupt Acknowledge Cycle

The CPU executes an interrupt acknowledge cycle. The interrupt acknowledge cycle involves a read with the INT ACK line true. The address on the data bus is used to specify a block in the requesting device and an address within that block that contains data for that interrupt request. The INT ACK signal also causes the block to clear its request at that level.

Initialization

Each block has its own initialization sequence which is controlled by the resident microprocessor. With respect to the remainder of the system, the ANONYMOUS signal is set true, address registers cleared, and block number is reset. This initialization is always performed on power-up and may be performed on request from the CPU.

Initialization Cycle

The initialization cycle is activated when the CPU asserts INIT as true during PH$\phi$ and PH1 of a cycle. This is the same as a power-up sequence and results in all memory and block assignments being reset.

Block Number Assignment

Memory and block number assignment is accomplished under command from the CPU. Block numbers are assigned to blocks in memory size order. The largest blocks have the lowest numbers. A series of interactions via the bus enables each block to determine its unique position on the bus and to set its address limit registers.

The sequence is started when the CPU asserts STEP during PH$\phi$ and PH1. Each block immediately sets its BUSY line, does initialization, clearing BUSY when complete. At this time, the block puts its high-order memory bit on the SERIAL DATA line. A sequence of functions is performed which allows the MIO/IPB module to dynamically assign their memory space and block number. Blocks are numbered with the largest module having the lowest number and base address registers. The smallest module will have the highest block number and highest memory space. Blocks with the same memory size are ordered by serial number. An optional manual setting is provided.

The block assignment loop is executed by the CPU until all blocks have been assigned. This is indicated by the ANONYMOUS signal going false. Each block then knows its address range and block assignment number. System configuration thus becomes a power-up function and is transparent to the user.

TERMINAL DEBUGGER DESCRIPTION

The terminal debugger is the basic software package for the 6800 microprocessor. The software is ROM resident and is initiated after the power up sequence has been completed.

Each block contains a 6800 and the common part of the terminal debugger is found in each of the 6800's. To interface with the terminal debugger all blocks have 300 baud debugger ports that communicate with standard ASCII characters, even parity, one stop bit. The terminal debugger operates in full duplex, echoing all characters it receives from the terminal, assuring the user that the terminal debugger is listening because it controls the user's display.

The terminal debugger description is set forth in Table 3.

198-003

TABLE 3
TERMINAL DEBUGGING DESCRIPTION-I
(PRIMITIVE. CHARS)

| CHARACTER | RESPONSE | EFFECT |
|---|---|---|

***NUMBERS

| | | |
|---|---|---|
| 0-9 A-F | ECHO | *ACCUMULATES 1-4 DIGIT NUMBER. |
| - | ECHO | *UNARY MINUS, NEGATES FOLLOWING DIGITS. |

NOTE: IF MORE THAN 4 DIGITS ARE TYPED, THE NUMBER IS CONSTRUCTED FROM THE LAST 2 OR 4 DIGITS. A MINUS SIGN IS RETAINED, NO MATTER HOW MANY INTERVENING NUMBERS ARE TYPED.
TERMINAL DEBUGGER IS AWARE OF WHETHER 1 OR 2 BYTES HAVE BEEN OPENED AND WHEN UPDATING LOCATIONS (AS WITH nn^), IT UPDATES EITHER 1 OR 2 BYTES, DEPENDING ON WHAT WAS OPEN.

***HARDWARE MANIPULATION

| | | |
|---|---|---|
| [ctrlI] | CRLF* | *TOGGLES INTERRUPTS. |

***STRING MANIPULATION

| | | |
|---|---|---|
| [SPACE] | ECHO | *NONE |
| [ESC] | CRLF | *NONE |
| [DEL] | # | *REMOVES LAST CHARACTER FROM STRING |
| [ctrlX] | )CRLF* | *FLUSHES ENTIRE STRING |
| [ctrlR] | CRLFstring | *REDISPLAYS COMMAND STRING. |

***LOCATION EXAMINATION AND MODIFICATION

| | | |
|---|---|---|
| nnnn/ | mm | *OPEN LOCATION nnnn,REMEMBER THE OPEN *LOCATION AND DISPLAY CONTENTS. |
| / | mm | *REOPENS AND DISPLAYS CONTENTS OF REMEMBERED *LOCATION. |
| nnnn\ | mmmm | *OPEN LOCATION nnnn,REMEMBER THE OPEN *LOCATION AND DISPLAY DOUBLE-BYTE *CONTENTS. |
| \ | mmmm | *REOPENS AND DISPLAYS DOUBLE-BYTE *CONTENTS OF REMEMBERED LOCATION. |
| [CR] | CRLF* | *CLOSES OPEN LOCATION. |
| nn[CR] | CRLF* | *REPLACES CONTENTS OF OPEN LOCATION WITH nn *AND CLOSES IT. |
| nn! | space | *REPLACES CONTENTS OF OPEN LOCATION WITH nn *AND LEAVES IT OPEN. |
| [LF] | CRLFnnnn/mm | *CLOSES OPEN LOCATION,INCREMENTS *LOCATION POINTER,OPENS AND *DISPLAYS THE NEW LOCATION. *IF 2 BYTES WERE OPEN, LOCATION *POINTER IS INCREMENTED TWICE, *AND 2 BYTES ARE OPENED. |
| nn[LF] | CRLFnnnn/mm | *SAME AS [LF],EXCEPT UPDATES OLD *LOCATION WITH nn FIRST. |
| ^ | CRLFnnnn/mm | *LIKE [LF],EXCEPT IT DECREMENTS THE *LOCATION COUNTER. |
| nn^ | CRLFnnnn/mm | *LIKE ^, EXCEPT UPDATES OLD *LOCATION WITH nn FIRST. |

NOTE: ON THE D.G. TERMINALS, THE UP ARROW AND DOWN ARROW ON
THE FUNCTION KEYPAD OPERATE LIKE ^ AND [LF], RESPECTIVELY.

| | | |
|---|---|---|
| @ | CRLFnnnn/mm or mmmm | *OPENS THE MEMORY LOCATION CONTAINED *IN THE OPEN LOCATION AND DISPLAYS *ITS CONTENTS. |
| nnnn@ or nn@ | CRLFnnnn/mm or mmmm | *REPLACES CONTENTS OF OPEN LOCATION *WITH nn OR nnnn, OPENS MEMORY *LOCATION nn OR nnnn, AND DISPLAYS *ITS CONTENTS. *(nnnn or nn = OPEN LOC.) |

NOTE: THE ABOVE TWO INSTRUCTIONS BEHAVE DIFFERENTLY,DEPENDING ON
WHETHER A BYTE OR A DOUBLE BYTE IS OPENED. IF A BYTE IS OPENED,
THE LOCATION ADDRESSED IS TAKEN TO BE AN 8-BIT QUANTITY. IF A
DOUBLE-BYTE IS OPENED, THE QUANTITY IS TAKEN TO BE A 16-BIT
QUANTITY. SIMILARLY, THE LOCATION OPENED IS A BYTE OR DOUBLE BYTE.

| | | |
|---|---|---|
| > | CRLFnnnn/mm | *OPENS THE MEMORY LOCATION *RELATIVELY ADDRESSED BY THE OPEN *LOCATION AND DISPLAYS ITS CONTENTS. |
| nn> | CRLFnnnn/mm | *REPLACES THE CONTENTS OF OPEN LOC. *WITH nn, OPENS THE LOCATION RELATIVE- *LY ADDRESSED BY nn, AND DISPLAYS ITS *CONTENTS. *(nn+PC+2 = OPEN LOC.) |
| X | CRLFnnnn/mm | *OPENS THE MEMORY LOCATION INDEX *ADDRESSED BY THE OPEN LOC. AND *DISPLAYS ITS CONTENTS |
| nnX | CRLFnnnn/mm | *REPLACES THE CONTENTS OF OPEN LOC. *WITH nn, OPENS THE LOCATION *INDEX ADDRESSED BY nn, AND *DISPLAYS ITS CONTENTS. *(nn(unsigned) + INDEX = OPEN LOC.) |
| < | CRLFnnnn/mm or mmmm | *RETURN TO PREVIOUSLY OPENED *LOCATION AND STATE. |

***STATUS DISPLAY

```
S(CR)              display cpu regsCRLF*   'DISPLAYS CONTENTS OF ALL 6800
                                           'REGISTERS.
RC                 =nn                     'DISPLAYS CONTENTS OF CONDITION C
RA                 =nn                     'DISPLAYS CONTENTS OF REGISTER A.
RB                 =nn                     'DISPLAYS CONTENTS OF REGISTER B.
RX                 =nnnn                   'DISPLAYS INDEX REGISTER
RP                 =nnnn                   'DISPLAYS PROGRAM COUNTER
RS                 =nnnn                   'DISPLAYS STACK POINTER
***PROGRAM CONTROL
G                  space                   'BEGIN PROGRAM EXECUTION AT OPEN
                                           'LOCATION.
nnnnG              space                   'BEGIN PROGRAM EXECUTION AT nnnn.
nnnnSB             CRLF*                   'SET BREAKPOINT AT LOC. nnnn.
SB                 CRLF*                   'SET BREAKPOINT AT OPEN LOCATION
nXB                CRLF*                   'DELETE BREAKPOINT NUMBER n.
XB                 CRLF*                   'DELETE ALL BREAKPOINTS.
```

NOTE: WHEN A BREAKPOINT IS ENCOUNTERED DURING EXECUTION, TERMINAL DEBUGGER
RESPONDS: "Bn:mmmm" WHERE n IS THE BREAKPOINT NUMBER, AND
mmmm IS THE BREAKPOINT ADDRESS.
BREAKPOINTS ARE NUMBERED 0-7. IF A SWI IS ENCOUNTERED WHICH
IS NOT A SET BREAKPOINT, THE SYSTEM LABELS IT AS BREAKPOINT 8.
IT WILL NOT BE CLEARED BY THE XB COMMAND.
EXECUTION THRU A BREAKPOINT IS NOT PERMITTED.

```
***BLOCK MEMORY MANIPULATION nnnnL(CR)          CRLF*                   'SET LOW MEMORY BOUNDARY
nnnnH(CR)          CRLF*                   'SET HIGH MEMORY BOUNDARY
nnM(CR)            CRLF*                   'SET MEMORY MASK
nnMF               CRLF*                   'MEMORY FILL
nnnnMV             CRLF*                   'MEMORY BLOCK MOVE TO nnnn
nnnn,nnnn,nnnnSF   CRLF*                   'SEQUENTIAL FILL FROM CURRENT LOC.
nnMS               display matches         'MEMORY SEARCH
XL                 CRLF*                   'SCRATCH LIMITS
```
(SAMPLE. TERMINAL DEBUGGER)
USER INPUT IS UNDERLINED (lf) -- line feed
(cr) -- carriage return
(d)  -- delete character (DEL)
(x)  -- delete line (ctrl X)
(e)  -- escape (ESC)
(r)  -- reprint command line (ctrl R)

---

*4000/nn   FF(lf)          [open 4000, insert an FF, and open 4001]

4001/nn    FF(cr)          [put FF in location 4001 and close]

*S [bell]?                 [illegal string]

*FE(d)= 7F7(x)             [delete character, then delete line]

*/FF   34(cr)              [reopen last location and insert 34]

*/34 (lf)                  [reopen last, then open next location]

4002/nn   80^              [insert 80 in next location, open previous]

4001/34(cr)                [close]

*4   000/FF   1(e)         [open 4000 and insert 12]

| | |
|---|---|
| 2[cr] | [spaces and escape are ignored by TERMINAL DEBUGGER] |
| */12 \1234[cr] | [open previous location, then open the] [double-byte there and close] |
| *4001\3480 0[lf] | [open double-byte at 4001 and insert 0000] |
| 4003\nnnn [cr] | [then open next double-byte and close] |
| 44444000/12 1234[cr] | [open 4000 (only the last 4 chars count] |
| */34[cr] | [the 34 got inserted, because only one] [byte was opened] |
| *123456[d]#[d]#[d]#[r] | [delete characters and reprint line] |
| 123[e] | [delete command line] |

M6800 MEMORY ALLOCATION

ADDRESS

| | |
|---|---|
| 0 | UNUSED, INITIALIZED TO BRA 0 |
| 2 | |
| | TERMINAL DEBUGGER FAST FLAGS |
| 3F | |
| 40 | |
| | UTILITY DIRECT MEMORY |
| FF | |
| 100 | |
| | TERMINAL DEBUGGER COMMON |
| 13F | |
| 140 | |
| | TERMINAL DEBUGGER COMMAND LINE |
| 17F | |
| 180 | |
| | STACK |
| 1FF | |
| 200 | |
| | UTILITY RAM |
| | (P/S DISPLAY MEMORY) |
| FFF | |
| 1000 | |
| | (RAM EXPANSION) |
| 3FFF | |
| 4000 | |
| | SHARED MEMORY (MIO & CPU) |
| 7FFF | |
| 8000 | |
| | TERMINAL DEBUGGER ACIA (TERMINAL DEBUGGER PORT) |
| 8003 | |
| 8004 | |
| | GARBAGE PIA |
| 8007 | |
| 8008 | |
| | OTHER IO |
| 8FFF | |

```
9000 |
     | (IO EXPANSION)
BFFF |

C000 |
     | C0-CHIP
C7FF |

C800 |
     | C8-CHIP
CFFF |

D000 |
     | D0-CHIP
D7FF |

D800 |
     | D8-CHIP
DFFF |

E000 |
     | E0-CHIP
E7FF |

E800 |
     | E8-CHIP
EFFF |

F000 |
     | F0-CHIP - TERMINAL DEBUGGER APPLICATION
     |
F7F7 | JMP  TERMINAL DEBUGGER-NON-PRIMITIVE
F7FA | JMP  POWER-UP-APPLICATION
F7FD | JMP  INTERRUPT-APPLICATION
F7FF |

F800 |
     | F8-CHIP - TERMINAL DEBUGGER KERNEL
     |
FFF7 | SWI INSTRUCTION
FFF8 | INTERRUPT REQUEST
FFFA | SOFTWARE INTERRUPT
FFFC | NON-MASKABLE INTERRUPT
FFFE | RESET
FFFF |
```

6800 Microprocessor Operating System

The purpose of the 6800 microprocessor operating system is to provide system initialization and initial program load, input/output processing and control, diagnostics, and interprocessor communication and control.

The 6800 microprocessor operating system functions include power-up initialization, power-down and failure sequencing, performance input/output, monitoring hardware behavior, performing basic hardware diagnostics, and monitoring and responding to terminal debugger requests.

The operating system specifications are to have all 6800's with a similar memory map, to have all 6800's with a common terminal debugger port and kernel (as described later), to provide ROM contiguous and expandable up to 16K, to provide RAM contiguous and expandable up to 16K, to provide clock interrupt driven by input/output only, and to provide customized ROM and I/O adapted to the 6800's particular modules.

The 6800 operating system for event prompts and actions are set forth in Table 4.

The 6800 operating system for power-up and power supply is set forth in Table 5.

The 6800 operating system power-up for the central processing unit is set forth in Table 6.

The 6800 operating system for power-up of the MIO is set forth in Table 7.

The 6800 operating system for interrupt of the power supply is set forth in Table 8.

The 6800 operating system for interrupt of the MIO is set forth in Table 9.

The 6800 operating system for interrupt of the CPU is set forth in Table 10.

6800 OS

EVENT PROMPTS AND ACTIONS

Table 4

DC POWER ON—FSU SYSTEM INITIALIZES
FSU ON BUTTON PUSH OR POWER REQUEST SIGNAL

ACTIVITATES—BLOCK SYSTEM INITIALIZES
FSU OFF BUTTON PUSH OR POWER REQUEST SIGNAL
DEACTIVATES—BLOCK SYSTEM EXECUTES POWER DOWN SEQUENCE
HARDWARE CLOCK INTERRUPT—I/O REQUESTS ARE POLLED & SERVICED
INPUT FROM TERMINAL DEBUGGER PORT—TERMINAL DEBUGGER DIAGNOSTIC REQUEST SERVICED

6800 OS

POWER-UP—POWER SUPPLY

Table 5

1. INITIALIZE HARDWARE & STACK
2. DIAGNOSE 6800
3. DROP INTO TERMINAL DEBUGGER, INTERRUPTS ENABLED
4. DISPLAY INITIAL LOGO ON INTERRUPT
5. WHEN ON IS SIGNALED, TURN ON BLOCKS

6800 OS

POWER-UP—CPU

Table 6

1. INITIALIZE HARDWARE & STACK
2. DIAGNOSE 6800 & CRAM
3. CONFIGURE MIO'S
4. <u>DROP INTO TERMINAL DEBUGGER, INTERRUPTS ENABLED</u>
5. ON INTERRUPT, REQUEST CRAM LOAD
6. LOAD CRAM
7. SIGNAL CPU INITIALIZED (RUNNING)
8. BOOTSTRAP

6800 OS

POWER-UP—MIO

Table 7

1. INITIALIZE HARDWARE & STACK
2. DIAGNOSE 6800, MEMORY, AND I/O
3. CONFIGURE MEMORY WITH CPU
4. DROP INTO TERMINAL DEBUGGER, INTERRUPTS ENABLED
5. ONE MIO WILL GET A CRAM LOAD REQUEST ON AN INTERRUPT
6. IT BROADCASTS A CRAM LOAD REQUEST TO ITS TERMINALS
7. ONE TERMINAL RESPONDS WITH CRAM
8. MIO PIPELINES CRAM DOWN CRAM REQUEST PORT (OR ADDRESS BUS??)

6800 OS

INTERRUPT—POWER SUPPLY

Table 8

1. DISPLAY LOGO IF FIRST INTERRUPT
2. TEST FOR BUTTON STATE CHANGE & RESPOND
3. TEST FOR POWER REQUEST LINE CHANGE & RESPOND
4. TEST FOR CHANGE IN BLOCK SIGNALS & RESPOND
5. TRIGGER DEADMAN
6. RTI

NOTE: RESPONSE MAY INCLUDE CHANGING THE VIDEO

6800 OS

INTERRUPT—MIO

Table 9

1. POLL DEVICES
2. PROCESS INTERRUPTS
3. CHECK FOR OUTERRUPTS, & RESPOND
4. CHECK FOR TASKS, & RESPOND
5. TRIGGER DEADMAN
6. RTI

NOTE: DEVICE INTERRUPT MAY INCLUDE CRAM LOAD REQUEST. FURTHER DEFINITION REQUIRED TO DETERMINE THE NATURE OF THE PROCESSING ACCOMPLISHED BY THIS CYCLE.

6800 OS

INTERRUPT—CPU

Table 10

AFTER CRAM LOAD, LITTLE ACTIVITY
TIME OF DAY?
TRIGGER DEADMAN

CPU

In addition to FIG. 13A, FIG. 35 is a gross block diagram of the CPU. In its essentials, it consists of two 32 bit internal data busses linked by a dual set of AMD 2901 32 bit ALU's. These can be linked together to perform 64 bit operations. A 512 by 32 ram bit file contains 256 64 bit registers broken down into 8 blocks of 32 registers each. Addressing lock for this register file partitions it among users such that each user receives one block of 32 64 bit registers. It should be noted here that there are 5 users, one being the operating system or "host" and the other four being the "guests". In this case there are three sets remaining, one of which should be assigned to the diagnostic job which, in all systems, is proposed as the sixth user. Logic within the CPU is controlled by a 128 bit wide microcode ram (CRAM) which has numerous addressing modes plus a stack for hardware traps and for call instructions. When the bus is to be addressed, a mapping ram automatically translates user address to physical address. Addressing modes for the map also involve user partitioning hardware.

The 6800 microprocessor has the ability to communicate on the bus and to take a "snap-shot" of all bus signals on Phase 0, 1, and 2 for full loop back diagnosis. The 6800 also has the ability to force the CRAM address and to load and read CRAM data. The 6800 can control the CPU clock and can force the computer to execute single instructions. Similarily microcode traps can be set causing the computer to stop and to transfer control to the 6800. With these and other diagnostic features, the hardware hooks are present to fully exercise the CPU.

The unit is physically partitioned into two boards connected with five to six 50 pin ribbon cables. A portion of the CRAM array is found on each board with the data bussess crossing from board to board. Individual memory voltage regulator/interlock circuits are found on these boards in keeping with the philosophy of local memory chip protection. Additional details of partitioning and diagnostics are found in FIGS. 36 and 37.

Central Processing Unit

The Central Processing Unit (CPU) is built around AMD2900 bit slice microprocessors. It is microprogrammed with a 4K × 128 bit Control RAM (CRAM). It also contains a Motorola 6800 microprocessor for local control.

Overview

The CPU detailed block diagram is shown in FIG. 38. The CPU handles 64-bit data words. The Arithmetic-Logical Unit (ALU) is built from AMD 2900 bit slice microprocessors. The CPU has a Motorola 6800 microprocessor to provide local control and diagnostics. The CPU is microprogrammable. A micro-instruction is 128 bits wide. A large Control RAM (CRAM) is used to store the microcode. User register space is provided by the RAMFILE. The RAMFILE is segmented into eight blocks of thirty-two 64-bit registers. The SCAD (Shift, Count, Add) is used to perform high-speed data manipulations. Memory addressing and protection is provided by the POX and the MAP structures.

Diagnostics

The 6800 provides the basic diagnostic capability in the CPU. Local diagnostics include 6800 instruction test, a ROM checksum, and a RAM diagnostic. The 6800 clock is also checked.

CPU diagnostics consist of loading the CRAM with special microcode and then clocking the CPU to validate the execution of the microcode. Through this means, the RAMFILE and the POX/PAGE RAMS can be tested as well as a basic instruction test. The ALU can be validated by doing data manipulations. By performing half-word operations, the high and lower order portions of the ALU can be checked in parallel.

Besides the diagnostics resident in the 6800 ROM, there is also the capability of loading additional diagnostics via the terminal debugger port or the 9600 band CPU port. These may be executed in the 6800 RAM space.

Timing

The CPU has several timing structures. The 6800 has its own internal clock logic. The instruction decode and execution has timing logic. The bus interface is required to be in SYNC with the bus.

If the CPU is the master CPU in a system, it is responsible for generating the system clock. It places the SYNC pulse on the bus. If the CPU is a slave, it does not assert the SYNC on the bus. Instead, it uses the SYNC from the bus which is now generated by the IPB. All CPU's generate SYNC but it is disabled by the SLAVE signal on all but the master bus. See timing details in FIG. 39.

3.3.3 Am2901 Bipolar Microprocessor Slice

The ALU is built from the Am2901 bipolar microprocessor slice. The ALU consists of a high-order portion and a low-order portion. Each is 32-bits wide and consists of eight Am2901 bipolar bit-slice microprocessors. The Am2901's are cascaded to form the 64-bit data word.

The Am2901 has an eight function ALU, 16 addressed registers, a shifter, and a Q-register. If R and S are defined as the two operands, then the following ALU functions are supported:

| | |
|---|---|
| R + S | Add |
| S − R | Subtract |
| R − S | Subtract |
| R ∨ S | OR |
| R ∧ S | AND |
| $\overline{R}$ ∧ S | MASK |
| R ⊻ S | XOR |
| $\overline{R \veebar S}$ | NXOR |

The operands may be holding registers, quotient registers, a constant, or a zero. A unique feature is that two holding registers may be addressed simultaneously thus adding a great deal of efficiency. Destinations selectable include the RAM space and the Q-register. The data may be shifted before being loaded in the destination.

Detailed information regarding the Am2901 is available from Advanced Micro Devices.

CPU Microprocessor

A Motorola 6800 microprocessor is resident on the CPU board. It contains its own ROM and RAM. It provides CPU initialization, local diagnostics, CRAM loading, and terminal debugging. It also has access to the bus 26 (see FIG. 13A).

Initialization

The 6800 provides the CPU initialization function. Upon power-up, it performs a set of internal diagnostics to validate its own operation. These include a ROM checksum test and a local RAM diagnostic. A CPU diagnostic is then executed.

After the CPU diagnostic, the 6800 begins the initialization sequence on the bus. The initialization results in all modules being assigned a block number and the memory space being defined. The sequence consists of a set of STEP pulses and BUSY checks as the blocks resolve memory addresses among themselves.

Following system initialization, the terminal debugger is started and normal processing mode is entered.

CRAM Load

A major function of the 6800 is the loading of the CRAM. It is the only mechanism to load the CRAM. Before loading, the CRAM is validated by the 6800 during initialization. This is a memory diagnostic to ensure good hardware. The CRAM is loaded from an MIO unit or from the serial console channel. The 6800 issues requests for microcode instructions and receives them 32 bits at a time on the bus. They are then loaded into the CRAM.

Once the CRAM has been loaded, the system is ready to run. In a standard system, the disk controller/MIO will obtain the microcode image from a dedicated disk area. In a developmental situation a console tape cassette will be the source. In this manner, the user may also specify microcode for specialized applications.

Terminal Debugger

The primary software in the 6800 is the terminal debugger. It allows access not only to the 6800 but to all portions of the CPU accessible to the 6800. It may be used to load microcode, enable/disable the system clock, or access the bus.

Control RAM

The microcode for the CPU is stored in the Control RAM (CRAM). It is 4K×128 bits in size. CRAM addressing is defined by the contents of the Jump (J) Field, the Dispatch (DISP) Field, and the Skip (SKIP) Field. The J Field defines the base address of the next instruction. The SKIP Field allows for branching within a group while the DISP Field allows modification of address lines.

Subroutines are implemented using a current location stack. The current location is always at the top of the stack +1. A subroutine call merely moves the stack pointer to put the address on the stack. See table 11.

TABLE 11

| Field | Start | Length | Description |
|---|---|---|---|
| CALL | φφ | 1 | Subroutine Call |
| J | φ4 | C | Jump |
| DISP | 1φ | 4 | Dispatch |
| SKIP | 14 | 6 | Skip |

Table 12 describes the entire word. Those fields requiring additional explanation are described elsewhere.

TABLE 12

| | | |
|---|---|---|
| φ | CALL | Causes the address of the current word to be pushed on to the microcode stack. |
| φ4–17 | JUMP/ | Contains the address of the reset word to be executed, unless modified by the DISP/and SKIP/fields. |
| 2φ–23 | DISP/ | Used to modify 4, 8 or all 12 bits of the next address generated by the jump. For example, DISP/may select the top of the stack for a subroutine return; or may select the 8-bit OP code field of the current computer instruction to dispatch to one of 256 possible locations. |
| 24–31 | SKIP/ | Used only to modify the least significant bit of the next instruction address. |
| 32–37 | SPEC/ | Special functions are used to generate signals used rarely enough not to be worth unique microcode bits. |
| 40–43 | DPX SEL/ | Enable the 29φ1 extensions, a byte at a time, to drive the DP bus, rather than the most significant half. |
| 44–47 | CLK EN/ | Enable the clock into the most significant 32 bit of the 29φ1, a byte at a time. Thus, it is possible to modify only 8, 16, or 24 bits of any 32-bit word within the 29φ1. |
| 5φ–53 | A/ | These fields address two operands (out of 16) |
| 54–57 | B/ | 29φ1's register files. |
| 6φ,61 | PROP, GEN | Used to propagate, and/or generate a carry from the 29φ1 extension to the 29φ1.<br>φφ - no carry into 29φ1<br>φ1 - force carry into 29φ1<br>1φ - propagate a carry (i.e. for 64 bit arithmetic) |
| 62–67 | OP/ | Selects source and function (in that order) into the 29φ1. Note that these differ from the AMD documentation.<br>62–64 - Selects source<br>65–67 - Selects function |
| 71–73 | DEST/ | Selects the 29φ1 destination field. |
| 75–77 | DESTX/ | Selects the 29φ1X destination field. |
| 8φ–83 | AX/ | Selects the 29φ1X A field. |
| 84–87 | BX/ | Selects the 29φ1X B field. |
| 91 | CRY | The carry in bit to the 29φ1X extension. |
| 92–97 | OPX/ | Selects the 29φ1X OP field. (See above) |
| Aφ | MARK | Used to synchronize test equipment. The 68φφ software must have the ability to set and clear this bit in any selected microcode word for diagnostic purposes. |
| A1 | GO | Enable the microcode to automatically step to the next microcode word. Thus, if unused microcode words are cleared, the microcode machine will halt if it attempts to run wild. The 68φφ can detect the absence of this bit in the current microcode word. |

| Field | Start | Length | Description |
|---|---|---|---|
| SPEC | 1A | 6 | Special |
| DPMIX | 2φ | 4 | Data Path Mix |
| CLK | 24 | 4 | Clock |
| AH | 28 | 4 | A Select Hi |
| BH | 2C | 4 | B Select Hi |
| PG | 3φ | 2 | Propagate/Generate Carry |
| OPH | 32 | 6 | Opcode Hi |
| DESTH | 39 | 3 | Destination Hi |
| DESTL | 3D | 3 | Destination Lo |
| AL | 4φ | 4 | A Select Lo |
| BL | 44 | 4 | B Select Lo |
| C | 49 | 1 | Carry In |
| OPL | 4A | 6 | Opcode Lo |
| DMIX | 53 | 5 | Data Bus Mix |
| SCAD | 5A | 1 | SCAD Control |
| MEM | 5B | 1 | Memory Function |
| REG | 5C | 4 | Internal Register File |
| # | 6φ | 2φ | Constant |

All values are hexadecimal.

The contents of the current instructions are placed in the CRAM register and are available to the data bus for instruction decoding.

THE MICROCODE WORD

General (See FIG. 40)

The 128-bit microcode word is physically spread over both CPU boards—the upper (CPU DATA PATH BOARD) containing 80 bits, and the lower (CPU CONTROL BOARD) containing the remaining 48 bits.

The word is loaded, and read, via 16 6800 data transfers, to addresses XXX$\phi$ thru XXXF. The bits are, therefore, numbered according to the byte address followed by bit within byte, thus:

$\phi\phi,\phi1$—$\phi7,1\phi$—17, 2$\phi$—etc., etc.,—E7,F$\phi$—F7 however, the bits are numbered $\phi$ thru 7 within the byte, rather than 7 thru $\phi$ as favored by the 6800 hardware diagram.

In general, the fields are such that a field of all zeros is a null field, and has no effect on the CPU operation. This does have the following exceptions or peculiarities.

(1) A DISP/field of zero selects the CSL address (1 12-bit field loaded by the 6800) as the DISP/address. This is to allow the 6800 to address the required microcode word for reading and writing purposes.

(2) The data path function and destination fields differ from the published AMD documentation, as three bits have been inverted (to make a zero field have no effect).

(3) The GO bit must eventually be set in every used word. A zero bit here halts the running microcode and sets a flag detected by the 6800.

not altered during the loop. The SCAD is used to control multiply and divide functions which have been added to the Am2901. inputs.

Bus Interface

The CPU is the main driver of the bus. On the master bus it supplies the SYNC pulse. On slaves, the SYNC is supplied by the IPB. On power-up, the CPU asserts the PWR REQ signal to turn on the remainder of the block. System initialization is controlled by the CPU by use of the INIT and STEP signals.

The bus commands are all under the control of the CPU. READ, WRITE, BROADCAST, and OUTERRUPT activities are initiated by the CPU. INT POLL and INTACK sequences are in response to an interrupt request by a block in the bus.

MICROCODE SCAD CONTROL (See FIG. 41)

The 16-bit SCAD logic is intended to count, and control, fast microcode loops, enabling loop counting in the SCAD hardware while the microcode is manipulating data within the 29$\phi$1 data paths.

For single instruction loops, where the same operation occurs many times, such as happens during shift and rotate instructions, the SCAD can be set up to control what I call a Multi-Step cycle, during which the SCAD and data path logic is clocked at twice the normal frequency. This is possible as the microcode is not changing during these loops.

Multiply and divide control has been added to the 29$\phi$1 inputs to enable these common sequences to be evoked by the Multi-Step hardware. This control is capable of ORing into SOURCE 2 to change the source

| | | |
|---|---|---|
| A2 | PAR | Parity bit. Used to create odd parity over the 46 bits A2 thru F7 on the lower CPU control board. (MARK and GO do not appear as the parity check, to simplify setting and clearing of these bits.) (Note that there is no parity bit on the upper board. It is assumed that there are enough fields on these 8$\phi$ bits to make odd parity easy to generate without a parity bit.) |
| A3–A7 | DBUS SEL | Selects an input to the 32 bit DBUS. |
| B2 | SC EN | Enables the 16 bit SCAD logic. The 32 bit # field is further decoded to control the SCAD. |
| B3 | MEM | Memory Function Bit. The 32-bit # field is further decoded to determine the type of memory function required. |
| B4–B7 | REG SEL | Controls the 256 64-bit internal register file. |
| C$\phi$–F7 | # | The 32-bit # field may be gated into the DBUS as an immediate 32-bit data word; into the SCAD A input as an immediate 16-bit data word; or as a direct address into the internal register file. In addition, it is decoded further to control: (1) The type of memory function required. (2) The 16-bit SCAD logic. (3) The addressing of the internal register file. |

RAMFILE

User register space is located in an area labeled RAMFILE. There are eight blocks of 32, 64-bit registers in the RAMFILE. The RAMFILE is a high-speed memory which is loaded from the Data Path. Output from the RAMFILE is gated to the Data Bus, RAMFILE addressing is controlled by block number ($\phi$-7) and REG field of the microcode.

SCAD

The 16-bit SCAD logic is used to count and control fast microcode loops enabling loop counting in the SCAD while the microcode is manipulating data within the ALU. Single instruction loops may be run at twice the normal clock frequency because the microcode is selection from B, A into B, $\phi$; and ORing into FUNC 1 and carry to change the function from S+R to S−R. Thus, the microcode sets up a Multi-Step multiply or divide loop with the OPERATION of BR/BR+AR (and the appropriate shift), and the hardware changes this as required to BR/BR−AR, BR/BR±$\phi$, according to results of the previous step.

All of this has the following consequences:

(1) It is still possible for the 6800 Console to single step through a Multi-Step function, one step at a time. At each single-step function, only the SCAD and DATA PATH are clocked, the microcode word remaining constant, exactly as it would were the machine running at full speed. All well and good. However, hardware flags are "remembering" the modification to be made to the next step; and if, for example, the 6800 CSL program evoked a new microcode word, that word will suffer the modification. As long as the data path is not clocked, the Console may "examine" the interrupted microcode word and continue on correctly. The SOURCE and FUNCTIOn fields controlling the 29$\phi$1's are marked with an asterisk (*) denoting functions unmodified by the Multi-Step MUL/Div hardware.

(2) The Multi-Step function continues until the SC or FE (depending on which is enabled) goes positive. It is possible for the microcode to count −32,768 up to zero, taking 7.192 millisecs at 4 MHZ, and even longer instructions are possible by counting up on the 29$\phi$1's and gating the result into the SCAD logic. (It is possible to count up by zero, giving an instruction of infinite length).

There is no hardware check for these instructions of unreasonable length. The computer will continue to operate correctly, (microcode will still automatically refresh every 32 microseconds), very long instructions have the potential of serious side effects, such as causing disk overruns due to missed interrupts, etc.

(3) A negative number in the SC register may be counted up by numbers other than one. For example, if we gate a longer exponent field into the SC, justified only to bit $\phi$9 (say), rather than shift it two places right before counting, we can just as easily count it up by 4's. (The FE can only be counted up by 1's.)

(4) A positive number in the SC will be unmodified, and the data path will not be clocked. Thus, if a negative value in SC means shift C(Q) right, and a positive value means shift left, the sequence set forth in Table 13 is possible.

IR BUS CONTROL

The 8-bit IR bus is driven from the IR register, the DECODE register, the pointer register, or directly from the rightmost byte of the DBUS. (See FIG. 42). The 8 bits go directly to the dispatch logic, and also to the 8 bit SYLLABLE register, used in addressing the REGISTER FILE.

The various registers are loaded by SPEC/—functions.

SPEC/LOAD IRL—Load IRL from DBUS (left half)
SPEC/LOAD IRR—Load IRR from DBUS (right half)
  (The function SPEC/LOAD IR evokes both of these)
IRR is duplicated elsewhere for driving the DBUS
SPEC/LOAD DECODE—Load DECODE register from DBUS (left 3 bytes)
SPEC/LOAD POINTER—Load POINTER register from DBUS (left byte)
SPEC/LOAD SYLLABLE—Load SYLLABLE register from IR bus.

Note that all these functions are evoked on the clock tick at the end of the 500 nsec microcode step. If for any reason the microcode step does not complete (micro page fault, 6800 stops the clock, faulty microcode parity, lack of the GO bit, etc.) the special function does not occur. The 6800 may change the microcode word before the next clock.

The IR Bus is driven from one of eight sources, depending on the 3-bit IR/—field, as shown in the figure.

TABLE 13

---
MULTI SHIFT, SC/SC + 1, Q/Q SHRT   /* SHIFT Q RIGHT IF SC NEGATIVE
SC/$\phi$ - SC
MULTI SHIFT, SC/SC + 1, Q/Q SHLT   /* SHIFT Q LEFT IF SC POSITIVE
(Not recommended, merely possible)
  (5) Using the SC requires that it be pre-loaded. It is also possible to
count the number contained in bits 16-31 of the # field up in the FE register,
by use of # bit 1. For example, to compute BR + 5*AR, do:
  BR/BR +AR, SCAD EN, #/C47$\phi$ FFFB
  The SCAD logic (See FIG. 41) is completely under control of the #
field, and is thus thrashing around even when not being used. The microcode
SCAD EN bit merely controls loading of the SC and FE registers, and, gated
with # bit $\phi\phi$, evokes the Multi-Step hardware.
SCAD EN    Decodes the # field as follows:
Field
$\phi$ - Multi-Step
1 - Switch SCAD input A to FE register after first step.
2, 3 - Type of multi-Step cycle
    $\phi$ - Normal
    1 - Divide
    2 - Unsigned Multiply
    3 - Signed Multiply
4 - Gate SCAD = $\phi$ into SCAD/DISP logic.
5 - SCAD A select
    $\phi$ - FE register
    1 - # Field (16-31)
6, 7 - SCAD B select
    $\phi$ - SC register
    1 - EXP field of DP (DP $\phi$1 - $\phi$9, right justified)
    2 - DP $\phi\phi$ - 15
    3 - DP 16-31
8 - SC EN
9 - FE EN
10 - SCAD function ($\phi$ = ARITHMETIC, 1 = BOOLEAN)
11 - SCAD carry in
12 - SCAD ALU function. (See following table)
13 - SCAD ALU function (See following table)
14 - SCAD ALU function (See following table)
15 - SCAD ALU function (See following table)
---

| | | |
|---|---|---|
| φ | - | IR register byte φ (OP CODE byte) |
| 1 | - | IR register byte 1 |
| 2 | - | IR register byte 2 |
| 3 | - | IR register byte 3 |
| 4 | - | POINTER register |
| 5 | - | DECODE register byte 1 (used during DISP/EXEC) |
| 6 | - | DECODE register byte 2 |
| 7 | - | DBUS byte 3 |

The IR bus is used during the following DISPATCHES.

DISP/OP CODE—Dispatches 256 ways, using the entire 8 bits of the IR bus. Intended to be used with IR/φ.

DISP/EXEC—Dispatches on the 12-bit EXEC field of the DECODE register. Intended to be used with IR/5.

DISP/SYLLABLE—Dispatches 15 ways on modes φ thru E, and 16 ways on register field if mode is F. Intended to be used with SKIP/MODE F as a 31 way dispatch. May use any reasonable byte on the IR bus.

DISP/MODE—16 way dispatch on IR bits φ-3 (most significant bits)

DISP/REG—16 way dispatch on IR bits 4-7 (least significant bits)

MICROCODE DISPATCH FIELD

The DISPATCH field (DISP/—) is used by the microcode to modify the next instruction address in the following ways.

(1) To select the Console Address for reading and writing into the microcode store.

(2) to select top of stack for subroutine returns.

(3) As a multi-way branch on selected hardware conditions.

The DISP/—field is a four bit field allowing the microcode to select from one of 16 possible dispatches. There must, of course, be a NULL dispatch, and there is a second NULL dispatch, of opposite bit polarity, to help in setting the parity of the 80 bits of microcode contained on this board.

However, a DISP/—code of zero must select the Console Address, to enable the 6800 to address microcode words. The NULL (default) case must be non-zero.

The codes are presented in Table 14:

TABLE 14

| | | |
|---|---|---|
| φ | (12) CSL ADP | 6800 CSL ADR register |
| 1 | (12) SBR RET | Subroutine return address |
| 2 | (12) EXEC | 12-bit address from DECODE register |
| 3 | (8) OP CODE | OP CODE from INSTRUCTION register |
| 4 | NOP | DEFAULT |
| 5 | NOP | DEFAULT (opposite polarity) |
| 6 | NOP | No operation |
| 7 | NOP | No operation |
| 8 | (5) DP φ-3 | Data Path bits (φ-3) |
| 9 | (5) SYLLABLE | Selected syllable |
| A | (5) MODE | Left 4 bits of syllable |
| B | (5) REG | Right 4 bits of syllable |
| C | (5) NORM | Normalize hardware |
| D | (5) SCAD | SCAD logic |
| E | (5) SPARE | |
| F | (5) SPARE | |
| φ | DISP/CSL ADR | This function is probably not used by microcode. When the microcode word is cleared by the 6800 reset function, the 6800, via the CSL ADR register, can address any word in the microcode ram. |
| 1 | DISP/SBR RET | Selects the subroutine return address, 12 bits, from the top of the stack. Hardware will pop the word from the stack. Normally OR'ed with JUMP/1 or JUMP/2 to return one or two locations down from the original CALL instruction. May also be used with a SKIP/- function for subroutines containing multiple exits. |
| 2 | DISP/EXEC | Selects the 12 bit J FIELD from the DECODE register. Note that 8 bits of the DECODE register show the common 8-bit IR bus, and must be selected elsewhere. Normally used to contain address and execution code. e.g. During a Divide instruction, contains address of the divide microcode. |
| 3 | DISP/OP CODE | Dispatches on the 8-bit syllable selected from the IR register. This would normally by the left byte of the IR register and must be selected elsewhere. Intended to be used with a large JUMP/-field as a multi/way branch to decode the OP CODE. For example, JUMP/Fφφ, DISP/OP CODE will dispatch to F37 on an OP CODE of 37—. |

Note that the IR register, the DECODE register, and the 8-bit INDIRECT register all put their data onto a common 8-bit IR bus. Thus, all DISP/-functions that use such data rely on other fields of the microcode word selecting the correct data to drive the IR bus.

These functions are DISP/EXEC, OP CODE, SYLLABLE, MODE, REG.

The dispatches in Table 15 all have 4-bits, but their effect is shifted left one position so as not to modify the final, (least significant) address bit. Thus, they may be used with any of the SKIP/-conditions to change from 16-way to 32-way dispatches.

TABLE 15

| | | |
|---|---|---|
| 9 | DISP/SYLLABLE | (Requires a selected byte on the IR bus) Dispatches on the MODE field, unless the MODE is F, then switches to dispatch on the REG field. Thus, coupled with SKIP/MODE |

TABLE 15-continued

F gives a 32-way dispatch, depending on the byte, of the following:

| BYTE | DISP | BYTE | DISP |
|------|------|------|------|
| φX   | φ    | Fφ   | 1    |
| 1X   | 2    | F1   | 3    |
| 2X   | 4    | F2   | 5    |
| etc. |      | etc. |      |
| EX   | 1C   | FE   | 1D   |
| FX   | (see next column) | FF | 1F |

| | | |
|---|---|---|
| A | DISP/MODE | (Requires a selected byte on the IR bus) Dispatches on the MODE field, the upper 4 bits of the selected byte. |
| B | DISP/REG | (Requires a selected byte on the IR bus) Dispatches on the REG field, the lower 4 bits of the selected byte. |
| 8 | DISP/DP φ-3 | Dispatches 16 ways on the most significant 4 bits of the DP Bus. See also Microcode Timing Restrictions. |
| C | DISP/NORM | Intended for use during floating point normalize routines, to determine quickly where the most significant 1-bit is in the 29φ1 Data Path. It is determined via use of a priority decoder, and as normalizing is only defined for positive numbers, a negative value gives the highest priority dispatch. |

| | |
|---|---|
| φ | DP φφ is a one (Data Path is negative) |
| 2 | DP φ8 is a one (Data Path is negative) |
| 4 | DP φ9 is a one (Data Path is negative) |
| 6 | DP 1φ is a one (Data Path is negative) |
| 8 | 29φ1 ALU φφ-15 is non zero |
| A | 29φ1 ALU 16-31 is non zero |
| C | 29φ1 ALU 32-47 is non zero |
| E | 29φ1 ALU 48-63 is non zero |

Note that bits φφ, φ8, φ9, 1φ depend on these bits (of the 64 bit 29φ1 function) being placed on the DP bus. It is possible for the microcode to ensure that these bits are zero, and use this function merely for searching for a 16-bit non-zero section of the 29φ1 function.

The correct use of the DISP/NORM function requires a prior knowledge that, if the word is positive, that DP bits φ1 thru φ7 will be zero. This certainly will be so after the addition, or subtraction, of normal floating point numbers. Multiplication and division require careful analysis to insure that the most significant bit cannot be to the left of DP φ8.

See also Microcode Timing Restrictions

| | | |
|---|---|---|
| D | DISP/SCAD | The 16-bit SCAD logic is under control of the SC EN bit and the # field. It is assumed that we require a negative number in the SCAD, and wish to count it up to zero, while shifting data in the 29φ1's. The output of the SCAD adder is fed into a priority encoder to give the dispatches in Table 16: |

TABLE 16

| | |
|---|---|
| φ | SCAD PROPAGATE. (Sum without carry = −1). Must be enabled via CRAM # 05 bit. |
| 2 | SCAD is positive. |
| 4 | SCAD < −128 More than 128 places to shift. |
| 6 | SCAD < −64 |
| 8 | SCAD < −32 |
| A | SCAD < −16 |
| C | SCAD < −8 |
| E | SCAD ≧ −8  8 places or less to shift. |

Note also, that for timing reasons with the 500 msec micro step, it is not possible to load the SCAD logic from the 2901 Data Path, while simultaneously executing an arithmetic function in the SCAD logic. More on this under Microcode Timing Restrictions.

Microcode REG SEL/Field

The internal register file, 256 words of 64 bits, is divided into eight user blocks, numbered (surprisingly) φ thru 7. The block allocated to the current user is defined by a 3-bit block field (BBB below). A fourth hardware flag, called EXEC in the description below (but may or may not correspond exactly to EXEC mode, a separate flag) can cause switching to block φ, reserved for the EXEC, in some cases as defined below.

Each block of 32 registers is further divided into an upper and lower section. The lower sections, registers φ thru F, are the 16 general purpose registers, and access is fairly easy. The upper section, registers 1φ thru 1F of each block, are the special registers, and access is not so simple, and may even be inhibited to certain special registers.

In particular, during a running program, some of the current special registers are not valid within the register file, but have valid contents in the 2901's. The Program Counter (PC) is a case in point. Therefore, access to the PC (register 11) is not from the Register file at all.

In addition to the above, register access is under control of an 8-bit byte selected from the current instruction, and held in an 8-bit syllable register. Loading of this register is defined elsewhere, but for purposes of this description, the eight bits are labelled MMMMRRRR (corresponding to MODE, REG).

The microcode field defining register access consists of four bits, WR, SEL (2), L, in this order.

WR

Write into the addressed location. Writing occurs on the final 125 nsec of a 500 nsec microcode cycle. The REG file should not be selected as a DBUS input at this time, as during writing the output goes into the undefined high impedance state.

L

Select the lower 32 bit half of the 64 bit register (absence of this bit selects the upper half.)

SEL (2)

These two bits are used, along with the selected syllable and block number, to address the required location, according to Table 17.

TABLE 17

| SEL(2) | #(SEL) | Exec Mode Block | User Mode Block | Register |
|---|---|---|---|---|
| φ | — | φφφ | BBB | φRRRR |
| 1 | — | φφφ | BBB | 1RRRR |
| 2 | — | φφφ | BBB | φMMMM |
| 3 | (Requires further decoding of the microcode # field) | | | |
| 3 | φφ | φφφ | BBB | #(27) fn (Reg, #) |
| 3 | φ1 | BBB | BBB | #(27) fn (Reg, #) |
| 3 | 1φ | MMM | MMM* | M fn (Reg, #) |
| 3 | 11 | #(24-26) | #(24-26)* | #(27) fn (Reg, #) |

*Microcode should never get here, unless extra testing is done on the address bits to prevent user interaction.

In REG select mode 3, the microcode # field is further decoded, to address the required register. The # field is decoded as presented in Table 18.

TABLE 18

| 16 17 # SEL | 18 19 20 21 22 23 Fn (Reg, #) | 24 25 26 Block | 27 28 29 30 31 Register |
|---|---|---|---|

(SEL See Table 17)
φφ - Select current block in user mode, block φ in exec mode
φ1 - Select current block
1φ - Select block addressed by address syllable
11 - Select block given by #(24-26)
fn (Reg, #)

This field feeds directly into a 74LS181 chip, and selects any of the possible 32 functions, with or without carry. The more useful functions are presented in Table 19. The # field involved is bits 28–31.

TABLE 19

| fn (REG, #) SELECTION #(20-23) | LOGIC #(18) = 1 | ARITHMETIC #(18) = 0 | |
|---|---|---|---|
| | | #(19) = φ | #(19) = 1 |
| φ | — | — | Reg + 1 |
| 1 | — | — | Reg . OR . # + 1 |
| 2 | — | — | — |
| 3 | φ | — | — |
| 4 | — | — | — |
| 5 | — | — | — |
| 6 | Reg .XOR . # | — | Reg - # |
| 7 | — | — | — |
| 8 | — | — | — |
| 9 | — | Reg + # | — |
| A | # | — | — |
| B | Reg . AND . # | Reg . AND . # − 1 | — |
| C | F | 2 * Reg. | 2 * Reg + 1 |
| D | — | — | — |
| E | Reg . OR . # | — | — |
| F | Reg | Reg − 1 | — |

Microcode 29φ1 Control Fields

The 32 bit Data Path, and the 32-bit Data Path Extension are under control of separate microcode fields. They can be tied together for 64 bit data manipulation, but may be tied together in rather novel ways. For example, it is possible to make an arithmetic comparison (subtraction) in the extension, while doing addition in the data path itself, yet still propagate the carry so that the 32 bit comparison can modify the result of the 32-bit addition. Or the Data Path may be shifted right and the extension left in shift mode 2 for a figure 8 shift path.

| A/--, (4) | AX/-- (4) | Address one of the 16 internal 29φ1 registers. This register may be used as one of the ALU operands, or may be placed directly on the DP bus. Note that this register will be unmodified. (Unless also addressed by B/--). |
|---|---|---|
| B/--, (4) | BX/ (4) | Address one of the 16 internal 29φ1 registers. This data may be used as one of the ALU operands. The ALU function may also be written into this register, under control of the DEST/-- field. |
| SRCE/--, (3) | SRCEX/-- (3) | This 3-bit field selects the source operands for the 29φ1 ALU function. See Table 20. |

TABLE 20

| SRCE | S OPERAND | R OPERAND |
|---|---|---|
| φ | Q | A |
| 1 | B | A |
| 2* | Q | φ |
| 3* | B | φ |
| 4 | A | φ |
| 5 | A | D-Bus |
| 6* | Q | D-Bus |
| 7* | φ | D-Bus |

*Unmodified by MUL/DIV hardware. See MUL/DIV description.
FUNC/--, FUNCX/-- This 3-bit field selects the function to be carried out on the

TABLE 20-continued

| SRCE | S OPERAND | R OPERAND |
|---|---|---|
| (3) | (3) | selected source operands. See Table 21. |

TABLE 21

| FUNC | ALU Function (F) | |
|---|---|---|
| φ | S + R | + Carry in |
| 1 | S − R − 1 | + Carry In |
| 2 | −S + R − 1 | + Carry In |
| 3* | S.OR.R | |
| 4 | S.AND.R | |
| 5* | S.AND.R̄ | |
| 6 | S.XOR.R | |
| 7* | S.EQV.R | |

*Unmodified by MUL/DIV hardware. See MUL/DIV description.

| DEST/--, | DESTX/-- | This 3-bit field controls the loading of the B register, the |
|---|---|---|
| (3) | (3) | Q register, and the mixer controlling the DP output bus. Note that the ordering of these functions is different from that published by AMD due to inversion of the 1's weight. See Table 22/ |

TABLE 22

| DEST | B-REG | Q-REG | DP Bus |
|---|---|---|---|
| φ | — | — | F |
| 1 | — | F | F |
| 2 | F | — | F |
| 3 | F | — | A |
| 4 | F/2 | — | F |
| 5 | F/2 | Q/2 | F |
| 6 | 2F | — | F |
| 7 | 2F | 2Q | F |

General Notes on the DEST Function

There are several deficiencies of the 29φ1 not generally realized until there are attempts to program it. The most troublesome are listed here.

(1) One cannot shift the Q register contents (functions 5 or 7) without also modifying (shifting into) the B register. This fact alone probably makes a junk register (register φ) necessary.

(2) One cannot shift anything out onto the DP bus. The shifters are after the DP output pins (i.e. the shifters are on the inputs to the B and Q registers).

(3) The Q-shifter only shifts contents of Q. One cannot put the ALU function, shifted, into Q Register.

| DP EN/— (4) | The four bits of the DP EN field are used to gate the 32 bits of the ALU extension onto the DP bus (instead of the most significant half of the 290's ALU) one byte at a time. Thus a 1000 on these four bits causes the DP to be driven by 2901 bytes 4, 1, 2, 3 in that order. |
|---|---|
| CLK EN/— (4) | The four bits of the CLK EN field are used to enable the CLK into the 2901 a byte at a time. Thus, one can choose to modify only 8, 16, or 24 bits of the 2901's register. The extension is always enabled. |
| CRY IN (1) | Controls the carry in to the 2901. The MUL/DIV hardware, when doing a subtract cycle, will 'OR' a one into this output. |
| PROP (1) | Propagate a carry from the adder extension. |
| GEN (1) | Generate a carry from the adder extension. These last three bits are used to control the adder; to add a carry in, and to separate the two halves into two 32-bit adders. |

29φ1 Shift Control

Shifting of data within the 29φ1 ram inputs, or the 29φ1 Q register inputs, is under control of the 3-bit DEST/—(and DESTX/—) fields. A right shift, for example, is specified by B/F/2; whereas a left shift occurs in Q/2Q.

During these shifts, the paths are connected up as 64-bit shift paths, with hardware controlling the end conditions. Is the shift to be an arithmetic shift, a logical shift or a rotate? These end conditions are selected by the three least significant bits of the microcode SPEC-/—field, as shown in Table 23.

TABLE 23

| Left Shift SPEC | RAM | RAMX | Q | QX |
|---|---|---|---|---|
| φ | XXXXXXXX ←—XXXXXXXX ←—φ | | XXXXXXXX ←—XXXXXXXX ←—φ | |
| 1 | XXXXXXXX ←—XXXXXXXX ←—1 | | XXXXXXXX ←—XXXXXXXX ←—1 | |
| 2 | XXXXXXXX ←⌐XXXXXXXX ←⌐ | | XXXXXXXX ←⌐XXXXXXXX ←⌐ | |

TABLE 23-continued

|  |  | SPEC | RAM | RAMX | Q | QX |
|---|---|---|---|---|---|---|
| ASHL | 3 | | XXXXXXXX ← XXXXXXXX ← | | XXXXXXXX ← XXXXXXXX ← | |
| ASHL | 4 | | XXXXXXXX ← XXXXXXXX ← | XXXXXXXX ← XXXXXXXX ← φ | | |
|  | 5 | | XXXXXXXX ← XXXXXXXX ← | XXXXXXXX ← XXXXXXXX ← 1 | | |
| DIVIDE | 6 | | XXXXXXXX ← XXXXXXXX ← | XXXXXXXX ← XXXXXXXX ← CARRY OUT | | |
|  | 7 | | XXXXXXXX ← XXXXXXXX ← | XXXXXXXX ← XXXXXXXX ← | | |

Right Shift

| SPEC |  | RAM | RAMX | Q | QX |
|---|---|---|---|---|---|
| φ | | φ → XXXXXXXX → XXXXXXXX | | φ → XXXXXXXX → XXXXXXXX | |
| 1 | | 1 → XXXXXXXX → XXXXXXXX | | 1 → XXXXXXXX → XXXXXXXX | |
| 2 | | → XXXXXXXX → XXXXXXXX | | → XXXXXXXX → XXXXXXXX | |
| 3 | | → XXXXXXXX → XXXXXXXX | | → XXXXXXXX → XXXXXXXX | |
| 4 | | φ → XXXXXXXX → XXXXXXXX | → XXXXXXXX | → XXXXXXXX | |
| 5 | | 1 → XXXXXXXX → XXXXXXXX | → XXXXXXXX | → XXXXXXXX | |
| FICL, ASHR 6 | | → XXXXXXXX → XXXXXXXX | → XXXXXXXX | → XXXXXXXX | |
| 7 | | → XXXXXXXX → XXXXXXXX | → XXXXXXXX | → XXXXXXXX | |

Combined Left and Right Shift, SPEC Mode 2

| SPEC | RAM | RAMX | Q | QX |
|---|---|---|---|---|
| 2 | → XXXXXXXX ⨯ XXXXXXXX ← | | → XXXXXXXX ⨯ XXXXXXXX ← | |
|  | → ← | | → ← | |

MEMORY MAPPING

Memory allocation in terms of user address space is implemented by the map hardware. On any reference to the bus, the address is placed in a register known as the VMA or Virtual Memory Address ("Virtual" is a misnomer since the device is primarily a memory relocation map). The map consists of a high speed static 4K by 16 ram since it is in the critical path in the formation of the bus address. Eleven of the bits stored in the map are the relocation address of a 16K byte physical memory segment. Four of the five remaining bits are concerned with the protection status of the segment being addressed. The logic required to determine whether or not a particular access is valid is performed by a device known as the "protection box" and labeled "POX". The fifth and last remaining bit is set at any time a write cycle is performed in a particular segment indicating when a particular memory segment is "dirty". This in some systems is used to determine when a segment must be copied onto the disk. (Note this is a carryover from "time share" days). Descriptions of the map and POX follow.

MAP and POX Description

MAP:
1. The map size is 4K entries (×16 bits).
2. The unit of relocation is 16K bytes. Thus, the 4K map allows memory management facilities to address 64 M-bytes of remapped physical memory in 16K "blocks."
3. The unit of protection is 16K bytes. Each entry contains 4 protection state bits pertaining to the block of virtual memory it represents.
4. Microcode can optionally partition the map into up to 16 parts (4 MB each) by controlling an 8 bit partition register. This register consists of a 4 bit size field and a 4 bit base field. The base field OR's with the 4 MSB's of the Map and the size field sets the limit (increments of 4 MB) above which the user cannot address without causing a map fault.
5. No user can address above 64 Mbytes. If any of the 3 MSB's of the VMA is non zero, a map fault occurs.
6. A non-mapped addressing mode is available in which the map is bypassed and the full BUS address is created directly from the VMA register.
7. Any memory access (BUS cycle) to non-existent memory (i.e., REPLY*L signal not asserted during PH1) results in a microprogram trap (cycle fault).
8. Only Read and Write cycles are available on the BUS, however, each time a cycle occurs, 2 #-field bits (Kφ, K1) specify to the POX what type of cycle is occurring (See Pox descr.)

9. Each MAP entry contains a "modified" or M-bit which is set by hardware each time a BUS write cycle takes place within the corresponding physical block. This bit is set even if REPLY*L is not returned during the cycle.
10. Microcode can read and write all bits in the MAP RAM, including the M-bit, at the selected map address. Physical memory bits 7-14 are read as part of the physical memory address via the Mubus. The M bit and the 4 protection bits are read as part of the Condition Code halfword.
11. VMA and MAP data formats are given in FIG. 43. VMA format for non-mapped mode is not shown, since it is simply a 28 bit wide address.
12. The four protection bits ($P_{100}$, $P_1$, C, and W) are combined with 8 CPU access state bits ($K_{100}$, $K_1$, $D_{100}$, $U_{100}$-$U_3$) defining the requested memory cycle in a writable "protection box" (the POX). The two "current domain bits" ($D_{100}$, $D_1$) and the four "current user bits" ($U\phi$-$U3$) come from a 6-bit register loaded from the Data Path by a special load command. The "cycle type" bits ($K\phi$, $K1$) are driven directly by the microcode "number-field." The output of the POX causes a microprogram trap (map fault) whenever the 12 bit input combination indicates an invalid access request. Map faults may be unconditionally disabled under microcode control.
13. A map fault or an address fault (see items 5 and 12) prevents a bus cycle from occurring (esp. a write cycle); a cycle fault (item 7) does not.

A pseudo-hardware block diagram of the map is given in FIG. 44, showing most significant signal paths.

POX:
1. Any map entry contains four protection bits and thus may be in one of 16 states of protection.
2. Propagation time through the map and thence through the POX is critical.
3. The POX is general enough to implement multiple protection schemes (conventional and unconventional) some of which change dynamically.

The POX hardware is based on a scheme in which 16 potential faults, one for each state of the protection bits, are "looked up" in a 64×16 RAM in parallel with or in advance of obtaining the four protection bits from the MAP. A 16:1 multiplexor, addressed by the protection bits, selects one of the potential faults and passes it to the map fault output. The POX RAM is addressed by 8 bits representing the CPU's access state. An access state is defined by (1) which "user" is currently operating, (2) which "domain" the user is currently in (e.g. kernel, utility system, debugger, executable code) and (3) which type of memory cycle is called for (none, read, write, or instruction fetch). The map protection state is defined by (1) the domain to which the segment belongs (block domain) and (2) what type of data is present (e.g. pure code, read-only data, read/write data). For each current-domain/current-user combination there is a 64 bit authorization vector specifying whether or not a fault should occur for each type of cycle requested as a function of the block domain and its data type (see FIG. 45). The POX table is written and read by microcode in 16 bit quantities, each containing four 4-bit protect nibbles for each page domain, given a certain access state vector value. In the figures and discussions above control bit fields are identified as follows:

$U\phi$-$U_3$ Current POX user number. Part of CPU access state vector. Specifies one of 16 potential POX-users.

$D\phi$-$D_1$ Current Domain. Part of CPU access state vector. Defines current POX-users's domain of execution.

$K\phi$-$K_1$ Type of cycle requested. Part of CPU access vector. From microcode number-field. See Table 24.

TABLE 24

| $K\phi K$ | Name | Cycle Description |
|---|---|---|
| $\phi\ \phi$ | Null | None. No FABUS cycle occurs |
| $\phi\ 1$ | R | Read |
| $1\ \phi$ | W | Write |
| $1\ 1$ | F | Instruction fetch |

$P\phi$-$P_1$ Block's domain. Part of block protection vector. Each value selects a 4×4 array of MAP fault conditions on the basis of cycle type ($K\phi$, $K_1$) versus block data type (C, Q).

C, Q Block data type. Part of block protection vector. Specifies how data will be treated for domain of block and of current user. See Table 25

TABLE 25

| C Q | Name | Description (see note) |
|---|---|---|
| $\phi\ \phi$ | RD | Read-only data. |
| $1\ \phi$ | RC | Instruction (Read only) |
| $\phi\ 1$ | DD | Read/Write data |
| $1\ 1$ | DC | Modifiable Instructions |

Note:
The description implies generally to the owner's domain only. Other domains may be authorized, for example, to modify "code" or "read-only" data: (c.f. debugger operating on user's executable code).

Memory-I/O Unit

The Memory-I/O Unit (MIO) provides main memory, serial I/O, and parallel I/O on the computer. The computer is designed to provide large amounts of memory per processor. In addition, all I/O is handled independent of the CPU thus contributing to high I/O throughput rates both on serial and parallel I/O. Each MIO block has a microprocessor (Motorola 6800) as a local controller. The microprocessor performs module initialization, I/O transfers, and local control functions. In addition to FIGS. 4 and 5, FIG. 46 is a block diagram of the MIO board. See also FIGS. 47 and 48 for details of the MIO microcomputer boards.

MIO TIMING (See FIGS. 49 and 50).

The MIO functions on a three phase cycle synchronous with the bus cycle. The use of the three phase cycle allows local processing to occur in sequence with bus processing. See Table 26.

TABLE 26

| Phase | Usage |
|---|---|
| PH$\phi$ | Microprocessor access to main RAM and dynamic RAM - Refresh. |
| PH1 | Memory access by BUS. |
| PH2 | Memory access by parallel I/O (DMA) |

Table 27 illustrates the relationship between but timing cycles and the MIO timing cycles:

TABLE 27

| Phase | bus 26 | MIO |
|---|---|---|
| PH$\phi$ | Address & Control | Microprocessor access |

TABLE 27-continued

| Phase | bus 26 | MIO |
|---|---|---|
| PH1 | Address & Control | and dynamic refresh bus activity |
| PH2 | Data | DMA |

Main Memory

The MIO contains a large amount of dynamic RAM for main system storage. This RAM has three ports although only one may be active at any given time. This allows the three access mechanisms to load their address and data registers independently although only one may strobe the RAM at any given time.

The bus port includes logic to latch the address requested during PH$\phi$ and PH1 and performs the access request in PH1. The data is latched on the bus and internal to MIO during PH2. Bus accesses are 32-bits wide.

The microprocessor port allows the 6800 to read the main RAM via its own data bus. It may access the RAM during PH$\phi$ of the BUS cycle. This cycle is also shared with the dynamic refresh mechanism of the RAM. The 6800 may access one byte of data at a time. Four cycles are required for a 32-bit operation.

The DMA port (parallel I/O) is the third RAM channel. It has its own address and count register as well as control functions for DMA transfers. The initial values are loaded by the 6800 under directive from the CPU. The DMA has access to the RAM during PH2 of the BUS cycle. All DMA transfers are 32-bit data items.

Microprocessor

A Motorola 6800 microprocessor is placed on each MIO board. The 6800 has its own bus and both RAM and ROM memory. The 6800 provides five basic functions: module initialization, I/O Control, local diagnostics, interrupt requests, and terminal debugger.

Module Initialization

Upon power-up and at CPU request, an initialization sequence is entered. This is controlled by the 6800 and is responsible for bringing the MIO unit on-line. During initialization, the 6800 performs a set of local diagnostics including ROM checksum, RAM diagnostics for both its private RAM and the public RAM, and I/O channel initialization. If any of these tests fail, a status line to the FSU display will indicate the nature of the failure.

During system initialization under CPU control, the 6800 is responsible for interacting with other modules via the BUS to assign its base memory registers and block number.

I/O Control

All I/O in the computer is through MIO modules. Each module will support four Asynchronous Communications Interface Adapters (ACIA). Each ACIA supports one full duplex data channel whose parameters are programmable by the 6800. The 32 bit parallel MIO also supports 32-bit DMA with the public RAM.

The protocol for each ACIA is specified by the CPU to the 6800. The parameters are loaded via standard MIO/CPU communications. The OUTERRUPT facility may also be used.

For input, characters are loaded into the specified public RAM buffer until a termination condition specified by the protocol is detected. At this point, a CPU interrupt may be requested if specified. For output, characters are removed from the data buffer in the public RAM and loaded into the ACIA. From a CPU viewpoint, all serial I/O appears to be DMA because the CPU is not required to handle each character individually.

The 32 bit parallel MIO contains a port used from DMA transfers with the public RAM. These are 32-bit transfers either in or out of the RAM. The CPU specifies the data buffer and word count to the 6800. The 6800 loads the POX with the parameters and begins its operation. DMA transfers occur during PH2 of the MIO cycle.

I/O parameters for both serial and parallel I/O are passed from the CPU to the 6800 via the public RAM. The 6800 accesses this RAM during PH$\phi$ of the MIO cycle. During serial I/O, this time is used to fetch/store characters and update pointers. For parallel I/O, this is used to fetch parameters for the PIA.

Local Diagnostics

A major function of the 6800 is to provide local diagnostics for the MIO block. The MIO is capable of being tested independently of the remainder of the system as well as in a system environment. Among those items included in diagnostics are a ROM checksum and diagnostics on the private RAM, public RAM, serial I/O channel, and parallel I/O channel.

A subset of the entire package will be executed during module initialization. The full set of test diagnostics will be runnable either from a local terminal under the terminal debugger or under system command. In addition a special diagnostic may be loaded in the public RAM by the CPU for execution by the 6800.

Terminal Debugger

The basic software package for the 6800 is the terminal debugger. It is ROM resident and is initiated after the power-up sequence has been completed.

Interrupts

The 6800 is responsible for interrupt handling. Once it detects a condition which will generate an interrupt, it places the interrupt level on the BUS during PH2 of a cycle. It then responds when the CPU asserts the INT POLL for its level. When multiple interrupt events occur, the 6800 is responsivle for maintaining track of them and insuring that the request is made to the CPU. When the request has been acknowledge (INTACK), the 6800 clears its internal flags and continues processing.

DMA

The last major component of the 32 bit parallel MIO is the DMA logic. The DMA is controlled by the 6800. It transfers 32-bits of data on each move. The DMA port is active during PH2 of the MIO cycle.

The DMA is controlled by the PIA on the MIO block. The PIA is loaded by the 6800 with parameters passed to it by the CPU. The DMA has addressing and control logic to select public RAM locations and control the transfer direction.

Maximum throughput is one 32-bit word every cycle (1.5 microsecs). This yields a transfer rate of 2.67 megabytes per second.

The DMA operates independently of the 6800 and the BUS which use PHφ and PH1 respectively. No interaction is required from the CPU either.

Interprocessor Buffer

The Interprocessor Buffer (IPB) is a special type of MIO which gives the computer a multiprocessor configuration. In a multiprocessor system, one CPU is designated as the primary or host CPU. It is responsible for generating the master system clock. An IPB attached to the BUS performs two functions. First, it passes data between the host and the slave. Second, it supplies the SYNC pulse to the slave system from the master. Furthermore, the SYNC is delayed by one phase from the master to the slave.

Timing

A critical function of the IPB is to supply timing signals from the master to the slave bus. It is important to note that an IPB may be a master on one BUS and slave on another BUS. FIG. 51 shows a large multiprocessor configuration.

Table 28 shows how the IPB delays the master SYNC pulse through the system.

TABLE 28

|     | MASTER | SLAVE B | SLAVE C | SLAVE D |
| --- | --- | --- | --- | --- |
| $t_0$ | PHφ | PH2 | PH1 | PH2 |
| $t_1$ | PH1 | PHφ | PH2 | PHφ |
| $t_2$ | PH2 | PH1 | PHφ | PH1 |
| $t_3$ | PHφ | PH2 | PH1 | PH2 |
| $t_4$ | PH1 | PHφ | PH2 | PHφ |
| $t_5$ | PH2 | PH1 | PHφ | PH1 |
| $t_6$ | PHφ | PH2 | PH1 | PH2 |
| $t_7$ | PH2 | PHφ | PH2 | PHφ |
| $t_8$ | PH2 | PH1 | PHφ | PH1 |

This timing delay feature means that ring structures are not allowed. However, a tree structure is fully attainable to many levels. A master BUS may have a maximum of fifteen slave IPB's. A slave BUS must have one master IPB and a maximum of fourteen slave IPB's.

The phase delay allows the master and the slave to access the public RAM in IPB on consecutive phases. Another consequence of the delay is that all CPU's on the same level run in the same timing phase.

It should be noted that the SLAVE line on the BUS is asserted by an IPB on its slave side. This inhibits the slave CPU from sending out SYNC pulses. The SYNC pulse is generated by the IPB for the slave BUS.

Main Memory

The IPB contains a large dynamic RAM which is used for passing data between the master BUS and the slave BUS. On the master side, the IPB takes the appearance of another memory with reads and writes occurring in phase with the master SYNC. The slave side operates during PH2 which is normally used for DMA access.

The phase skewing makes a slave seem like a DMA transfer to the master. Alternately, the master appears to be a 6800 to the slave.

Microprocessor

A Motorola 6800 microprocessor is placed on each IPB module. The 6800 has its own ROM and RAM as well as its own bus structure. The 6800 in the IPB assumes the same functions as does the 6800 in the MIO.

TOTAL ACCESS PORT

The following describes in preliminary schematic sketch pad format the total access port (TAP). This total access port is intended to be a window on the entire problem solving and file structure of the largest configured computer according to the present invention.

The total access port will allow the user to totally manipulate his or her problem using the computer without ever getting out of his or her chair. Even the print function should be the last thing done. Listings, etc. should be maintained on the total access port and the total access port should be used in some mechanism as a microfilm reader. This is not a computer terminal, it is a people terminal. The display of the data is intended to be data only; status is by other mechanisms.

DISPLAY

An idealized display is shown in FIG. 52. A Hitachi color CRT with 96 characters will be the limitation both on printout, formatting and display. The philosophy is "what you see is what you get". Physically, a mechanical split line between the Hitachi color CRT and several other major sections may be necessary. There are two 3M tape slots. These tape slots will eventually each hold on the order of ten million bytes. That is the new proposed ANC standard. Initially, however, we will use two and one half million bytes which is the older standard. Two CRT status or cueing displays are used. One is to be able to label some "soft" keys. The other one is to label lights. We have both soft lights and soft keys. This allows the human and the computer to talk to each other with dynamically assignable functions.

KEYBOARD (See FIG. 53)

The keyboard as mentioned earlier has sections up on the display proper for eight soft keys. These soft keys display status, cueing and input and are eight lines each of sixteen characters. These characters must be large. A standard Selectric, no more, no loss, keyboard will be used with the actual typing input. This is approximately four high not including the space bar, and sixteen keys wide. The calculation pad which is separate, looks like a pocket calculator and has both numeric and math functions, both heavy and light.

Special label keys such as paragraph, line, heading, etc. are above the keyboard and are separated from the Selectric keyboard. There are some special function keys also. These are help and yes/no. Yes/No allows quick interaction between questions and answers on an interactive basis in the "help" mode. A joystick with the four arrow mode must be big and have a good feel. Acceleration of the cursor and/or pages to the data base must be smooth. Acceleration must be smooth and be used on the Fibbonaci whole number series. Other items of interest are that the cursor must move not on a character basis, but must move smoothly. Stopping, of course, will be quantized, but movement will not be because the eyeball needs feedforward in order to have non tiring tracking. The actual joystick may not be for keys with arrows on them, but may be an actual joystick or a Summagraphic pad, or similar device.

FIG. 54 is the preferred 9600 baud MIO channel driving a Hitachi color CRT. This CRT has embodied in it refresh, formatting, keyboard drive through 6800 microprocessors by Motorola.

POWER SUPPLY

FIG. 55 is an overview of the power supply concept. After line filtering and transient suppression, a ferroresonant supply preregulates and rectifies input power, generating a 40 volt DC primary voltage bus. A ferroresonant transformer was chosen because it employs a purely magnetic, passive circuit which can withstand transients and surges. By means of iron in saturation, peak voltages are converted to heat without impressing destructive transients upon semiconductor circuits. The 40 DC volt bus is distributed to all FSU's. Within each FSU there is a standby battery capable of maintaining operation of the two supported cyblocs for a 10 second period. A microprocessor contained within the power supply controls power sequencing and senses the condition of power voltages, status signals, console push buttons, etc. It also displays and annunciates hardware condition on a five inch CRT. Provisions are included for charging the battery and for delivering pilot power to the FSU's microprocessor. A DC to DC converter supplies three voltages to each block. A regulated +5 volt supply is used and two semi-regulated plus and minus 15 volt nominal outputs are generated. These are re-regulated and interlocked on the memory modules. This was done to insure maximum protection for memory chips since the MOS dynamic RAMS used require interlocking of VBB and VDD.

An overview of the power supply system is given in FIG. 56. Each pedestal unit will accommodate two CVT (constant voltage transformers) assemblies. Each CVT feeds two Functional Support Units and one Disk Support Unit. A functional support unit, in turn, power two blocks. Table 29 summerizes power line withstand requirements. Each FSU then supplies a total of 50 amps at +5 volts, plus 10 amps at +15 to +20 volts, and 2 amps at −15 to −20 volts.

As FIG. 57 shows, provisions have been made for carefully controlling system ground loops. The bus signal ground conductor is the primary reference between blocks. Within an individual block, the two PC boards are decoupled from one another and use the interboard flat cable signal conductors as a ground reference.

| Input | |
|---|---|
| Nominal Voltages: | 100, 115, 208, 220, or 240 VRMS. |
| Voltage Variation: | |
| Steady state: | ± 20% |
| 10 Second Surge: | ± 30% |
| 1 Cycle Surge: | ± 100% |
| Spikes: | 20 joules @ 1500$^V$pk 1 second T$_{rep}$. shall pass NEMA capacitor discharge surge test and showering arc test. |
| Common Mode: | 2500 VDC withstand Shall operate error-free with NEMA showering-arc test. |
| Line Isolation: | >10 meg @ 500 VDC |
| Frequency: | 60 Hz ± 2% or 50 Hz ± 2% |
| Temperature: | 5° To 50° C. |

POWER SEQUENCING

FIG. 58 illustrates FSU major states indicating that both automatic and manual modes are available. In normal mode, one FSU (the one containing the CPU) is a master and all other power is sequenced by this unit. It is possible to place any FSU in a manual mode for maintenance purposes, allowing its power to be controlled separately. In a multi processor situation with IPB's, it is possible for the entire system to be sequenced on and off by way of the master CPU, however it is also possible to control each slave bus independently. Circuitry to accomplish this is indicated in FIG. 59. FIG. 60 shows the behavior of the system on power-up, during a power dip and on an unpowered shutdown. Manual shutdowns with power available are similar except that the AC and primary DC voltages do not decay. On a power dip, the disk will retract its head and must be recycled. When power is restored, however, no data is lost provided the power dip lasts less than 10 seconds. A possible addition being considered is a line regulator to condition disk power for increased brown out resistance. The disk cannot be completely impervious to a momentary power outage without a full high energy UPS system.

The microprocessor with its 5 inch CRT acts as an annunciator and power control console. It senses that voltages have been applied to blocks and that connectors are plugged in. It also will display one of eight general purpose messages from each block. These messages are general and are not related to specific types of blocks being serviced. The console for the Disk Support Unit (DSU) is a similar assembly, however it has messages specifically related to disk operation. FIG. 61 shows typical screen format on the CRT.

Power supply reliability is achieved by conservative component ratings, avoidance of hot spots, and preregulation of input power by the CVT/Battery "front end". A single transistor Phillips-type inverter circuit is under development as the main power converter. This circuit has the advantage that a single transistor is used, thus avoiding the problems associated with balancing a push-pull configuration. In addition, an innovative base turn-off circuit for the converter transistor has been incorporated which should yield exceptional efficiency and reliability.

THERMAL CONSIDERATIONS

FIG. 62 gives a power budget for a minimum system. Additional peak AC power is required for disk unit starting current. About half of the FSU power is removed by a forced air conduction heat sink blown by one of the five FSU fans. The four other fans blow air across the modules and a portion of the power supply circuitry. Low velocity fans are used to insure extremely quiet operation.

PACKAGING

As shown in FIGS. 14-16 and 63, the digital computer 20 of the present invention uses a modular packaging philosophy. Each electrical assembly is provided with its own mechanical containment/electrical shielding enclosure. Functions are tightly bound and self contained while at the same time allowing systems of various sizes to be constructed without resorting to "relay rack" technology. Mechanical simplicity is achieved by having no back plane, but instead using flat cables as the main system bus. The MIO concept also means that I/O signal distribution is related to individual blocks as opposed to being concentrated as in conventional machines. This is an embodiment in hardware of the fact that there is no "I/O bottle-neck" or "heavy traffic" area in the system. Modularity means improved maintainability, which is aided by the existence of independent diagnostic microprocessors on each module. This is a variation from the usual built-in test because many diagnostic functions are designed to operate independently from normal signal paths thus increasing the chances of valid fault reporting and isolation to the module.

As shown in FIGS. 64A–C, the modular packaging concept allows for many system configurations. The systems shown are all possible with a single processor. Using IPB's, much larger systems can be constructed. It is also possible to connect many disk memories to the system. By combinations of tree structures with multiple IPB's and disks, enormous configurations are possible.

Similarly, within an FSU 62, the two blocks 60 have their power supplies isolated from one another to minimize ground loops currents. On a system level, each FSU is isolated from all others internally. In addition, all signals between the FSU microprocessor and each of the two blocks are isolated from one another to control ground loops. Chassis grounds are wired between all units and provision will be made for unit-to-unit bonding to provide EMI/RSI shielding and to minimize EMI suspectibility.

The software which may be utilized by the digital computer 20 of the present invention is of course unlimited in scope. However, for quick user availability, a complete operational set of microcode for an operating system and its languages can be provided. Three types of operating systems that can be performed by the computer 20 are a tape oriented, stand alone, non disk system with a pseudonym FOS I, a single user, multitask disk operating system, having pseudonym FOS II, and a multi-user disk operating system with virtual memory having pseudonym FOS III. In addition, a string oriented editor for creating and editing program codes can be provided. In addition, two versions of Fortran can be utilized by the computer with ANSI standard Fortran IV and Fortran 77.

A number of assemblers can also be utilized by the computer including a symbolic assembler for operation codes specifically formulated for the computer, a microcode assembler having a symbolic microcode assembler for the writable control store, and a symbolic assembler for the 6800 microprocessor associated with each MIO, IPB, power supply, and CPU of the computer. All of this software includes the operational software such as a linker, debugger, tape and disk file manager, I/O handlers to form a complete set of utilities.

FIG. 20 illustrates in diagrammatic form the input/output programming possible in the MIO's by use of the microprocessor 36 associated with the MIO. Each microprocessor in the MIO and the CPU communicates through what is known in the art as "mailboxes", which is a small section of MIO public memory 33. When the CPU has a command for the microprocessor it places that command with its associated parameters into the mailbox 76 as depicted in FIG. 20. The microprocessor then executes the command and returns the status upon the completion into the mailbox. These commands include the initiation of input/output transfers, enables, and interrupts. They also perform diagnostics, and execute programs within the microprocessor out of the public memory 33 or the private memory 39 of the MIO. This latter feature enables the users to develop their own input/output protocols to be utilized by the microprocessor without needing the information permanently stored in the read only memory 40. The mailbox 76 actually consists of a ring buffer 86 (see FIG. 21) mechanism so that the central processing unit can set up a string of commands for the microprocessor within the MIO to execute before the MIO interrupts the central processing unit. In essence the mailboxes 76 are where bits of status concerning the operating of an input/output are kept so that the CPU may sample the status of another CPU or another situation being resolved. For example, normally it is not desired to interrupt the CPU but instead have the MIO go out and get and establish a line of characters with the appropriate delimiter for later use by the CPU. The delimiter indicates that the command has finished. Delimiters can be such things as asterisks, carriage returns, line feeds, three spaces in a row, to mention a few. The delimiter tends to close off the command. A typical command module might be "go to space 22" followed by a line feed or carriage return. Upon the reception of the line feed or carriage return, the MIO via its microprocessor, would place in its mailbox the fact that a command is available somewhere. The central processing unit would then come down and examine the mailbox and then proceed to examine another location which holds the location of the command to be executed. The central processing unit would then go down and tell the microprocessor within the MIO, by means of its mailbox, that it is proceeding to execute that location in memory and that it does not wish to be disturbed. Execution would then proceed at a rapid rate in the central processing unit and the results of the command would then be deposited back into the MIO. It is thus apparent that the MIO is indeed the memory of the entire digital computer.

As best seen in FIG. 21 in order to initiate an input/output transfer the user sets up an input/output command block 78. It should be noted that these command blocks are not necessary to the architecture employed by the present invention, but are simply software conventions which can be utilized. In the convention shown in FIG. 21 the I/O command block contains an I/O command 79 which includes a channel number and type of transfer, an interrupt level 80, which consists of eight hardware levels nested with eight software levels, a data transfer count 81, a transfer address 82, a word of status upon completion of the transfer 83, and the address of the input/output handler 84 to be used.

The user puts the address of this command block 78 in the "next" position in the ring buffer 86 and moves the mailbox "end" pointer 87 to point to this command block. Whenever the "start" address of the mailbox 76 is not equal to the "end" address, the microprocessor within the MIO block proceeds to execute the input/output commands moving the start address as it completes each one until the start address is the same as the end address, at which time it goes into a quiescent state to await the next command.

FIG. 22 illustrates the interrupt structure. The interrupts are eight wires that connect directly via the interrupt bus, which is part of bus 26, between the MIO and the CPU. These eight wires are of eight possible priority levels of interrupt. Thus, if the central processing unit was operating at level four, a level three interrupt would not disturb the process. However, a level five or higher level would interrupt the central processing unit. It should be noted that the level interrupts are distinct from the bus three phase clocking cycle and will be immediately acted upon by the central processing unit if the level has a priority higher than the level of command being executed by the central processing unit. Multiprocesses may occur at the same level and any MIO has access to any level by its own microprocessor software.

If an interrupt level has been specified in a command, the microprocessor in the MIO generates an interrupt after setting the completion status in the command block. This in turn will indicate to the CPU that the command has been completed. The interrupt level is performed by putting the input/output block address of the input/output command block 78 for the interrupt to be serviced in the mailbox 76, followed by energizing one of the eight hardware priority interrupt lines. The highest priority interrupt level on these lines is compared with the top level on the interrupt stack, as shown in FIG. 22. If the interrupt level is higher, the central processing unit is interrupted and this new level is pushed into the stack. The central processing unit stores its status and then interrogates the MIO to determine which one interrupted it on that level. It then reads the address of the input/output block from that MIO mailbox.

The central processing unit then puts the input/output block address into a register, and branches to the input/output handler, whose address is specified in the input/output block.

When the input/output handler completes its action, it returns control to the central processing unit, which pops the interrupt stack and its status. The CPU then resumes processing where it left off before the interrupt. If it was part way through a microinstruction when it was interrupted, the central processing unit repeats the entire microinstruction.

The microprocessor within the MIO is responsible for presenting the highest level software interrupt at any hardware interrupt level to the central processing unit. When there is more than one interrupt at a given hardware level, the microprocessor queues them for service by the central processing unit.

SOFTWARE NEEDED TO MAP BETWEEN THE COMPUTER HARDWARE ENVIRONMENT AND THE USER ENVIRONMENT

The user environment is maintained for many users at once. The software supports independent copies of the user environment. The software is responsible for maintaining the characteristics of all copies of this environment in spite of hostile users and hardware failure.

The strategy chosen to implement this collection of user environments is to divide the system into independent partitions. Each partition is granted total control of part of the system resources.

The implementation strategy which has been selected is to provide a software kernel which maintains the illusion that the computer system really consists of many separate processors. Applications in each partition run as if they had the complete resources of a smaller computer system available to them. Except for execution speed, an application program in a partition experiences no effect from the existence of other partitions.

Application software has little direct interaction with the kernel. Instead, application programs interact with the operating system. A separate incarnation of the operating system runs in each partition. The operating system supports device independent I/O, user task sequencing, and allocation of partition resources.

KERNEL

The primary responsibility of the kernel is to maintain separation between partitions. All requests for I/O and all requests for resources are ultimately directed to the kernel. The kernel insures that these requests are met in such a way that users do not interact.

Hardware has been provided to help the kernel in this task. In particular, the memory mapping box allows the kernel to divide up the computer memory in arbitrary ways. The kernel divides the total memory available among the partitions, and maps the addresses which refer to this memory such that each partition has a contiguous memory space, starting from word 0. Because the memory available to each partition is contiguous, it is not possible for application programs and different partitions to address data belonging to other partitions.

The kernel carries out similar protective mappings with respect to disk file access and interaction with other peripherals. Each partition is allocated a portion of the system disk. This disk space looks to each partition as though it were a smaller disk, whose first track is track 0. Although the actual physical tracks used by a partition may or may not be contiguous, the software in each partition acts as though they are.

Each partition is also allocated access to a terminal or terminals. Terminals are referred to by logical I/O unit numbers, and each partition has an independent set of I/O unit numbers.

The hardware supplies a set of internal CPU registers and memory mapping hardware for each partition. This minimizes the overhead of switching between partitions. However, the kernel does not perform task switching when I/O activity for an inactive partition completes. Instead, that partition is activated the next time its turn comes.

INTER PARTITION RESOURCE ALLOCATION

The kernel is responsible for allocating resources to each partition, and making sure that no partition demands more resources then it is permitted. Initial versions of the kernel do not allow resource allocations to be varied. Later versions allow users to change the resources allocated to each partition.

CPU TIME

The kernel allocates CPU time by giving a fixed time block to each partition on a round robin basis. Each partition is allocated a maximum amount of run time each time it is given control. The partition keeps control of the CPU until either its alloted time expires, or it requires external data.

If I/O activity is initiated which must be completed before processing can proceed, the partition loses the rest of its time slice, and the kernel activates the next partition. No matter how soon the I/O activity is completed, the partition is not reactivated until its place in the regular sequence is ready.

MEMORY

The maximum memory available to each partition is built into the kernel. However, a partition is not necessarily given its total allocation of memory at all times. Whenever a partition needs less than its maximum memory allocation, it indicates this to the kernel, which reclaims the extra memory. The kernel allocates unclaimed memory to the validation partition, which is responsible for testing it until it is needed again.

Initial versions of the kernel do not change memory allocated to partitions. Instead, the memory map is loaded at IPL, and remains fixed.

DISK SPACE

The kernel gives each partition the impression that it has sole control of a small disk. This disk is allocated what appears to be a contiguous block of sectors, starting with sector 0. Data protection is facilitated because partitions cannot even address disk space allocated to other partitions.

The hardware does not include any facilities for mapping disk sector addresses. Initial versions of the kernel allocate contiguous portions of the system disk to each partition, and a partition always has its maximum amount of disk space.

Later versions of the kernel, however, manage disk space in the same manner as core memory. Disk space which is not being used by a partition is allocated to the diagnostic partition, which tests it continuously. Whenever a partition needs disk tracks, they are reallocated from the diagnostic partition to the requesting partition.

MAPPING

The kernel has overall responsibility for mapping between logical resource requests issued by the partitions and real devices. This mapping capability is needed to let partitions continue processing in spite of hardware failure. By mapping around failed portions of the hardware, the kernel is able to continue to provide partitions with services. Unless all partitions simultaneously require the maximum potential resources, the illusion of complete reliability is preserved even in the presence of hardware failure.

MEMORY MAPPING FOR PROGRAM EXECUTION

Hardware is needed to maintain the illusion that each partition has access to contiguous memory. Whenever a program in a partition makes an instruction or data reference, the address in partition space must be mapped from partition space into real hardware. Because it may be necessary to perform this mapping operation several times in the course of executing a single instruction, it is necessary that memory mapping be done with hardware.

The memory mapper is a table of correspondences between the high order parts of partition data addresses and the high order parts of real hardware addresses. Whenever a data reference is made by a partition, the high order part of the data address is matched against entries in the map table. When a match is found, the entry in the table is substituted for the original high order part of the partition address. Thus, data addresses are mapped from the non existent partition address space to the real address hardware space. In order to keep the size of the mapping table within reasonable limits, the minimum block of memory which can be mapped is 8KB.

Memory that is allocated to a partition is included in the address space for that partition. The mapping hardware assures that all memory allocated to the partition can be referenced as one continuous address space, starting with word 0, and running up to the maximum address in the partition.

Whenever the partition requires more memory than it is currently using, it asks the kernel for more. The kernel obtains memory from the validation task. The validation task passes the kernel a portion of memory which has been recently tested. The kernel changes the mapping hardware so that this memory is mapped after the highest address in the partition. The partition's maximum address is then updated to reflect the added memory. The kernel refuses memory requests which would carry the partition beyond its maximum.

Whenever a partition's memory requirements drop, excess memory is returned to the kernel, which reallocates it to the validation task. The maximum address in the partition is changed to reflect its reduced address space.

8KB portions of real memory are continually being shuttled between partitions and the validation partition. Whenever a fault is found in a memory module, it is allocated to the validation partition until it can be repaired. Unless all partitions simultaneously request so much memory that a working memory module cannot be allocated, memory failure does not affect system operation.

DISK SECTOR MAPPING

Disk sectors are referred to much less frequently than memory words. It is not necessary to provide extra hardware to map partition disk sector addresses onto the real disk. Initial versions of the kernel simply add appropriate constants to partition sector numbers in order to determine real disk sector addresses. Later versions perform more sophisticated mapping operations, and it will be possible to make noncontiguous areas on the disk appear contiguous.

Once the kernel includes the facilities for allocating non-contiguous areas of disk, partitions can be protected from disk track failure in the same way that they are protected from memory failure. Bad tracks are simply held by the diagnostic partition until they can be repaired.

MEMORY MAPPING FOR I/O

I/O requests from partitions are specified in terms of reading data into or writing data out of a portion of the partition address space. Partition addresses are meaningless to the MIO processors which handle data transfers. The kernel translates addresses in I/O requests into offsets from the beginning of MIO memory. MIO relative addresses are passed to the MIOs when I/O activity is initiated. The MIO performs I/O in terms of actual MIO addresses, and signals the kernel when activity is completed.

QUEUEING AND DEQUEUEING MIO REQUESTS

The MIO and the kernel communicate via MIO memory. Their communications area is referred to as the mailbox. The mailbox is essentially a list of I/O operations which must be performed by the processor in the MIO. These I/O operations are described in terms of the function to be performed and the portion of MIO memory on which the operation is to be performed. The kernel is responsible for inserting partition I/O requests into the mailbox and recycling mailbox space when the I/O operations are completed.

INITIALIZATION

Because the kernel has overall responsibility for managing and monitoring system hardware, the kernel must determine where all the hardware is. This determination is made during initialization.

SET UP AND MAINTENANCE OF HARDWARE CONFIGURATION

Each MIO is responsible for validating itself when power is turned on. After the MIO has validated all of its local hardware, it communicates with other MIO's to determine its absolute address in the overall memory space of the machine.

The mailbox for each MIO is located at the beginning of its memory. The real computer addresses occupied by the MIO are not inherent to the MIO itself. Instead, MIO's occupy positions in an overall address space which are determined by their memory size and serial numbers. The computer memory addresses occupied by a given MIO may change when other MIO's are removed or inserted.

Once each MIO knows the beginning and end address of its memory, it communicates this information to the kernel. The kernel deduces the locations of the mailboxes in each MIO from this information, and sets up the mailboxes.

The kernel then determines how system resources are to be allocated between the partitions. Memory maps are set up to protect users from each other, partition status tables are initialized, and the system validation test is started. After the test verifies that each partition seems to work as a whole, the kernel is notified, and starts up user partitions. These partitions wait for terminal commands to begin processing user tasks.

DOMAINS

In order to help maintain the integrity of programs and data in a partition, memory in a partition is divided into four domains. The memory mapping and protection boxes can tell which parts of the partition memory are allocated to each domain.

Domains bear a hierarchial relationship to one another in that lower number domains have more influence over higher number domains than higher numbered domains have over lower number domains. A program running in domain 2 or domain 3 cannot directly reference programs or data in domains 0 or 1. Instead, higher numbered domains must make specific subroutine calls requesting access to the higher lower number domains.

This allows the software responsible for a domain to control access requests from higher number domains. Because the kernel is the most important software in a user partition, it runs in domain 0. The operation system is second in importance and runs in domain 1. User programs run in domain 3.

Because interpartition protection is handled by the protection box, the domain concept has nothing to do with protecting partitions from each other. However, the domain maintenance facilities allow a high degree of intrapartition protection. An erroneous user program cannot easily damage the operating system. Errors in the operating system do not damage the kernel in that partition. This facility allows faults in the partition to be trapped, helping users debug programs.

MIO SOFTWARE

MIO software manages all the computer I/O activity, and coordinates it with the main CPU. When power is turned off, MIO software brings about an orderly shutdown of the computer peripherals. When power is turned on, MIO software manages the power up sequence and verifies that all MIO hardware is functioning properly. Whenever operational errors are detected, the MIO software activates test routines to isolate the trouble.

BASIC MIO HARDWARE ENVIRONMENT

The structure of the MIO software is intimately related to its hardware environment. The data bus 26 has a major effect on the MIO software. The MIO also includes a portion of the computer public memory. Initial MIO units come with up to a quarter of a million bytes of storage. Later technology will allow MIO units to have up to 2 million bytes of public memory each.

The MIO supports up to 4 communication channels. These channels are designed to handle sequential I/O one character at a time.

A portion of the public MIO memory is devoted to a mailbox (see FIGS. 20 and 21). The mailbox is used as a communications area in which instructions are passed between the computer and the MIO. The MIO processor scans the mailbox looking for I/O commands, initiates them, and notifies the computer's CPU when they are complete.

When an I/O command is completed, the MIO processor places the status information from this command in the mailbox. The MIO processor uses a part of the mailbox area as an I/O buffer for data which is not meant to go to the main CPU.

On the principle that all of the computer's components ought to be articulate, the MIO supports a diagnostic port. The diagnostic port communicates with a serial character device such as a Teletype. Field service personnel interrogate an MIO to determine its status by plugging a Teletype into the diagnostic port.

BUS INTERFACE

Although the bus 26 is referred to as if it were an ordinary data bus, it functions in a manner quite different from the data bus in conventional computers. In conventional computer architecture, the bus carries addresses and data. The addresses select the memory into which the accompanying data are to be read or written.

High speed devices such as the CPU and disks are interfaced directly to the data bus. Peripherals on the data bus compete for access to the bus, with the CPU usually having the lowest priority.

In such architecture, whenever I/O devices want access to the data bus, they steal cycles from the CPU. I/O transfers slow down CPU processing. In addition, the decision of which device should use each bus cycle must be made during the previous cycle. Because this decision must be made rapidly, the logic required to make the decision is complicated.

The bus architecture bypasses this problem completely. Instead of having only one kind of bus cycle for which peripherals must bid, there are three kinds of bus cycles. (see FIG. 3).

The first bus cycle, known as phase 0, is always allocated to the computer's CPU. The second phase, referred to as phase 1, is always allocated to the MIO processor. The third phase, known as phase 2, is dedicated to high speed transfer between MIO memory and peripheral devices. Thus, I/O and examination of memory by the MIO processor do not slow down the CPU.

HIGH BANDWIDTH DATA ACCESS (HBDA)

The HBDA allows wide bandwidth devices the same access to public MIO memory that the CPU and the MIO processor have. The HBDA incorporates a memory address register, a memory data register, read and write handshaking lines, and all other bus control lines.

Because the HBDA interface is identical to the CPU interface, another bus can be plugged into the MIO. Devices may use the HBDA to read or write any randomly selected 32 bit word in the MIO memory. Another computer CPU can be plugged into the HBDA and share the public MIO memory with the original CPU.

The MIO processor has the option of preventing HBDA access to the mailbox area in the MIO memory. The purpose of this lockout is to prevent errors in peripheral device operation from wiping out the mailbox. However, the MIO processor can, at its option, permit HBDA devices access to the mailbox.

Devices which use the HBDA for transferring blocks of data into sequential memory must contain facilities for incrementing the memory address register and loading and unloading the memory data register. Conventional DMA device controllers incorporate these facilities and ignore the bus handshake lines. Computer processors plug directly into the HBDA, and use the bus control lines.

SERIAL CHARACTER I/O PORTS

The MIO processor is responsible for the handshaking required to transfer characters to and from computer terminals. Each terminal is interfaced to a character port in the MIO.

In a command response situation where the end of a message is signaled by a terminator such as a carriage return, the MIO interrupts the CPU only when a complete message has been received. In this mode, the MIO is responsible for character echoing, processing of back space or rub out functions, detection of the carriage return, and interrupting the CPU.

In more complex applications where the terminal interacts with the CPU on a character by character basis, the MIO is told to notify the CPU whenever a character is entered from the terminal. In this case, the computer's CPU is responsible for character echoing, cursor control, and handling special characters.

The computer tells the MIO processor whether characters are to be processed by the MIO or whether all input characters are to be passed to the computer as they are received.

TELECOMMUNICATIONS

The major motivating factor behind including a special processor in the MIO is to remove the overhead of high speed I/O device control from the CPU. This cuts down the overhead of state changing on interrupt by minimizing the number of interrupts which the CPU must handle.

Telecommunications processing is a particularly good example of an application in which the MIO processor can offload the CPU. The MIO strips protocol characters from around messages, requests retransmission of erroneous blocks, and does not give messages to the CPU until they have been properly received. On output, the MIO processor inserts protocol characters in the message, transmits the block and retransmits it if necessary.

The overall effect is that the CPU can treat telecommunications channels as though they were standard devices. All of the idiosyncrasies of telecommunications are handled by the MIO.

MIO MEMORY LAYOUT

The processor chosen for the MIO is the Motorola 6800. The 6800 has 16 bits of address space, which means that it can directly address up to 64 K bytes. In order for the 6800 in the MIO to be able to perform all of its functions, its 64 K byte basic address space has been allocated very carefully.

PRIVATE RAM

The first 16 K of 6800 address space is a private RAM. This RAM cannot be manipulated except by the 6800 in the MIO. The 6800 uses this RAM to hold private data.

In addition, the 6800 can copy programs into the this RAM from other parts of its address space. Diagnostic routines which do not fit into the main 6800 memory can be loaded into the private RAM for execution. This procedure is rather slow, and is not intended for normal operation.

WINDOWS TO PUBLIC RAM

The next 16 K of 6800 address space is divided into two 8 K movable windows. These windows may be positioned anywhere in the public MIO memory. By moving the windows appropriately, the MIO processor can gain access to any 8 K part of the public RAM. The MIO processor needs two windows into public memory in order to be able to access the mailbox and a data area at the same time.

The 16 K of private RAM and the two 8 K windows into public RAM account for 32 K of the 6800 address space.

I/O DEVICES

The next 4 K of 6800 address is reserved for I/O devices. Motorola 6800 I/O devices are allocated portions of the memory address space, instead of being treated as external peripherals. 4 K of address space has been reserved to address a large number of terminals, external registers, and other paraphernalia associated with I/O devices.

PROGRAM STORAGE

The next 26 K bytes of address space is occupied by a read only memory which holds MIO programs. Although it is easier to distribute software which can be loaded into RAM, ROMs are used so that MIO software can survive power failure. Having the MIO software available when power turns on simplifies initialization procedures.

TERMINAL DEBUGGER

The final 2 K of 6800 memory is reserved for the local MIO debugger. This debugger supports the debugging terminal. The debugger is intended for field engineering support of the MIO and for rudimentary checkout of MIO software. The debugger ROM also contains the interrupt vectors and restart vectors that are required by the 6800.

I/O HANDLING

In terms of its support of I/O operations, the processor in the MIO acts like a smart data channel. The computer's CPU transmits relatively high level I/O commands to the MIO, and the MIO processor carries them out. The CPU is notified when the operations have been completed.

Because the I/O operations are performed asynchronously with respect to the main CPU, they do not load down the CPU. This simplifies the support software in the CPU, simplifies its hardware interrupt structure, and increases throughput. This approach has been used in the past, but because of the cost of outboard processors, only very large scale computers have incorporated smart data channels.

MAILBOXES

Control information between the MIO processor and the computer's CPU is communicated by the mailbox. The mailbox always occupies the first 8 K bytes of public memory in an MIO. The minimum mailbox size is 8 K bytes because the memory protect and memory mapping hardware deal with a minimum of 8 K bytes at a time.

MIO IDENTIFICATION

The first part of the mailbox contains a 32 bit identification of the MIO. This identification word contains the memory size for the MIO, the MIO serial number, and the settings of the external MIO identification switches. This information is used when MIO's allocate themselves to different portions of the computer's memory space during power up.

INTERRUPT VECTORS

The mailbox also contains a set of 8 vectors, one for each interrupt level in the CPU. The MIO processor can activate an interrupt on any interrupt level that it chooses. When the computer requests an I/O action by placing a description of the acton in the mailbox, the computer may request that an interrupt be generated when the activity is complete. The computer also specifies the interrupt level on which this interrupt is to take place.

When the I/O activity is completed, the I/O processor places the CPU interrupt handler for the just completed operation in the pointer associated with the requested interrupt level, and asserts the required interrupt. When the computer acknowledges the interrupt, it examines the pointer to determine the location of the descriptor for the I/O activity which caused the interrupt.

I/O QUEUES

The mailbox holds task queues for I/O activity to be performed by the MIO.

The MIO processor scans the task buffer on a periodic basis. Whenever it notices an active entry in the task buffer, the MIO processor extracts the pointer to the I/O activity descriptor, and uses it to initiate the requested operation.

When the I/O transfer is complete, the status information in the I/O descriptor is updated. An interrupt may or may not be initiated, depending on the computer's specification in the I/O descriptor.

I/O DEVICE PROTOCOLS AND DEVICE DEPENDENCE

The computer's CPU requests data transfers in a more or less device independent way. Although mailbox entries identify particular devices, they do not go into the device specific details of the data transfer. The MIO processor is responsible for device dependencies.

Because I/O transfers involve devices of different speeds, the I/O transfer operations initiated by entries in the mailbox may or may not be completed in the same order in which they were inserted in the mailbox. Depending on the speeds of the devices involved, the last entry in the queue may be completed first.

For this reason, the overall mailbox is not a first in first out queue. It maintains a series of task queues, which function like task lists. When the CPU wishes to start the I/O processor on a new task, it finds an unused entry in the appropriate mailbox queue and puts the entry there. The MIO processor marks these I/O operations complete as they are completed.

Both the kernel and the MIO treat mailbox queues as random in, random out lists. It is advantageous to give the MIO processor the right to reorder entries in its mailbox queues in the interest of increased throughput.

Many peripheral devices can be used more efficiently if requests are reordered in order to take advantage of the hardware. Disks with moving heads, for example, can be operated more rapidly if data transfers are done in seek order. Thus, both the kernel and the MIO are given the right to reorder I/O requests that are entered simultaneously in the interests of increased throughput.

MEMORY MAPPING

The MIO processor does not have access to the computer memory mapping hardware. I/O activity proceeds asynchronously with the execution of an application program in a partition, and the contents of the mapping hardware at the time I/O activity is initiated may or may not have anything to do with the contents of the mapper at the time the I/O is requested. For this reason, the MIO performs data transfers in terms of actual MIO hardware addresses.

The processor in the MIO is not fast enough to handle the mapping load, nor does it have access to the mapping information. For this reason, the kernel is responsible for translating all partition data addresses into addresses relative to the beginning of the MIO memory. The MIO does not have to manipulate full computer data addresses. This saves a great deal of memory space in the mailbox and simplifies the MIO software.

MIO TESTS

Whenever the MIO or the kernel suspects a malfunction of the MIO, on line tests must be performed. If the MIO detects the malfunction, it reports the nature of the malfunction to the kernel. If the kernel detects the malfunction, it takes the same action as if the MIO had reported the failure.

The response to such a malfunction is always the initiation of MIO testing. I/O activity which is affected by the suspected malfunction is suspended.

If the necessary test routines are contained in the MIO's memory, they are activated directly. If not, the kernel obtains the test routines from the disk MIO, and places it in a part of the MIO public memory. The MIO processor copies the tests to its private RAM, where they are executed.

If the tests confirm a failure, information regarding the failure is displayed on the status CRT in the TAP of the user whose partition is effected. In either case a report of the initial failure, and a report of the results of running the test are included in the fault log for later examination.

TERMINAL DEBUGGER

Service personnel use the terminal debugger to operate an MIO whether or not it is on line to the computer. Requests entered from the debugger diagnostic port take precedence over requests from the computer CPU. Because it is allocated only 2 K bytes of MIO assembly language code, the debugger lacks the capabilities of a full house software debugger. However, it is useful for interaction with an MIO in the field.

INITIALIZATION

The MIO processor is responsible for MIO initialization which cannot be performed by the computer's CPU. Initialization is done at power on or under command of the terminal debugger or the computer.

POWER ON

The power on sequence consists of insuring that power is supplied to the peripherals attached to the MIO in the appropriate order.

VALIDATION OF LOCAL MIO HARDWARE

As soon as power is stabilized, the MIO processor checks to insure that its program ROM has the appropriate check sum. It then sees that all hardware which is attached to the MIO is working correctly.

This validation process is not a full blown diagnostic, it is intended to provide a GO/NOGO test. Furthermore, because the MIO processor can only manipulate 8 bits of the public RAM at a time, it does not test the public RAM thoroughly. It does check that all bits can hold both a 0 and a 1. Rigorous memory tests are the responsibility of the computer CPU.

After the MIO processor has checked itself out to the extent that it is able, it attempts to verify its peripherals. A test data pattern is transmitted to all terminals. Rudimentary diagnostics peculiar to the peripherals, such as extreme seeks for disks, are also performed.

ESTABLISH SYSTEM CONFIGURATION

Once the MIO hardware is thought to work, the various MIOs in the system get together and establish the system configuration. The first task is to establish the hardware address space of the computer CPU. In order to do this, each MIO must find out that portion of the hardware address space for which its memory is responsible.

MIOs sort themselves out to cover the computer address space starting with those MIOs which have the largest amount of RAM. In other words, MIOs with large memory space form the lowest numbered memory addresses in the computer CPU. MIOs with smaller and smaller amounts of RAM occupy higher and higher portions of the computer address space.

MIOs which have the same amount of RAM sort themselves out on the basis of serial numbers. Under normal circumstances, an MIO with a lower serial number occupies higher numbered memory address spaces than an MIO with a higher serial number.

In order to allow the user some control over the hardware configuration, external configuration switches may be used. The settings of the switches set bits in the serial number word which are more significant than the bits put into the serial number at the factory. This allows an MIO with a high serial number to occupy a higher portion of the address space than an MIO with a low serial number.

CPU AND KERNEL INITIALIZATION

Once the MIOs sort themselves out to cover their memory address space, the microcode to define the computer opcodes is read from disk. A small bootstrap loader is read in with the microcode. This loader reads the kernel software from the disk MIO, places it in the appropriate part of computer memory, and activates it. Tables in the kernel are filled in with the starting addresses of each of the MIOs.

The kernel finds out where the mailboxes are by looking at the table. Each MIO processor is responsible for initializing its mailbox.

Once the mailboxes are initialized to the quiescent state, the kernel uses the mailboxes to interrogate the MIOs to find out what kinds of peripherals they are supporting. The kernel uses this information to build tables to control the real I/O devices.

INITIALIZE I/O DEVICES

The first part of I/O device initialization is the responsibility of the MIO processor. This I/O device initialization is performed as part of the power on sequence, and is essentially limited to making sure that each peripheral is present and powered.

Once the kernel finds out which devices are supported by each MIO, however, the kernel performs initialization of its own. Thus, specific hardware device initialization is a combination of local MIO initialization and kernel routines.

DISK MIO

In addition to all the other functions of an MIO, the disk MIO is responsible for managing data transfers to and from the disk. Although the disk is just another peripheral, it is important that the MIO which happens to support the disk is discussed separately.

The minimum disk used with the computer is an 80 million byte Winchester moving head disk. Data are moved to and from the disk via the HBDA port in the MIO. The MIO processor controls which real disk sector is involved in the transfer, the amount of data transferred, and the starting address of the data in MIO memory.

The disk controller represents a slight augmentation of the HBDA in the MIO. The HDBA provides access to four bytes of data from the MIO memory at a time. The disk interface contains facilities for taking 4 bytes of data at a time and transferring them to the disk, and for accumulating data taken from the disk into 4 byte words. The disk interface is also responsible for incrementing its memory address register during data transfer.

Initially, data transfers are fixed to 4 K bytes in length. The kernel and the Operating System are responsible for using this fixed length facility to implement more general disk I/O facilities. The kernel is responsible for partitioning the disk on a user basis and the MIO processor is responsible for translating I/O requests from the kernel into hard disk sector addresses.

The MIO processor is also responsible for maintaining a list of defective disk tracks. Although the kernel can obtain a list of defective tracks from the MIO, normal I/O operations do not require that the kernel be aware of bad tracks. Whenever a request for a bad track is received by the MIO processor, the MIO processor redirects this request to an alternate track.

DISK ADDRESSING

It is planned that eventually each MIO can support up to 8 disks of 300 megabytes each. Assuming that the minimal addressable unit of data on the disk is 4 K bytes, 25 address bits are required to handle this much disk space. Thus, 32 bit disk addresses are sufficient to specify the disk data block, the user number, and the privilege level associated with the user. It is not yet clear whether the kernel is involved in mapping of disk I/O requests to specific hardware tracks, or whether all of this is done by the MIO.

TERMINALS ON DISK MIO's

The disk management MIO also supports terminal access ports. These terminals are allocated to partitions just like the terminals on any other MIO.

TIME OF DAY CLOCK

One of the disk MIO peripherals is responsible for maintaining the time of day clock. If there are multiple disk MIOs in a system, the time of day clock in the lowest computer addressed MIO is the official time of day. The clock is provided with special battery back up so that unless a power outage persists for an extremely long time, it is seldom necessary to reset the time of day clock.

The MIO is responsible for periodically copying data from the clock into the mailbox. The kernel can examine this location at any time to determine the time. In addition, the kernel can request that the MIO reset the clock or set timer interrupts by issuing special commands via the mailbox. Except possibly for handling daylight savings time, it should not be necessary to reset the clock more than once in the life of a disk MIO.

DISK DIAGNOSTICS

Disk testing is the responsibility of the disk MIO.

Unfortunately for a diagnostic routine, the disk MIO processor does a considerable amount of translation of the disk sector number received from the kernel. It is possible that provision might be made for the kernel to manipulate the disk directly without any sector number mapping by the MIO processor.

This special disk access mode would be used only for diagnosing specific disk sectors and for setting up patterns of disk access which are designed to stress the disk.

IPB SOFTWARE (See FIGS. 1, 2A, and 5)

IPB hardware is similar to MIO hardware. The IPB consists of some amount of public memory with an MIO processor managing it. Because the MIO processor supports the standard character oriented access ports, terminals may be plugged into an IPB. These terminals are handled just like any terminal on any MIO.

The major difference between the IPB and the standard MIO is that an IPB is intended to transfer data between two computer CPUs. One of the CPUs is permanently designated the master, and the other is permanently designated the slave. The slave CPU plugs into the HBDA port on the IPB, and uses the bus control lines to access IPB public memory. The major distinction between an MIO and an IPB is that an IPB has a computer plugged into its HBDA.

The major implication of the master/slave relationship from the hardware point of view is that the slave CPU derives its timing and clock signals from the master CPU. This insures that the two CPUs maintain synchronization. Although it is not particularly important that the instruction executions of one CPU remain in sync with instruction execution in the other, it is important that their interactions with each other via the IPB remain in sync.

The master CPU drives the IPB just like any other MIO. The IPB has a standard mailbox, which can be used to communicate with the terminals attached to the IPB. The major difference from the point of view of the master is that the MIO processor in the IPB is not the only processor which is interested in the contents of the mailbox. The mailbox is also used by the slave CPU.

INTERFACE BETWEEN THE IPB AND THE SLAVE CPU

The slave CPU attaches to the HBDA port of the IPB. This port supports a memory address register, a memory data register, data handshake lines, and bus control lines. The slave CPU can access IPB memory just as freely as the master CPU can. Because the HBDA gains access to IPB memory on the third phase of the bus cycle, memory access by the slave CPU does not interfere with access by the master. Both CPU's have essentially equal access to IPB memory.

INTER-CPU TRANSACTIONS

Inter-CPU transactions are initiated by the master CPU. The master builds an I/O request block, and puts a pointer to this I/O request block in the MIO task buffer. As the MIO processor scans the MIO task buffer, it locates the I/O request block in the usual way. When the MIO processor examines this I/O request block, however, it finds that the data are directed to the slave CPU. From the point of view of the MIO processor, such a data transfer request is very similar to a request via the HBDA to a high speed peripheral.

There are two basic ways in which the slave CPU can find out that there is a transaction addressed to it in the MIO mailbox. One way is for the slave CPU to be obligated to examine this mailbox on a periodic basis. The trouble with this approach is that it imposes a fairly heavy burden on the slave CPU to keep scanning the mailbox. Furthermore, such a strategy adds to the maximum latency for response by the slave CPU.

An alternative approach is to have the processor in the IPB interrupt the slave CPU, just as it interrupts other devices which use the HBDA. An MIO processor is normally responsible for activating peripherals attached to the HBDA. Because the HBDA incorporates all of the bus control lines, it would be possible for this processor to gain the attention of the slave CPU in the same way that it interrupts the master. The slave CPU would note the interrupt, learn that it came from the IPB, and scan the IPB mailbox for data that pertained to it.

DATA TRANSMISSIONS

No matter how the slave CPU finds out that there is information for it in the IPB mailbox, data transmissions between the host and the slave are done in the standard way. Because the IPB memory is common to both CPUs, inter-CPU data transmission consists of the slave CPU copying the data into or out of this common memory.

When the slave CPU finishes moving data, it notifies the MIO processor in the IPB. This information is transmitted to the MIO processor in the same way that ending information is transmitted from normal HBDA peripherals. When the MIO processor notices that the data transfer is complete, it posts the transfer as complete in the data request block, and requests an interrupt if the master CPU has directed that an interrupt be posted.

PERIPHERAL SHARING

IPB peripherals are allocated to the master by default. However, the master may cede any of these terminals or other peripherals to the slave by allowing it to place orders for them in the mailbox. In this case, the MIO processor in the IPB notifies the slave instead of the master when I/O operations are complete.

IMPLICATIONS OF THE IPB STRUCTURE

The effect of this IPB structure is to make the slave CPU look just like a HBDA peripheral. The host requests data transfers to and from the slave just as if it were requesting data transfers to the disk. The slave communicates with the processor in the IPB as though it were a high speed disk. The only difference is that instead of having the processor and the IPB load registers which control which data is transferred to and from the peripheral, the slave CPU examines the mailbox for itself in order to determine what is required of it.

There is a very good reason for having the slave CPU examine the mailbox for itself. Interactions between the master and the slave CPU may involve modification of the memory in the IPB rather than actual data transfers. By letting the master and slave share the mailbox, communication between the two CPUs is rapid and convenient. This allows the computer to be programmed to act as an array processor or similarly powerful peripheral for another.

IPB DIAGNOSTICS

IPB diagnostics are the responsibility of the master CPU. When power is applied, the IPB processor reports only to the master CPU. The only unusual initialization performed by an IPB processor is the requirement that the IPB memory occupy a part of the address space of the slave.

During the slave's power on sequence, the IPB vies with the slave's MIO units for its proper place in the memory hierarchy. Thus, the IPB communicates its memory size and serial number to slave MIO's as well as to master MIOs. Other than that, the power up sequence for an IPB is the same as power on for an MIO and so is the initial hardware validation.

TEST DATA TRANSMISSIONS

After initial checkout, it is necessary to verify that the IPB can actually transmit data between the master and slave CPUs. The kernal in the master CPU is responsible for generating test data, and transmitting it to the slave. The kernal does this as part of its overall system functionality test, which it performs before any user partitions are activated. Test data transmitted between CPUs is distinguished from operational data by flags in the I/O request block.

The situation gets complicated if the slave CPU happens to be master to other CPUs. In this case, each master attempts to transmit sets of test data to all of its slaves. If a master happens also to be a slave, it not only transmits test data, but receives some from its master. The end result of all the power on sequences is that all CPU's in the system know their hierarchial relationship to their immediate neighbors.

Thus what has been described is a digital computer utilizing a unique architecture which allows for multiprocessing capability and which utilizes a new component called a composite memory and input/output module (MIO). This module functions so as to transfer data into and out of external devices in a manner that eliminates the input/output rate from affecting the computational ability of the central processing unit. Each central processing unit may be associated with from one of fifteen composite memory, input/output modules, with some or all of these modules acting as interprocessor modules which allow the central processing unit to communicate with additional CPU's. In this configuration the memory within the interprocessor module can be utilized by both CPU's associated with that module, but in a manner which prevents simultaneous access by the CPU's to the memory.

The digital computer disclosed herein uses a three phase clock cycle associated with the bus interconnecting the CPU with the MIO's and IPB's which enables the bus to have direct access to the public memories within the MIO's or IPB's during one phase of the three phase clock cycle. The other two phases allow the external devices access to the MIO public memory by either a serial input/output channel or channels or through a direct memory address parallel input/output channel.

The central processing unit, composite memory and input/output module, including the interprocessor modules are individually housed in physical blocks that are insertable into a functional support unit which further houses the power supply for powering these blocks as well as the bus to communicate between the blocks. The functional support units may be stacked on top of each other with the bus communicable with adjoining functional support units. A pedestal upon which the functional support units are placed houses the constant voltage transformers and rectifying circuitry for providing the raw DC power to the power supply associated with each of the functional support units. By utilizing the constant voltage transformers the input power specifications allow for a plus ten percent and a minus twenty percent difference from the state AC power, whether it be one hundred and ten VAC or two hundred and twenty VAC. This adds to the reliability of the resultant computer system.

Each of the MIO's further has high speed data transfer capability which allows it to interface with high speed virtual memories associated with disks. It can also interface directly with color CRT terminals. Furthermore, each of the modules, including the power supply, has its own microprocessor for internal housekeeping as well as to provide a diagnostic channel which can be utilized for indicating the status of each block forming a part of the functional support unit. The resultant computer has a very large directly addressable memory space when utilizing multiple MIO's, with the memory having very high synchronous data transfer capability with any of a number of external devices. Due to the configuration of the central processing unit with the associated MIO's and IPB's, the overall computing system can be expanded to the desired size for the particular application that is sought to be performed. Indeed, in a multiprocessor arrangement, the multiprocessors can, by virtue of the user microcode incorporated within the CPU's, be adapted for performing a particular function of the user's application program which in turn is then associated with the remaining CPU's of the computing system.

An expandable memory size, multiple CPU capability computer with high throughput is thus obtained.

Having described the invention what is claimed is:

1. A computer comprising:
   (A) a central processing unit (CPU) for the processing of data, the CPU having a processor;
   (B) means, connected to the CPU for providing a communication path to and from the CPU;
   (C) a clock, connected to the communication path means, for generating a repetitive multi-phase clock cycle; and
   (D) a composite, intelligent memory and input/output module (MIO), connected to the communication path means, so as to store and transfer data to and from the CPU and to and from external devices, the data including all application code for execution by the CPU as well as all data used in the execution of the application code, the MIO comprising:
      (1) a public memory for the storage of data accessible to both the CPU and the external devices during different phases of the multiphase clock cycle,
      (2) a microprocessor responsive to the phases of the multi-phase clock cycle so as to control public memory access by the CPU and the external devices,
      (3) a microprocessor bus connecting the public memory to the microprocessor,
      (4) means, responsive to the microprocessor and connected to the microprocessor bus, for interfacing data to and from the external devices with the public memory, and
      (5) means, responsive to the microprocessor and connected between the public memory and the communication path means, for interfacing data to and from the public memory and the CPU;
   whereby data transfer to and from the public memory of the MIO to the communication path means occurs during a distinct phase of the clock cycle and the transfer of data to and from the public memory of the MIO with the external devices occurs during another distinct phase of the clock cycle.

2. The computer defined in claim 1, wherein the processor of the central processing unit (CPU) comprises:
   (1) an arithmetic logic unit for performing computations,
   (2) a second microprocessor for performing diagnostics, power up and control of the CPU, and
   (3) a user programmable, writable control store, interconnected with the arithmetic logic unit and second microprocessor for storing the microcode necessary to translate user instructions into instructions readable and executable by the arithmetic logic unit under the control of the second microprocessor.

3. A computer defined in claim 1, wherein the multiphase clock cycle has three distinct phases and wherein the MIO microprocessor is responsive to these three phases for control of public memory access by the CPU and parallel I/O devices and serial I/O devices, and wherein the means for interfacing data to and from the external devices with the public memory has separate connections to the parallel I/O devices and the serial I/O devices.

4. The computer defined in claim 1, wherein each phase of the multi-phase clock cycle has a duration of 500 nanoseconds.

5. The computer defined in claim 1, wherein the MIO is communicable between the first named CPU and a second CPU as an interprocessor buffer, thereby allowing hierarchical control of one CPU by another CPU.

6. The computer as defined in claim 1, wherein the communication path means comprises a bus.

7. A digital computer comprising:
   (A) a first central processing unit (CPU);
   (B) a bus interconnected to the central processing unit;
   (C) a clock, interconnected to the bus, for repetitively generating at least two distinct clock phases per generation of a clock cycle; and
   (D) up to N composite, intelligent memory, and input/output modules (MIO's), each interconnected to the bus, N being a positive integer greater than one, and each MIO having,
      (1) a public memory for the storage of data including application code for execution by the CPU and data used in the execution of the application code accessible to both the CPU and external devices during different phases of the cycle,
      (2) a first buffer for data transferral from the public memory to the bus,
      (3) a second buffer for data transferral from the public memory to interconnected external devices, and
      (4) means, responsive to the clock phases and communicating with the first and second buffers, for controlling the access to and from the public memory by the CPU during one clock cycle phase and for providing access to and from the public memory by external devices during at least one other clock cycle phase;
   whereby data transfer to and from the public memory of each MIO to the bus occurs during a distinct phase of the clock cycle and the transfer of data to and from the public memory of each MIO with external devices occurs during another distinct phase of the clock cycle.

8. A digital computer as defined in claim 7 wherein the means for controlling access between each public memory and each first and second buffers for each MIO is a microprocessor.

9. A digital computer as defined in claim 8, wherein each MIO further comprises a third buffer for data transferral from the public memory to serial input/output devices and wherein the second buffer is connected to parallel data transfer external devices, wherein the clock generates a three-phase clock cycle and wherein the MIO public memory is accessible to the bus during a first phase of the clock cycle, is communicable with a serial input/output device during a second phase of the clock cycle and is communicable with a parallel input/output device during the third phase of the clock cycle.

10. A digital computer as defined in claim 9, wherein each phase of the three-phase clock cycle has a duration of 500 nanoseconds.

11. A digital computer as defined in claims 7, 8, or 9 wherein the central processing unit further comprises a microprocessor for performing diagnostics with respect to the central processing unit.

12. A digital computer as defined in claim 11, wherein the central processing unit includes a writable control store interconnected with the CPU microprocessor and wherein a series bit slice processor interconnects with the writable control store for execution of user instructions via a microcode stored in the writable control store.

13. A digital computer as defined in claim 7, further comprising:
   (E) up to P interprocessor buffers (IPB's) connected to the bus, P being a positive integer;
   (F) up to P additional buses, each additional bus connected to only one of the interprocessor buffers; and
   (G) up to P additional CPU's, each connected to only one of the additional buses, and each communicable with the first CPU via the corresponding interprocessor buffer.

14. A digital computer as defined in claim 13, wherein each interprocessor buffer comprises a public memory and means for operating during the clock phases of the clock cycle so as to give access of the corresponding interprocessor buffer public memory to the first central processing unit during one clock phase and to the interconnected additional central processing unit during another clock phase.

15. A digital computer as defined in claim 14, wherein the accessibility of the public memory in each interprocessor buffer to the first central processing unit occurs during the same time that the first central processing unit has access to the public memories of other interconnected MIO's and IPB's.

16. A digital computer as defined in claim 15, wherein the total number of MIO's and IPB's that can be connected to one bus is fifteen.

17. A digital computer comprising:
   (A) at least first and second central processing units (CPU's),
   (B) a first bus connected to the first central processing unit,
   (C) a second bus connected to the second central processing unit,
   (D) a clock for generating a repetitive clock cycle having at least first and second distinct clock phases per clock cycle; and
   (E) an interprocessor buffer (IPB) having
      (1) a first public memory for the storage of data, the data including the application code for execution by the first CPU as well as the data used in the execution of this application code accessible to both the first and second CPU's during different phases of the clock cycle,
      (2) means, connected to the first bus and to the first public memory, for providing data transfer to and from the first bus and the first public memory,
      (3) means, connected to the second bus and to the first public memory, for providing data transfer to and from the second bus and the first public memory, and
      (4) a first microprocessor responsive to the phases of the clock cycle for at least control of first public memory access by the first CPU via the first bus and first bus transfer means during the first clock phase and public memory access to the first public memory by the second CPU via the second bus and second bus transfer means during the second clock phase; and
   (F) at least one composite intelligent memory and input/output module (MIO), connected to the second bus so as to store and transfer data to and from the second CPU and to and from external devices, the data, in combination with the data in the first public memory, including all application code for execution by the second CPU as well as all data used in the execution of the application code, the MIO comprising:
      (1) a second public memory for the storage of data accessible to both the second CPU and the external devices during different phases of the repetitive clock cycle,
      (2) a second microprocessor responsive to the phases of the repetitive clock cycle so as to control memory access to the second public memory by the second CPU and the external devices,
      (3) a microprocessor bus connecting the second public memory to the microprocessor,
      (4) means, responsive to the microprocessor and connected to the microprocessor bus, for interfacing data to and from the external devices with the second public memory, and
      (5) means, responsive to the microprocessor and connected between the second public memory and the second bus, for interfacing data to and from the second public memory and second bus;
   whereby data transfer to and from the first public memory with the first and second buses occurs during distinct phases of the clock cycle and the transfer to and from the second public memory with external devices and the second bus occurs also during distinct phases of the clock cycle.

18. A method of processing and transferring data between a first location and a second location interconnected thereto by a bus and between the second location and communicating external devices, comprising the steps of:
   (1) processing data, including specifying and executing application code at the first location;
   (2) generating repetitive clock cycles, each clock cycle having at least first, second, and third distinct clock phases;
   (3) reading all data necessary for specifying and executing application code from any of up to N second locations at the first location, where N is a positive integer, by performing the following substeps:
      (a) during the third phase of the clock cycles informing any second location of an address within that particular second location where data is to be read by the first location,
      (b) during the first phase of the clock cycles transferring data from the selected address location of the second location defined in Step 3a to the bus interconnecting the first location with each second location, and
      (c) during the second phase of the clock cycles reading at the first location the data placed on the bus by the selected second location defined in Step 3a during the first phase of the clock cycle,
   (4) writing data from the first location with any of up to the N second locations by performing the following substeps:

(a) during the first phase of the clock cycles putting an address on the bus by the first location, the address representing a memory location in one of the second locations where data is to be transferred from the first location,
(b) during the second phase of the clock cycles putting data to be transferred to the selected address location of the second location defined in step 4a on the bus, and
(c) during the third phase of the clock cycles transferring data placed on the bus during the second clock phase into the selected address location of the second location defined in step 4a; and
(5) transferring data to and from the second locations and communicating external devices during at least some of the second clock phases;

whereby the transfer of data to and from the first and second locations is independent of the transfer of data to and from the second locations and external devices.

19. A method of processing and transferring data between a first location and a second location interconnected thereto by a bus and between the second location and communicating external devices as defined in claim 18, further comprising the steps of:
(6) at some of the second locations transferring data to and from communicating external devices via a direct memory access port during at least some of the third phases of the clock cycles.

20. A method of processing and transferring data between a first location and a second location interconnected thereto by a bus and between the second location and communicating external devices as defined in claim 18 or 19, further comprising the steps of:
(7) transferring data to and from the first location and a third location during at least some of the first phases of the clock cycles;
(8) transferring data to and from the third location and a fourth location during at least some of the second phases of the clock cycles; and
(9) processing data at the fourth location;

whereby the transfer of data to and from the first location and the second and fourth locations is independent of the transfer of data to and from the second location and external devices and independent of the processing of data by the fourth location.

21. A method of processing and transferring data between a first location and a second location interconnected thereto by a bus and between the second location and communicating external devices as defined in claim 20 further comprising the steps of:
(10) generating a second repetitive clock cycles synchronized with generation of repetitive clock cycles in step 2;
(11) reading data at the fourth location from any of up to P fifth locations, interconnected to the fourth location by a second bus, where P is a positive integer, by performing the following substeps:
(a) during the third phase of the second clock cycles informing any fifth location of an address within that particular fifth location where data is to be read by the fourth location,
(b) during the first phase of the second clock cycles transferring data from the selected address location of the fifth location defined in step 11a to the second bus interconnecting the fourth location with the fifth location, and
(c) during the second phase of the second clock cycles reading at the fourth location the data placed on the bus by the selected fifth location defined in step 11a during the first phase of these clock cycles;
(12) writing data from the fourth location with any of up to P fifth locations by performing the following substeps:
(a) during the first phase of the second clock cycles putting an address on the second bus from the fourth location, the address representing a memory location in one of the fifth locations where data is to be transferred from the fourth location,
(b) during the second phase of the second clock cycles putting data to be transferred to the selected address location of the fifth location defined in step 11a on the second bus from the fourth location, and
(c) during the third phase of the second clock cycles transferring data placed on the bus during the second clock phase into the selected address location of the fifth location defined in step 12a; and
(13) transferring data to and from the fifth locations and communicating external devices during at least some of the second phases of the second clock cycles;

whereby the transfer of data to and from the fourth and fifth locations is independent of the transfer of data to and from the fifth locations and external devices.

22. A computer as defined in claim 5, wherein the second CPU operates on a repetitive multi-phase clock cycle generated by the clock as transferred to the second CPU by the interprocessor buffer, thereby making the second CPU operating on a slave basis with respect to the multi-phase clock cycle of the first CPU.

23. A computer as defined in claims 2, 5 or 22, wherein each MIO has means for data transferral from the public memory to serial input/output devices.

24. A computer as defined in claims 1 or 2 further comprising up to N additional intelligent memory and input/output modules (MIO's) of the same configuration as the first named intelligent MIO, each additional MIO operating in synchronism to the phases of the multi-phase clock cycle so as to enable the central processing unit to access any public memory of any MIO during one of the phases of the multi-phase clock cycle and thereby to allow the application code for execution by the CPU to be resident within any of the MIO public memories with the microprocessor of each MIO responsible for access control of its respective public memory by the CPU and interconnected external devices.

25. A computer as defined in claims 1 or 2 further comprising up to N additional intelligent memory and input/output modules (MIO's) of the same configuration as the first named intelligent memory and input/output module, each MIO operating in synchronism to the phases of the multi-phase clock cycle so as to enable the central processing unit to access any public memory of any MIO during one of the phases of the multi-phase clock cycle and thereby to allow the application code for execution by the CPU to be resident within any of the MIO public memories with the microprocessor of each MIO responsible for access control of its respective public memory by the CPU and the interconnected external devices, and wherein up to P of the MIO's are communicable between the first named CPU and one of P additional CPU's, the P MIO's acting as interprocessor buffers, wherein for each interprocessor buffer the public memory is accessible by the first and corresponding P additional CPU's during different phases of the multi-phase clock cycle, thereby allowing hierarchical control of one or more CPU's by another CPU, wherein P is a positive integer equal to or less than N+1.

26. A computer as defined in claims 1 or 2, wherein the MIO microprocessor further has means for performing initialization during power-up and processes all interrupt handling of the CPU.

27. A computer comprising:
   (A) a central processing unit (CPU) for the processing of data, the CPU having a processor;
   (B) means, connected to the CPU for providing a communication path to and from the CPU;
   (C) a composite, intelligent memory and input/output module (MIO) connected to the communication path means, so as to store and transfer data to and from the CPU and to and from external devices, the data including all application code for execution by the CPU as well as all data used in the execution of the application code, the MIO comprising:
      (1) a public memory for the storage of data accessible to both the CPU and the external devices during different periods of time,
      (2) a microprocessor to control public memory access by the CPU and the external devices during the different periods of time,
      (3) a microprocessor bus connecting the public memory to the microprocessor,
      (4) means, responsive to the microprocessor and connected to the microprocessor bus, for interfacing data to and from the external devices with the public memory, and
      (2) means, responsive to the microprocessor and connected between the public memory and communication path means, for interfacing data to and from the public memory and the CPU;
   whereby data transfer to and from the public memory of the MIO to the communication path means occurs during different periods of time than the transfer of data to and from the public memory of the MIO with the external devices.

28. The computer defined in claim 27, wherein the processor of the central processing unit (CPU) comprises:
   (1) an arithmetic logic unit for performing computations,
   (2) a second microprocessor for performing diagnostics, power up and control of the CPU, and
   (3) a writable control store, interconnected with the arithmetic logic unit and second microprocessor for storing the microcode necessary to translate user instructions into instructions readable and executable by the arithmetic logic unit under the control of the second microprocessor.

29. A computer as defined in claim 28 further comprising a clock for generating a repetitive multi-phase clock cycle, each phase representing one of the different periods of time that the MIO public memory is accessible to the CPU and external devices, wherein the computer further comprises up to N additional intelligent memory and input/output modules (MIO's) of the same configuration as the first named MIO, each additional MIO operating in synchronism to the phases of the multi-phase clock cycle so as to enable the central processing unit to access any public memory of any MIO during one of the phases of the multi-phase clock cycle and thereby to allow the application code for execution by the CPU to be resident within any of the MIO public memories with the microprocessor of each MIO responsible for access control of its respective public memory by the CPU and interconnected external devices, where N is a positive integer.

30. A computer as defined in claim 29 wherein the second microprocessor of the CPU performs an initialization function including assigning each MIO a unique block number and to uniquely and contiguously define the address space of all the MIO public memories.

31. A computer as defined in claim 29 wherein the communications path means is a bus, and wherein the computer further comprises:
   (D) up to P interprocessor buffers (IPB's) connected to the bus, P being a positive integer;
   (E) up to P additional buses, each additional bus connected to only one of the IPB's; and
   (F) up to P additional CPU's, each connected to only one of the additional buses, and each communicable with the first CPU via the corresponding IPB.

32. A digital computer as defined in claim 31, wherein each interprocessor buffer comprises a public memory and means for operating during the clock phases of the clock cycle so as to give access of the corresponding interprocessor buffer public memory to the first central processing unit during one clock phase and to the interconnected additional central processing unit during another clock phase.

33. A digital computer as defined in claim 32, wherein the accessibility of the public memory in each interprocessor buffer to the first central processing unit occurs during the same time that the first central processing unit has access to the public memories of other interconnected MIO's and IPB's.

34. A computer as defined in claim 33, wherein each of the P additional CPU's through the respective P additional bus has associated with it one or more MIO's or IPB's for the respective transfer of data from the additional CPU to external devices and to further additional CPU's, and wherein the interconnecting IPB's have means for generating a slave clock cycle in response to the first clock cycle so that the multi-phase clock cycle associated with the first named CPU controls the clock cycle of each P additional CPU and the further additional CPU's.

35. A computer as defined in claim 1, wherein the MIO has means for data transferral from the public memory to serial input/output devices.

36. A computer as defined in claims 5 or 22, wherein each microprocessor further has means for performing initialization during power-up.

* * * * *